United States Patent
Park et al.

(10) Patent No.: US 12,446,037 B2
(45) Date of Patent: Oct. 14, 2025

(54) APPARATUS AND METHOD FOR TRANSMITTING AND RECEIVING CONTROL INFORMATION IN COMMUNICATION SYSTEM

(71) Applicant: SAMSUNG ELECTRONICS CO., LTD., Suwon-si (KR)

(72) Inventors: Sungjin Park, Suwon-si (KR); Seho Myung, Suwon-si (KR); Younsun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/661,173

(22) Filed: May 10, 2024

(65) Prior Publication Data

US 2024/0306150 A1    Sep. 12, 2024

Related U.S. Application Data

(63) Continuation of application No. 17/301,665, filed on Apr. 9, 2021, now Pat. No. 11,985,664.

(30) Foreign Application Priority Data

Apr. 10, 2020 (KR) .................... 10-2020-0043905
Jul. 16, 2020 (KR) .................... 10-2020-0088454
Oct. 16, 2020 (KR) .................... 10-2020-0134687

(51) Int. Cl.
*H04W 72/20* (2023.01)
*H04L 1/00* (2006.01)
*H04L 27/34* (2006.01)

(52) U.S. Cl.
CPC .......... *H04W 72/20* (2023.01); *H04L 1/0003* (2013.01); *H04L 1/0009* (2013.01); *H04L 27/34* (2013.01)

(58) Field of Classification Search
CPC .... H04W 72/20; H04L 1/0003; H04L 1/0009; H04L 27/34
See application file for complete search history.

(56) References Cited

U.S. PATENT DOCUMENTS

2015/0271794 A1* 9/2015 Kang ................ H04L 27/0008
                                                                         370/329
2018/0324015 A1    11/2018 Yi et al.
2021/0315002 A1    10/2021 Nakamura et al.

FOREIGN PATENT DOCUMENTS

EP          3462654 A1 *  4/2019 ........... H04L 1/0016
WO     2017123337 A1     7/2017
(Continued)

OTHER PUBLICATIONS

5G; NR: Physical Layer Procedures for Data, 3GPP TS 38.214 v15.8.0 (Jan. 2020) (Year: 2020).*

(Continued)

*Primary Examiner* — Huy D Vu
*Assistant Examiner* — Robert Ma

(57) ABSTRACT

A method of a user equipment (UE) in a wireless communication system is provide. The method includes: receiving, from a base station, physical downlink shared channel (PDSCH) configuration information including a higher layer parameter for a modulation and coding scheme (MCS) table; identifying the MCS table for a PDSCH based on the higher layer parameter for the MCS table; receiving, from the base station, the PDSCH; and decoding, based on the identified MCS table, the PDSCH, wherein, in case that the higher layer parameter for the MCS table indicates a 1024-quadrature amplitude modulation (QAM), the MCS table for the PDSCH is identified as an MCS table with a maximum modulation order of 10, and wherein the MCS table with the maximum modulation order of 10 includes a set of combinations comprising a modulation order and a target code (Continued)

rate, the set of combinations including: (10, 805.5/1024), (10, 853/1024), (10, 900.5/1024), and (10, 948/1024).

10 Claims, 16 Drawing Sheets

(56) References Cited

FOREIGN PATENT DOCUMENTS

| WO | 2019019174 A1 | 1/2019 |
|---|---|---|
| WO | 2021146990 A1 | 7/2021 |

OTHER PUBLICATIONS

International Search Report and Written Opinion of the International Searching Authority in connection with International Application No. PCT/KR2021/004504 issued Jul. 6, 2021, 8 pages.
ETSI TS 138 214 V15.2.0 (Jul. 2018), Technical Specification, 5G; NR; Physical layer procedures for data (3GPP TS 38.214 version 15.2.0 Release 15) Jul. 2018, 95 pages.
Supplementary European Search Report dated Aug. 28, 2023, in connection with European Application No. 21784628.6, 15 pages.
Qualcomm Incorporated, "Removal of R_CSI from 1024QAM CQI table," R1-1809590, 3GPP TSG-RAN WG1 Meeting #94, Gothenburg, Sweden, Aug. 20-24, 2018, 2 pages.
Omura et al., "Implementation of MCS Incorporating 1024-QAM and Beam-Based Transmission in 3D-BF," 2020 IEEE 91st Vehicular Technology Conference (VTC2020-Spring), May 25-28, 2020, 4 pages.
The Third Office Action dated Feb. 5, 2025, in connection with Chinese Application No. 202180027649.0, 26 pages.
Communication pursuant to Article 94(3) EPC dated Feb. 12, 2025, in connection with European Application No. 21784628.6, 7 pages.
The Second Office Action dated Oct. 25, 2024, in connection with Chinese Application No. 202180027649.0, 23 pages.
3GPP TS 38.214 V15.0.0 (Dec. 2017), Technical Specification, 3rd Generation Partnership Project; Technical Specification Group Radio Access Network; NR; Physical layer procedures for data (Release 15), Dec. 2017, 71 pages.
ZTE, et al., "Discussion on CQI and MCS table," R1-1719731, 3GPP TSG-RAN WG1 Meeting #91, Reno, USA, Nov. 27-Dec. 1, 2017, 7 pages.
Rejection Decision dated May 29, 2025, in connection with Chinese Application No. 202180027649.0, 27 pages.

* cited by examiner

APPARATUS AND METHOD FOR TRANSMITTING AND RECEIVING CONTROL INFORMATION IN COMMUNICATION SYSTEM

CROSS-REFERENCE TO RELATED APPLICATIONS

This application is a continuation of application Ser. No. 17/301,665, filed Apr. 9, 2021, now U.S. Pat. No. 11,985,664, which is based on and claims priority under 35 U.S.C. § 119 to Korean Patent Application No. 10-2020-0043905, filed Apr. 10, 2020, Korean Patent Application No. 10-2020-0088454, filed Jul. 16, 2020, and Korean Patent Application No. 10-2020-0134687, filed Oct. 16, 2020, in the Korean Intellectual Property Office, the disclosures of which are incorporated by reference herein in their entirety.

BACKGROUND

1. Field

The disclosure relates to a communication or broadcasting system, and more particularly, to an apparatus and method for transmitting and receiving control information in a communication or broadcast system.

2. Description of Related Art

To meet the increase in demand for wireless data traffic after the commercialization of $4^{th}$ generation (4G) communication systems, considerable efforts have been made to develop enhanced 5G communication systems. In this regard, 5G communication systems have been referred to as beyond 4G network communication systems or post long-term evolution (LTE) systems. In order to achieve a high data rate, 5G communication systems are being developed to be implemented in a super-high frequency band (millimeter wave (mmWave)), e.g., a band of 60 GHz. In order to reduce the path loss of radio waves in such a super-high frequency band and to increase a transmission distance of radio waves in 5G communication systems, various technologies have been discussed and are being studied, for example: beam-forming, massive multiple-input multiple-output (MIMO), full dimensional MIMO (FD-MIMO), array antennas, analog beam-forming, and large-scale antennas. In order to improve system networks for 5G communication systems, various technologies have been developed, e.g., evolved small cells, advanced small cells, cloud radio access networks (Cloud-RAN), ultra-dense networks, device-to-device communication (D2D), wireless backhaul, moving networks, cooperative communication, coordinated multi-points (CoMP), and interference cancellation. Also, for 5G communication systems, other technologies have been developed, e.g., hybrid frequency-shift keying (FSK) and quadrature amplitude modulation (QAM) (FQAM) and Sliding Window Superposition Coding (SWSC), which are Advanced Coding Modulation (ACM) schemes, and Filter Bank Multi Carrier (FBMC), non-orthogonal multiple access (NOMA), and sparse code multiple access (SCMA), which are advanced access schemes.

A new radio (NR), i.e., new 5G communication, has been designed such that various services are freely multiplexed in time and frequency resources, and accordingly, waveform/numerology, a reference signal, and the like may be dynamically or freely assigned according to necessity of a corresponding service. To provide an optimum service to a terminal in communication, data transmission optimized via measurement of quality and interference of a channel is important, and thus channel state measurement is mandatory. However, unlike 4G communication in which channel and interference characteristics do not largely change depending on a frequency resource, channel and interference characteristics of a 5G channel largely change depending on a service, and thus a subset of a frequency resource group (FRG) needs to be supported to divide and measure services. In an NR system, types of supported services may be divided in categories of enhanced mobile broadband (eMBB), massive machine type communications (mMTC), and ultra-reliable and low-latency communications (URLLC). The eMBB may be a service aiming at high-speed transmission of high-capacity data, the mMTC may be a service aiming at terminal power minimization and multiple terminal connections, and the URLLC may be a service aiming at high reliability and low delay. Different requirements may be applied depending on types of services applied to a terminal.

As such, a plurality of services may be provided to a user in a communication system, and a method for providing the plurality of services according to characteristics so as to provide the plurality of services to the user and an apparatus using the method are required.

SUMMARY

Provided are an apparatus and method for generating, configuring, or instructing a channel quality indicator (CQI) and modulation and coding scheme (MCS) table in a communication system that requires various target block error rates (BLERs).

Additional aspects will be set forth in part in the description which follows and, in part, will be apparent from the description, or may be learned by practice of the presented embodiments of the disclosure.

According to an embodiment of the disclosure, a method of a user equipment (UE) in a wireless communication system includes: receiving, from a base station, physical downlink shared channel (PDSCH) configuration information including a higher layer parameter for a modulation and coding scheme (MCS) table; identifying the MCS table for a PDSCH based on the higher layer parameter for the MCS table; receiving, from the base station, the PDSCH; and decoding, based on the identified MCS table, the PDSCH, wherein, in case that the higher layer parameter for the MCS table indicates a 1024-quadrature amplitude modulation (QAM), the MCS table for the PDSCH is identified as an MCS table with a maximum modulation order of 10, and wherein the MCS table with the maximum modulation order of 10 includes a first set of combinations comprising a modulation order and a target code rate, the first set of combinations including: (10, 805.5/1024), (10, 853/1024), (10, 900.5/1024), and (10, 948/1024).

According to an embodiment of the disclosure, a user equipment (UE) in a wireless communication system includes: a transceiver; and at least one processor operably connected to the transceiver, the at least one processor configured to: receive, from a base station, physical downlink shared channel (PDSCH) configuration information including a higher layer parameter for a modulation and coding scheme (MCS) table; identify the MCS table for a PDSCH based on the higher layer parameter for the MCS table; receive, from the base station, the PDSCH; and decode, based on the identified MCS table, the PDSCH, wherein, in case that the higher layer parameter for the MCS table indicates a 1024-quadrature amplitude modulation (QAM), the MCS table for the PDSCH is identified as a MCS table with a maximum modulation order of 10, and wherein the MCS table with the maximum modulation order of 10 includes a first set of combinations comprising a modulation order and a target code rate, the first set of combinations including: (10, 805.5/1024), (10, 853/1024), (10, 900.5/1024), and (10, 948/1024).

According to an embodiment of the disclosure, a method of a base station in a wireless communication system includes: determining a modulation and coding scheme (MCS) table for a physical downlink shared channel (PDSCH); transmitting, to a user equipment (UE), PDSCH configuration information including a higher layer parameter for the MCS table; encoding, based on the MCS table, the PDSCH; and transmitting, to the UE, the encoded PDSCH, wherein, in case that the MCS table for the PDSCH indicates a 1024-quadrature amplitude modulation (QAM), the MCS table for the PDSCH is identified as an MCS table with a maximum order of 10 and the higher layer parameter for the MCS table indicates 1024-QAM, and wherein the MCS table with the maximum modulation order of 10 includes a first set of combinations comprising a modulation order and a target code rate, the first set of combinations including: (10, 805.5/1024), (10, 853/1024), (10, 900.5/1024), and (10, 948/1024).

According to an embodiment of the disclosure, a base station in a wireless communication system includes: a transceiver; and at least one processor operably connected to the transceiver, the at least one processor configured to: determine a modulation and coding scheme (MCS) table for a physical downlink shared channel (PDSCH); transmit, to a user equipment (UE), PDSCH configuration information including a higher layer parameter for the MCS table; encode, based on the MCS table, the PDSCH; and transmit, to the UE, the encoded PDSCH, wherein, in case that the MCS table for the PDSCH indicates a 1024-quadrature amplitude modulation (QAM), the MCS table for the PDSCH is identified as an MCS table with a maximum order of 10 and the higher layer parameter for the MCS table indicates 1024-QAM, and wherein the MCS table with the maximum modulation order of 10 includes a first set of combinations comprising a modulation order and a target code rate, the first set of combinations including: (10, 805.5/1024), (10, 853/1024), (10, 900.5/1024), and (10, 948/1024).

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
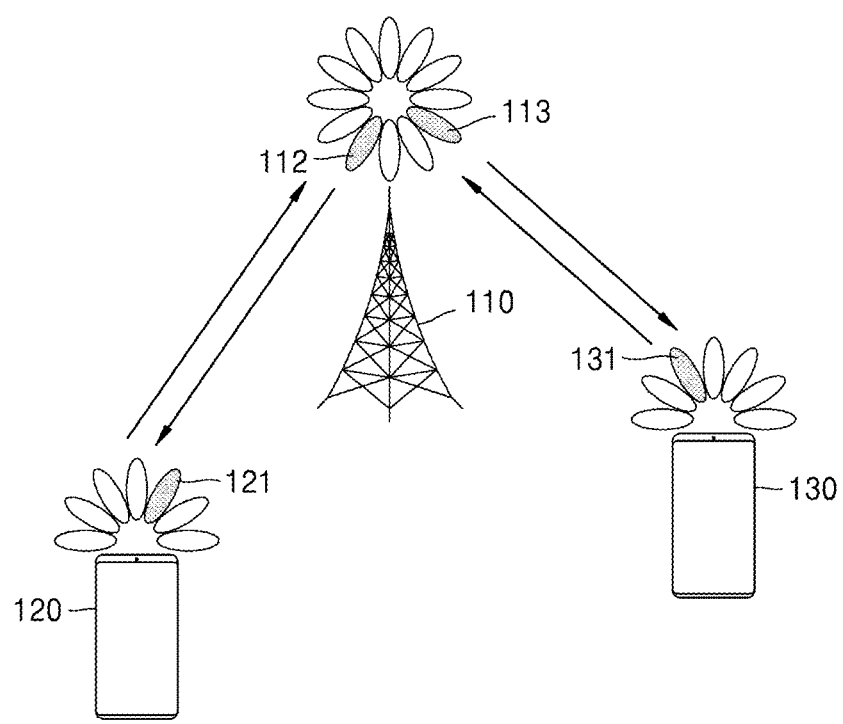
FIG. 1 illustrates a diagram of a wireless communication system according to an embodiment of the disclosure.

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described in detail with reference to accompanying drawings. While describing the disclosure, detailed description of related functions or configurations may be omitted when it is deemed that they may unnecessarily obscure the essence of the disclosure. Also, terms used below are defined in consideration of functions in the disclosure, and may have different meanings according to an intention of a user or operator, customs, or the like. Thus, the terms should be defined based on the description throughout the specification.

Main features of the disclosure are applicable to other systems with similar technical backgrounds, with a slight change within a range that does not deviate from the scope of the disclosure, and such applicability may be determined by one or ordinary skill in the art. For reference, a communication system is a term generally including the meaning of a broadcasting system, but in the disclosure, the communication system may be further clearly referred to as a broadcasting system when a broadcasting service is a main service in the communication system.

Advantages and features of one or more embodiments of the disclosure and methods of accomplishing the same may be understood more readily by reference to the following detailed description of the embodiments of the disclosure and the accompanying drawings. In this regard, the embodiments of the disclosure may have different forms and should not be construed as being limited to the descriptions set forth herein. Rather, these embodiments of the disclosure are provided so that the disclosure will be thorough and complete and will fully convey the concept of the disclosure to one of ordinary skill in the art, and the disclosure will only be defined by the appended claims. Throughout the specification, like reference numerals denote like elements.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

In various embodiments of the disclosure described below, a hardware approach is described as an example. However, because various embodiments of the disclosure include technology using both hardware and software, various embodiments of the disclosure do not exclude a software-based approach.

The disclosure hereinbelow relates to an apparatus and method for transmitting and receiving control information in a communication system. In particular, the disclosure describes a technology for transmitting and receiving control information based on a channel quality indicator (CQI) and modulation coding scheme (MCS) table in a wireless communication system.

In the description below, the term indicating a signal, the term indicating a channel, the term indicating control information, the term indicating a network entity, the term indicating a component of an apparatus, and the like are exemplified for convenience of description. Thus, the terms used in the disclosure are not limited and other terms having the same technical meanings may be used.

Also, various embodiments of the disclosure are described by using the terms used in some communication standards (for example, 3rd generation partnership project (3GPP), but the embodiments are only examples for description. The various embodiments of the disclosure may be easily modified and applied to another communication system.

FIG. 1 is a diagram of a wireless communication system according to an embodiment of the disclosure. FIG. 1 illustrates a base station 110, a terminal 120, and a terminal 130, as some of nodes using a wireless channel in a wireless communication system. FIG. 1 illustrates only one base station 110, but the wireless communication system may further include a base station that is the same as or similar to the base station 110.

The base station 110 is a network infrastructure providing a wireless access to the terminals 120 and 130. The base station 110 has a coverage defined as a certain geographic area based on a distance at which a signal is transmittable. The base station 110 may be referred to by, in addition to the base station, an access point (AP), an evolved node B (eNB), a 5G node, a wireless point, a transmission/reception point (TRP), or another term having an equivalent technical meaning.

Each of the terminal 120 and the terminal 130 is an apparatus used by a user and performs communication with the base station 110 via a wireless channel. In some cases, at least one of the terminal 120 or the terminal 130 may operate without involvement of the user. For example, when at least one of the terminal 120 or the terminal 130 is an apparatus performing machine type communication (MTC), the at least one of the terminal 120 or the terminal 130 may not be held by the user. The terminal 120 and the terminal 130 may each be referred to by, in addition to the terminal, a UE, a mobile station, a subscriber station, a remote terminal, a wireless terminal, a user device, or another term having an equivalent technical meaning.

The base station 110, the terminal 120, and the terminal 130 may transmit and receive a wireless signal in a millimeter wave (mmWave) band (for example, 28 GHz, 30 GHz, 38 GHz, or 60 GHz). Here, for improvement of a channel gain, the base station 110, the terminal 120, and the terminal 130 may perform beamforming. Here, the beamforming may include transmission beamforming and reception beamforming. In other words, the base station 110, the terminal 120, and the terminal 130 may assign directivity to a transmission signal or a reception signal. In this regard, the base station 110 and the terminals 120 and 130 may select serving beams 112, 113, 121, and 131 via a beam search or beam management procedure. After the serving beams 112, 113, 121, and 131 are selected, communication thereafter may be performed by using a resource in a quasi-co-located (QCL) relationship with a resource transmitting the serving beams 112, 113, 121, and 131.

It may be evaluated that a first antenna port and a second antenna port are in a QCL relationship when large-scale characteristics of a channel that transmitted a symbol on the first antenna port are able to be inferred from a channel that transmitted a symbol on the second antenna port. For example, the large-scale characteristics may include at least one of delay spread, Doppler spread, Doppler shift, average gain, average delay, or spatial receiver parameter.

Figure 2:
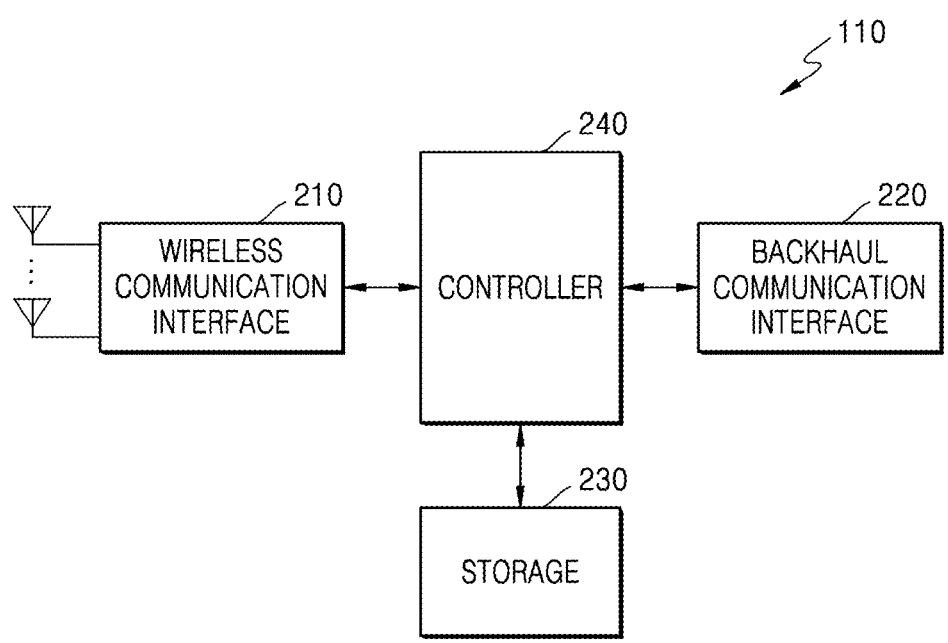
FIG. 2 illustrates a block diagram of a configuration of a base station in a wireless communication system, according to an embodiment of the disclosure.

FIG. 2 is a block diagram of a configuration of a base station in a wireless communication system, according to an embodiment of the disclosure. The configuration shown in FIG. 2 may be understood as a configuration of the base station 110. Terms such as "unit", "-or/er", and the like described below denote a unit that processes at least one function or operation, which may be implemented in hardware or software, or implemented in a combination of hardware and software.

Referring to FIG. 2, the base station 110 includes a wireless communication interface 210, a backhaul communication interface 220, a storage 230, and a controller 240.

The wireless communication interface 210 performs functions for transmitting and receiving a signal via a wireless channel. For example, the wireless communication interface 210 may perform conversion between a baseband signal and a bitstream, based on physical layer specifications of a system. For example, during data transmission, the wireless communication interface 210 generates complex symbols by encoding and modulating a transmission bitstring. Also, during data reception, the wireless communication interface 210 reconstructs a reception bitstring by demodulating and decoding a baseband signal.

Also, the wireless communication interface 210 up-converts the baseband signal to a radio frequency (RF) band signal and then transmits the RF band signal via an antenna, and down-converts an RF band signal received via the antenna to a baseband signal. In this regard, the wireless communication interface 210 may include a transmit filter, a receive filter, an amplifier, a mixer, an oscillator, a digital-to-analog converter (DAC), and an analog-to-digital converter (ADC). Also, the wireless communication interface 210 may include a plurality of transmission and reception paths. In addition, the wireless communication interface 210 may include at least one antenna array including a plurality of antenna elements.

In terms of hardware, the wireless communication interface 210 may include a digital unit and an analog unit, wherein the analog unit may include a plurality of sub-units according to operation power, an operation frequency, or the like. The digital unit may be implemented as at least one processor (for example, a digital signal processor (DSP)).

As described above, the wireless communication interface 210 transmits and receives a signal. Accordingly, the wireless communication interface 210 may be entirely or partially referred to as a transmitter, a receiver, or a transceiver. In the description below, transmission and reception performed via the wireless channel may be used in the meaning that the process described above is performed by the wireless communication interface 210. According to some embodiments of the disclosure, the wireless communication interface 210 may perform functions for transmitting and receiving a signal by using wired communication.

The backhaul communication interface 220 may provide an interface for communicating with other nodes in a network. In other words, the backhaul communication interface 220 may convert a bit string transmitted from the base station 110 to another node, for example, another access node, another base station, a higher node, or a core network, into a physical signal, and convert a physical signal received from the other node into a bit string.

The storage 230 may store data for operations of the base station 110, e.g., basic programs, application programs, and configuration information. The storage 230 may be configured in a volatile memory, a nonvolatile memory, or a combination of a volatile memory and a nonvolatile memory. The storage 230 may provide the stored data upon request by the controller 240.

The controller 240 may control overall operations of the base station 110. For example, the controller 240 may transmit and receive a signal via the wireless communication interface 210 or via the backhaul communication interface 220. The controller 240 may record and read data on and from the storage 230. The controller 240 may perform functions of a protocol stack required in the communication standard. According to another embodiment of the disclosure, the protocol stack may be included in the wireless communication interface 210. In this regard, the controller 240 may include at least one processor.

According to an embodiment of the disclosure, the controller 240 may transmit and receive control information to and from the terminal 120. For example, the controller 240 may control the base station 110 to perform operations according to an embodiment of the disclosure described below.

Figure 3:
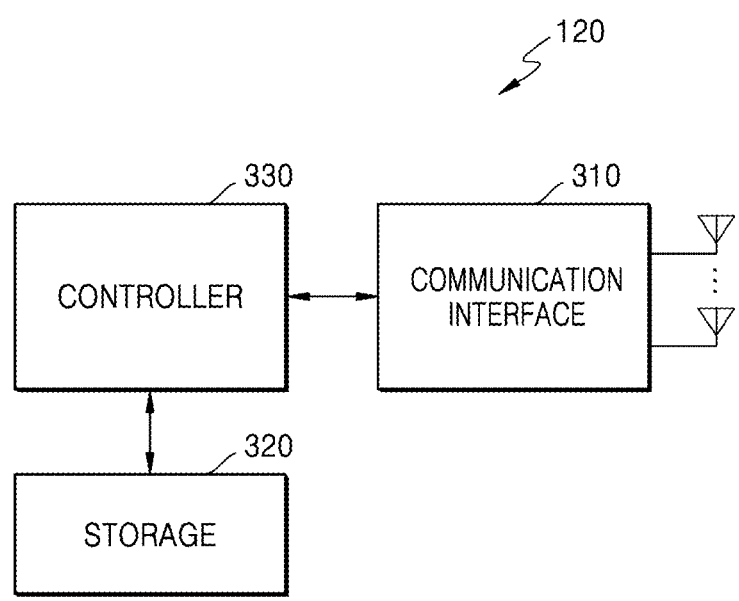
FIG. 3 illustrates a block diagram of a configuration of a terminal in a wireless communication system, according to an embodiment of the disclosure.

FIG. 3 illustrates a block diagram of a configuration of a terminal in a wireless communication system, according to an embodiment of the disclosure. The configuration shown in FIG. 3 may be understood as a configuration of the terminal 120. Terms such as "unit," "-or/er," and the like described below denote a unit that processes at least one function or operation, which may be implemented in hardware or software, or implemented in a combination of hardware and software.

Referring to FIG. 3, the terminal 120 includes a communication interface 310, a storage 320, and a controller 330.

The communication interface 310 performs functions for transmitting and receiving a signal via a wireless channel. For example, the communication interface 310 may perform conversion between a baseband signal and a bitstream, based on physical layer specifications of a system. For example, during data transmission, the communication interface 310 generates complex symbols by encoding and modulating a transmission bitstring. Also, during data reception, the communication interface 310 reconstructs a reception bitstring by demodulating and decoding a baseband signal. The communication interface 310 up-converts the baseband signal to an RF band signal and then transmits the RF band signal via an antenna, and down-converts an RF band signal received via the antenna to a baseband signal. For example, the communication interface 310 may include a transmit filter, a receive filter, an amplifier, a mixer, an oscillator, a DAC, and an ADC.

Also, the communication interface 310 may include a plurality of transmission and reception paths. In addition, the communication interface 310 may include at least one antenna array including a plurality of antenna elements. In terms of hardware, the communication interface 310 may include a digital circuit and an analog circuit (for example, a radio frequency integrated circuit (RFIC)). Here, the digital circuit and the analog circuit may be implemented in one package. The communication interface 310 may include a plurality of RF chains. In addition, the communication interface 310 may perform beamforming.

The communication interface 310 may include different communication modules to process signals of different frequency bands. In addition, the communication interface 310 may include a plurality of communication modules to support a plurality of different wireless access technologies. For example, the different wireless access technologies may include Bluetooth low energy (BLE), wireless fidelity (Wi-Fi), Wi-Fi gigabyte (WiGig), and a cellular network (for example, long-term evolution (LTE)). The different frequency bands may include a super-high frequency (SHF) (e.g., 2.5 GHz and 5 GHz) band and a millimeter wave (mmWave) (e.g., 60 GHz) band.

As described above, the communication interface 310 transmits and receives a signal. Accordingly, the communication interface 310 may be entirely or partially referred to as a transmitter, a receiver, or a transceiver. In the description below, transmission and reception performed via the wireless channel may be used in the meaning that the process described above is performed by the communication interface 310. According to some embodiments of the disclosure, the communication interface 310 may perform functions for transmitting and receiving a signal by using wired communication.

The storage 320 may store data for operations of the terminal 120, e.g., basic programs, application programs, and configuration information. The storage 320 may be configured in a volatile memory, a nonvolatile memory, or a combination of a volatile memory and a nonvolatile memory. The storage 320 may provide the stored data upon request by the controller 330.

The controller 330 may control overall operations of the terminal 120. For example, the controller 330 may transmit and receive a signal via the communication interface 310. The controller 330 may record and read data on and from the storage 320. The controller 330 may perform functions of a protocol stack required in the communication standard. In this regard, the controller 330 may include at least one processor or microprocessor, or may be a part of a processor. A part of the communication interface 310 and the controller 330 may be referred to as a communication processor (CP).

According to an embodiment of the disclosure, the controller 330 may transmit and receive control information to and from the base station 110. For example, the controller 330 may control the terminal 120 to perform operations according to an embodiment of the disclosure described below.

Figure 4A:
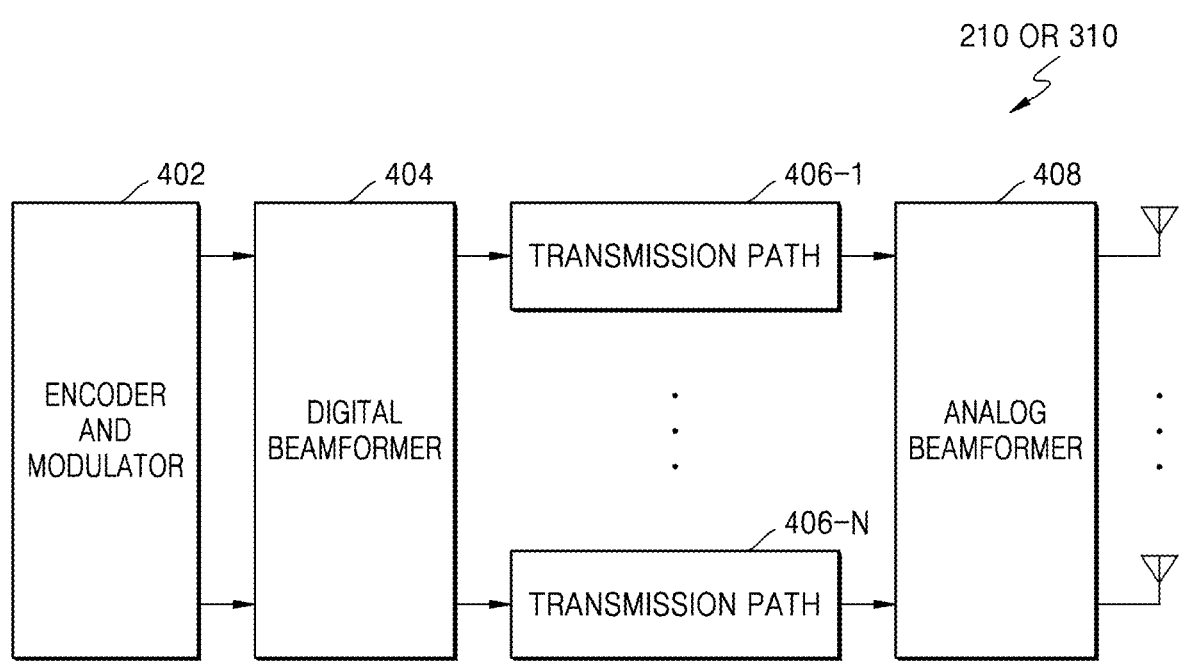
FIG. 4A illustrates a block diagram of a configuration of a communication interface in a wireless communication system, according to an embodiment of the disclosure.
Figure 4B:
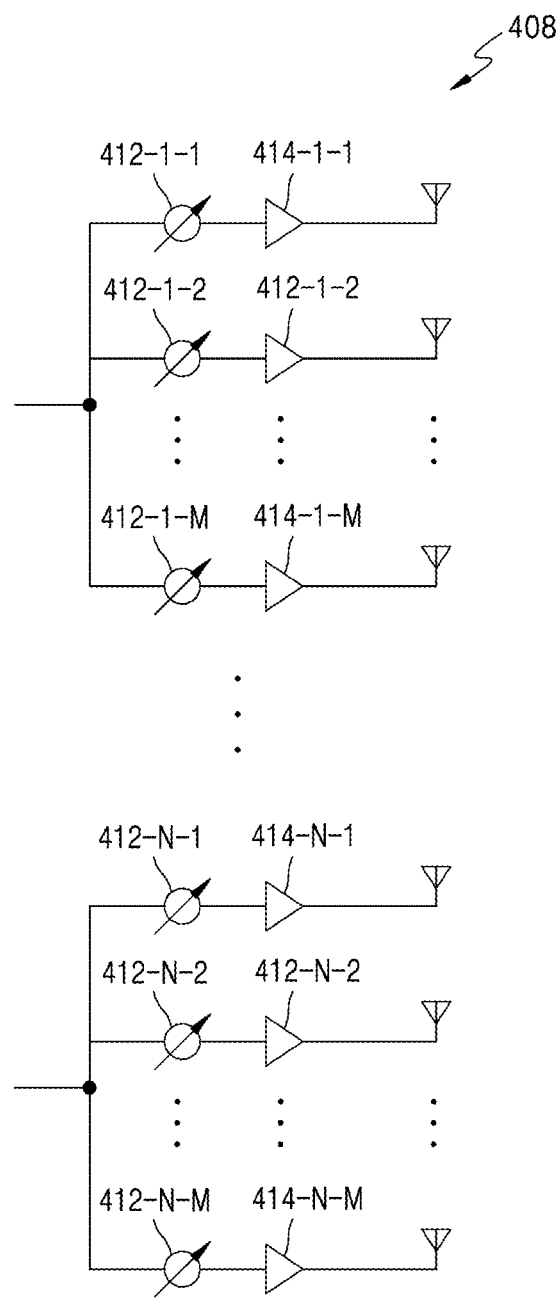
FIG. 4B illustrates an example of a configuration of an analog beamformer of a communication unit in a wireless communication system, according to an embodiment of the disclosure.
Figure 4C:
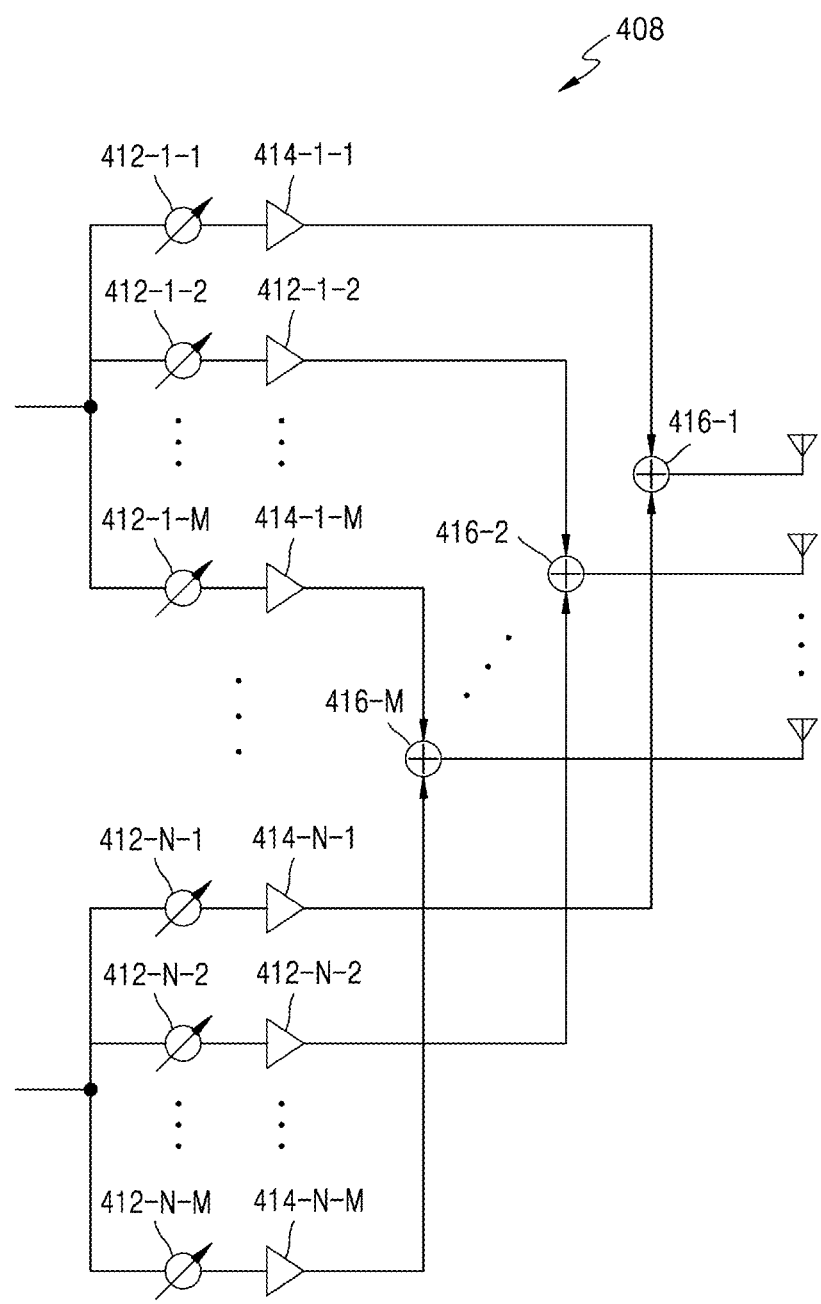
FIG. 4C illustrates another example of a configuration of an analog beamformer of a communication unit in a wireless communication system, according to an embodiment of the disclosure.

FIGS. 4A through 4C illustrate a configuration of a communication interface in a wireless communication system, according to an embodiment of the disclosure. FIGS. 4A through 4C illustrate an example of a detailed configuration of the wireless communication interface 210 of FIG. 2 or the communication interface 310 of FIG. 3. In detail, FIGS. 4A through 4C illustrate components for performing beamforming, as a part of the wireless communication interface 210 of FIG. 2 or the communication interface 310 of FIG. 3.

Referring to FIG. 4A, the wireless communication interface 210 or the communication interface 310 includes an encoder and modulator 402, a digital beamformer 404, a plurality of transmission paths 406-1 through 406-N, and an analog beamformer 408.

The encoder and modulator 402 performs channel encoding. For the channel encoding, at least one of a low-density parity check (LDPC) code, a convolution code, or a polar code may be used. The encoder and modulator 402 generates modulation symbols by performing constellation mapping.

The digital beamformer 404 performs beamforming on a digital signal (for example, the modulation symbols). In this regard, the digital beamformer 404 multiplies the modulation symbols by beamforming weights. Here, the beamforming weight is used to change a size and phase of a signal, and may be referred to as a precoding matrix or a precoder. The digital beamformer 404 outputs the digitally beamformed modulation symbols to the plurality of transmission paths 406-1 through 406-N. Here, according to a multiple input multiple output transmission technique, the modulation symbols may be multiplexed or same modulation symbols may be provided to the plurality of transmission paths 406-1 through 406-N.

The plurality of transmission paths 406-1 through 406-N converts the digitally beamformed digital signals into analog signals. In this regard, the plurality of transmission paths 406-1 through 406-N may each include an inverse fast Fourier transform (IFFT) operator, a cyclic prefix (CP) inserter, a digital-to-analog converter (DAC), and an up-converter. The CP inserter is for orthogonal frequency division multiplexing (OFDM) and may be excluded when another physical layer method (for example, a filter bank multi-carrier (FBMC)) is applied. In other words, the plurality of transmission paths 406-1 through 406-N provide independent signal processes for a plurality of streams generated via the digital beamforming. However, according to an embodiment of the disclosure, some of components of the plurality of transmission paths 406-1 through 406-N may be commonly used.

The analog beamformer 408 performs beamforming on the analog signals. In this regard, the digital beamformer 404 multiples the analog signals by beamforming weights. Here, the beamforming weight is used to change a size and phase of a signal. In detail, the analog beamformer 408 may be configured as shown in FIG. 4B or 4C according to a connection structure between the plurality of transmission paths 406-1 through 406-N and antennas.

Referring to FIG. 4B, the signals input to the analog beamformer 408 are transmitted through the antennas via operations such as phase/size conversion and amplification. Here, the signal of each path is transmitted via different antenna sets, i.e., antenna arrays. Referring to processing of a signal input via a first path, the signal is converted into signal sequences having different or same phases/sizes by phase/size converters 412-1-1 through 412-1-M, amplified by amplifiers 414-1-1 through 414-1-M, and then transmitted via the antennas.

Referring to FIG. 4C, the signals input to the analog beamformer 408 are transmitted through the antennas via operations such as phase/size conversion and amplification. Here, the signal of each path is transmitted via a same antenna set, i.e., antenna array. Referring to processing of a signal input via a first path, the signal is converted into signal sequences having different or same phases/sizes by phase/size converters 412-1-1 through 412-1-M, and amplified by amplifiers 414-1-1 through 414-1-M. Then, to be transmitted via one antenna array, the amplified signals are added by adders 416-1-1 through 416-1-M based on an antenna element, and then transmitted via the antennas.

FIG. 4B illustrates an example in which an independent antenna array is used for each transmission path, and FIG. 4C illustrates an example in which transmission paths share one antenna array. However, according to another embodiment of the disclosure, some transmission paths may use independent antenna arrays and remaining transmission paths may share one antenna array. In addition, according to another embodiment of the disclosure, a structure that is adaptively changeable according to a situation may be used by applying a switchable structure between transmission paths and antenna arrays.

As a representative example of a broadband wireless communication system, an LTE system has adopted an OFDM scheme in a downlink (DL) and has adopted a single carrier frequency division multiple access (SC-FDMA) scheme in an uplink (UL). The multiple access scheme as described above assigns and operates time-frequency resources for transmitting data or control information for each user to prevent the time-frequency resources from overlapping with each other, that is, establish orthogonality, thereby distinguishing the data or the control information for each user.

Figure 5:
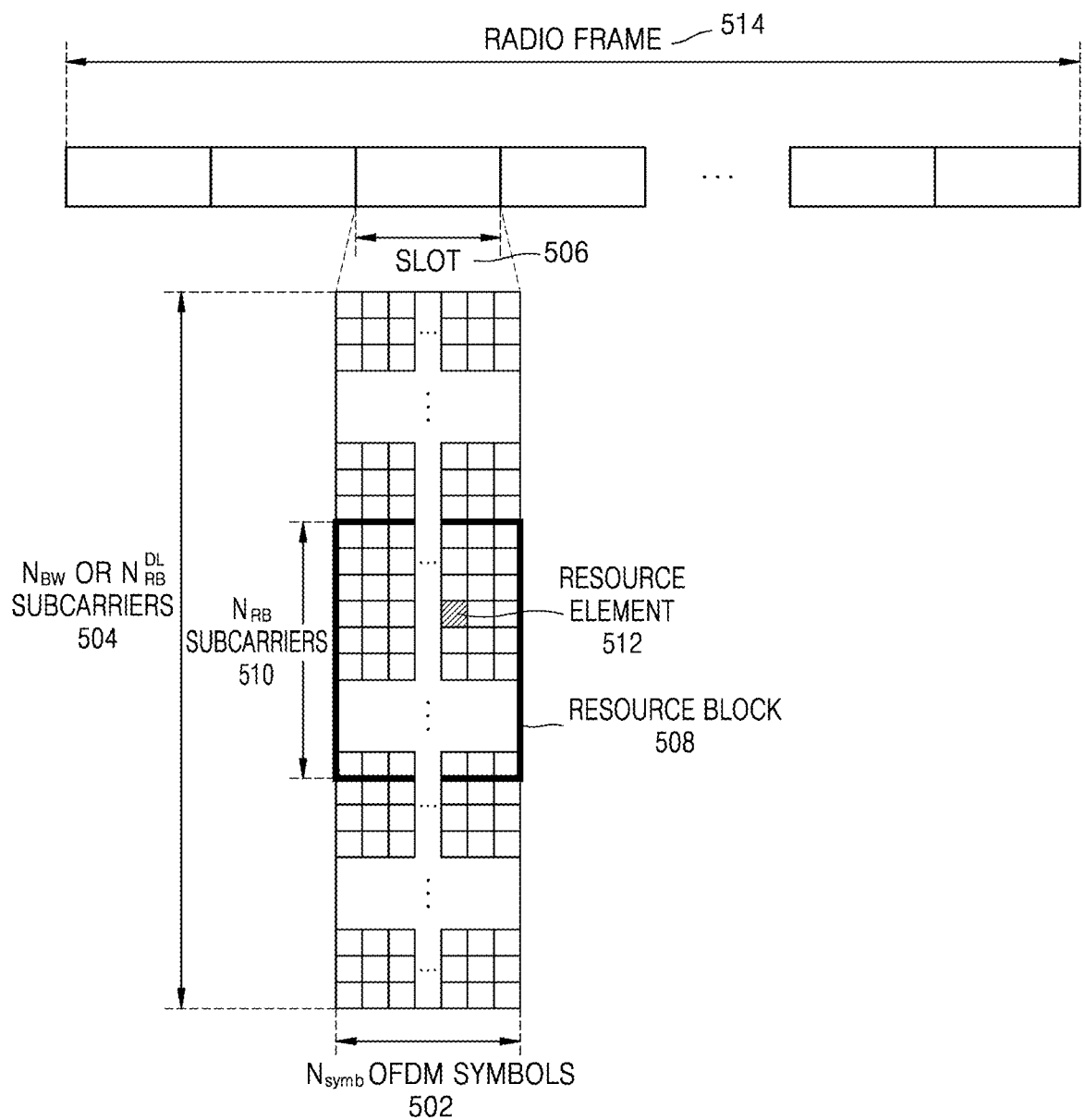
FIG. 5 illustrates a structure of resource of a time-frequency domain in a wireless communication system, according to an embodiment of the disclosure.

FIG. 5 illustrates a structure of resource of a time-frequency domain in a wireless communication system, according to an embodiment of the disclosure. FIG. 5 illustrates a base structure of the time-frequency domain that is a radio resource region where data or a control channel is transmitted from DL or UL.

In FIG. 5, a horizontal axis represents a time domain and a vertical axis represents a frequency domain. A minimum transmission unit in the time domain is an OFDM symbol, and $N_{symb}$ OFDM symbols 502 configure one slot 506. A length of a subframe is defined to be 1.0 ms, and a length of a radio frame 514 is defined to be 10 ms. A minimum transmission unit in the frequency domain is a subcarrier, and a transmission bandwidth of a whole system may be composed of $N_{BW}$ subcarriers 504 in total. Specific numerical values such as $N_{symb}$ and $N_{BW}$ may vary according to a system.

A base unit of a resource in the time-frequency domain is a resource element (RE) 512, and may be indicated by an OFDM symbol index and a subcarrier index. A resource block (RB) 508 or a physical resource block (PRB) is defined as $N_{symb}$ successive OFDM symbols 502 in the time domain and $N_{RB}$ successive subcarriers 510 in the frequency domain. Accordingly, one RB 508 may be composed of $N_{symb} \times N_{RB}$ REs 512. Generally, a minimum transmission unit of data is an RB. In a new radio (NR) system, $N_{symb}=14$ and $N_{RB}=12$ in general, and $N_{BW}$ and $N_{RB}$ are proportional to a system transmission bandwidth. A data rate may increase in proportion to the number of RBs scheduled to a terminal. In the NR system, in a case of a frequency division duplex (FDD) system operating DL and UL according to frequencies, a DL transmission bandwidth and a UL transmission bandwidth may be different from each other. A channel bandwidth indicates an RF bandwidth corresponding to the system transmission bandwidth. Table 1 and Table 2 show some of corresponding relationships between a system transmission bandwidth, a subcarrier spacing (SCS), and a channel bandwidth defined in the NR system in a frequency band less than 6 GHz and a frequency band greater than 6 GHz. For example, in the NR system having a 100 MHz channel width at 30 kHz SCS, a transmission bandwidth may be composed of 273 RBs. In Tables 1 and 2, N/A may indicate a combination of a bandwidth and a subcarrier, which is not supported in the NR system.

TABLE 1

| Channel Bandwidth [MHz] | SCS | 5 | 10 | 20 | 50 | 80 | 100 |
|---|---|---|---|---|---|---|---|
| Configuration of Transmission Bandwidth ($N_{RB}$) | 15 kHz | 25 | 52 | 106 | 207 | N/A | N/A |
| | 30 kHz | 11 | 24 | 51 | 133 | 217 | 273 |
| | 60 kHz | N/A | 11 | 24 | 65 | 107 | 135 |

TABLE 2

| | | Channel Bandwidth [MHz] | | | |
|---|---|---|---|---|---|
| | SCS | 50 | 100 | 200 | 400 |
| Configuration of Transmission Bandwidth ($N_{RB}$) | 60 kHz | 66 | 132 | 264 | N/A |
| | 120 kHz | 32 | 66 | 132 | 264 |

In the LTE system, scheduling information regarding DL data or UL data is transferred from a base station to the terminal through DL control information (DCI). The DCI is defined in any one of various formats, and it may be determined, depending on each format, whether the DCI is UL grant that is scheduling information for UL data or DL grant that is scheduling information for DL data, whether the DCI is compact DCI with control information having a small size, whether spatial multiplexing using multiple antennas is applied, and whether the DCI is for power control. For example, DCI format 1-1 that is scheduling control information for DL data may include at least one of items shown in Table 3 below.

TABLE 3

| Item | Content |
|---|---|
| Carrier indicator | Indicates from which frequency carrier is transmitted. |
| DCI format indicator | Distinguishes whether DCI is for DL or UL. |
| Bandwidth part (BWP) indicator | Indicates from which BWP is transmitted. |
| Frequency domain resource assignment | Indicates RB of frequency domain assigned for data transmission. Represented resource is determined depending on system bandwidth and resource assignment scheme |
| Time domain resource assignment | Indicates from which OFDM symbol of which slot data-related channel is to be transmitted. |
| VRB-to-PRB mapping | Indicates how to map virtual RB (VRB) index and physical RB (PRB) index. |
| Modulation and coding scheme (MCS) | Indicates modulation scheme and code rate used for data transmission. In other words, indicates information indicating QPSK, 16QAM, 64QAM, or 256QAM together with code rate value for indicating TBS and channel coding information. |
| Codeblock group (CBG) transmission information | When CBG retransmission is configured, indicates information about which CBG is transmitted. |

TABLE 3-continued

| Item | Content |
| --- | --- |
| HARQ process number | Indicates process number of HARQ. |
| New data indicator (NDI) | Indicates HARQ initial transmission or retransmission. |
| Redundancy version (RV) | Indicates redundancy version of HARQ. |
| Transmit power control command (TPC) for physical uplink control channel (PUCCH) | Indicates transmit power control command for PUCCH that is uplink control channel. |

In Table 3, in a case of physical DL shared channel (PDSCH), time domain resource assignment may be represented by information about a slot where PDSCH is transmitted, a start symbol location S from the slot, and a number L of symbols to which PDSCH is mapped. Here, S may be a relative location from a start of the slot, L may be the number of consecutive symbols, and S and L may be determined from a start and length indicator value (SLIV) defined as shown in Table 4.

TABLE 4 if (L−1) ≤ 7 then
   SLIV=14 · (L−1)+S
else
   SLIV=14 · (14−L+11)+(14−1−S)
where 0<L ≤ 14−S In the NR system, generally, an SLIV value and information about a corresponding relationship between a PDSCH or physical UL shared channel (PUSCH) mapping type and a slot where a PDSCH or PUSCH is transmitted may be configured via radio resource control (RRC) configuration. Then, by using the time domain resource assignment of the DCI, an index value defined in the configured corresponding relationship is indicated so as to transmit, by a base station to a terminal, the SLIV value, the PDSCH or PUSCH mapping type, and the information about the slot where the PDSCH or PUSCH is transmitted.

In the NR system, the PDSCH or PUSCH mapping type is defined to be a type A or a type B. When the PDSCH or PUSCH mapping type is the type A, a demodulation reference signal (DMRS) symbol starts from a second or third OFDM symbol in the slot. When the PDSCH or PUSCH mapping type is the type B, a DMRS symbol starts from a first OFDM symbol of a time domain resource assigned via PUSCH transmission.

The DCI may be transmitted from a physical downlink control channel (PDCCH) via channel coding and modulation. The PDCCH may be used to refer to control information itself instead of a channel. In general, the DCI is scrambled by a specific radio network temporary identifier (RNTI) or terminal identity independently with respect to each terminal, is added with a cyclic redundancy check (CRC), is channel-coded, and then is configured as an independent PDCCH to be transmitted. The PDCCH is mapped on a control resource set (CORESET) configured in the terminal.

The DL data may be transmitted from the PDSCH that is a physical channel for DL data transmission. The PDSCH may be transmitted after a control channel transmission interval, and scheduling information, such as a concrete mapping location or a modulation scheme in the frequency domain, may be indicated by the DCI transmitted on the PDCCH. The base station notifies the terminal of a modulation scheme applied to the PDSCH to be transmitted, and a target code rate or a size of data (for example, a transport block size (TBS)) to be transmitted, by using an MCS among the control information constituting the DCI. According to an embodiment of the disclosure, the MCS may be composed of 5 bits, or may be composed of more or fewer bits than 5 bits. The TBS corresponds to a size before channel coding for error correction is applied to a transport block (TB) that is data to be transmitted by the base station.

In an embodiment of the disclosure, a TB may include a medium access control (MAC) header, an MAC control element (CE), and one or more MAC service data units (SDUs), and padding bits. Alternatively, the TB may indicate a data unit or an MAC protocol data unit (PDU) from an MAC layer to a physical layer.

The modulation scheme supported in the NR system is quadrature phase shift keying (QPSK), 16 quadrature amplitude modulation (QAM), 64QAM, or 256QAM and a respective modulation order (Qm) may be 2, 4, 6, or 8. In other words, 2 bits per symbol may be transmitted in QPSK, 4 bits per symbol may be transmitted in 16QAM, 6 bits per symbol may be transmitted in 64QAM, 8 bits per symbol may be transmitted in 256QAM, and when 1024QAM is supported, 10 bits per symbol may be mapped and transmitted in 1024QAM.

Figure 6A:
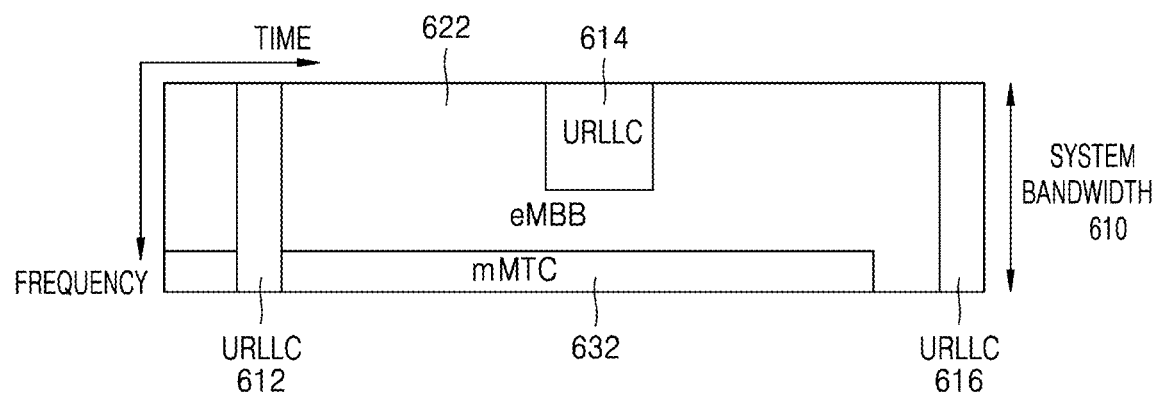
FIG. 6A illustrates an example of assigning data for each service to a frequency-time resource in a wireless communication system, according to an embodiment of the disclosure.
Figure 6B:
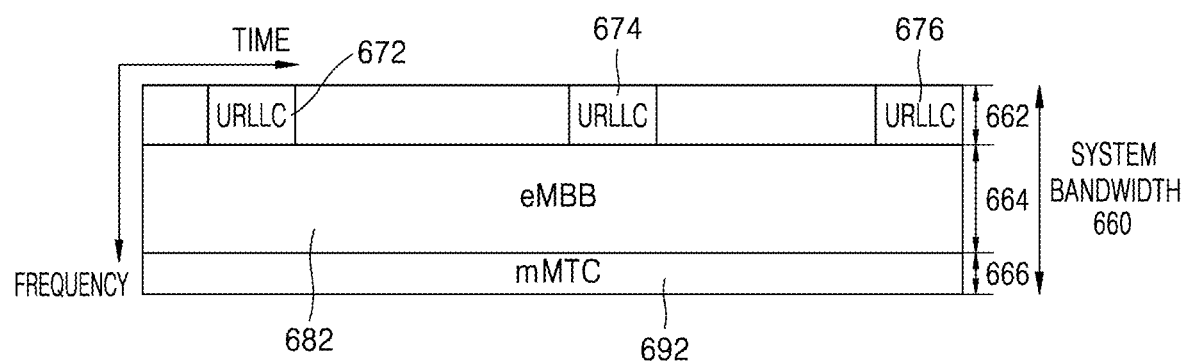
FIG. 6B illustrates another example of assigning data for each service to a frequency-time resource in a wireless communication system, according to an embodiment of the disclosure.

In terms of a service, the NR system is being designed such that various services are freely multiplexed in time and frequency resources, and accordingly, waveform/numerology, a reference signal, and the like may be dynamically or freely adjusted when necessary. To provide an optimum service to a terminal in wireless communication, data transmission optimized via measurement of quality and interference of a channel is important, and thus channel state measurement is mandatory. However, unlike 4G communication in which channel and interference characteristics do not largely change depending on a frequency resource, channel and interference characteristics of a 5G channel largely change depending on a service, and thus a subset of a frequency resource group (FRG) needs to be supported to divide and measure services. In the NR system, types of supported services may be divided into enhanced mobile broadband (eMBB), massive machine type communications (mMTC), and ultra-reliable and low-latency communications (URLLC). The eMBB may be a service aiming at high-speed transmission of high capacity data, the mMTC may be a service aiming at terminal power minimization and multiple terminal connections, and the URLLC may be a service aiming at high reliability and low delay. Different requirements may be applied depending on types of services applied to the terminal. Examples of resource distribution of services are as shown in FIGS. 6A and 6B. Hereinafter, a scheme in which frequency and time resources are assigned for information transmission in each system is identified with reference to FIGS. 6A and 6B.

FIG. 6A illustrates an example of assigning data for each service to a frequency-time resource in a wireless communication system, according to an embodiment of the disclosure.

Referring to FIG. 6A, resources are assigned for an eMBB 622, URLLCs 612, 614, and 616, and mMTC 632 in a whole system frequency band (system bandwidth) 610. When data of the URLLCs 612, 614, and 616 is generated while data of the eMBB 622 and data of the mMTC 632 are assigned to a certain frequency band and transmitted, the data of URLLCs 612, 614, and 616 may be transmitted by emptying a portion pre-assigned for the eMBB 622 and mMTC 632 or by not transmitting the data of eMBB 622 and the data of mMTC 632. Because URLLC requires low latency, a resource for transmitting the data of URLLCs 612, 614, and 616 may be assigned to a part of a resource assigned to the eMBB 622. Obviously, when the URLLCs 612, 614, and 616 is additionally assigned and transmitted by using a resource to which eMBB 622 is assigned, the data of eMBB 622 may not be transmitted from a redundant frequency-time resource, and thus transmission performance of the data of eMBB 622 may be low. In other words, in this case, transmission of the data of eMBB 622 may fail due to assignment of a resource for the URLLCs 612, 614, and 616. Such a method of FIG. 6A may be referred to as preemption.

FIG. 6B illustrates another example of assigning data for each service to a frequency-time resource in a wireless communication system, according to an embodiment of the disclosure.

FIG. 6B illustrates an example in which services are provided respectively from sub-bands 662, 664, and 666 obtained by splitting a whole system frequency band (system bandwidth) 660. In detail, the sub-band 662 is used for transmission of data of URLLCs 672, 674, and 676, the sub-band 664 is used for transmission of data of eMBB 682, and the sub-band 666 is used for transmission of data of mMTC 692. Information related to configuration of the sub-bands 662, 664, and 666 may be pre-determined and the information may be transmitted from a base station to a terminal via higher layer signaling. Alternatively, a base station or a network node may arbitrarily divide the information related to the sub-bands 662, 664, and 666 and provide services, without transmitting configuration information of sub-bands to a terminal.

According to an embodiment of the disclosure, a length of transmission time interval (TTI) used in URLLC transmission may be shorter than a length of TTI used in eMBB or mMTC transmission. Also, a response of information related to URLLC may be transmitted faster compared to eMBB or mMTC, and accordingly, a terminal using an URLLC service may transmit or receive information with low latency.

A structure of a physical layer channel used for each type to transmit the three types of services or data described above may vary. For example, at least one of lengths of TTI, assignment units of a frequency source, structures of a control channel, or mapping methods of data may be different. The three types of services and data have been described above, but there may be more types of services and corresponding data. In this case as well, various embodiments of the disclosure described below may be executed.

Figure 6C:
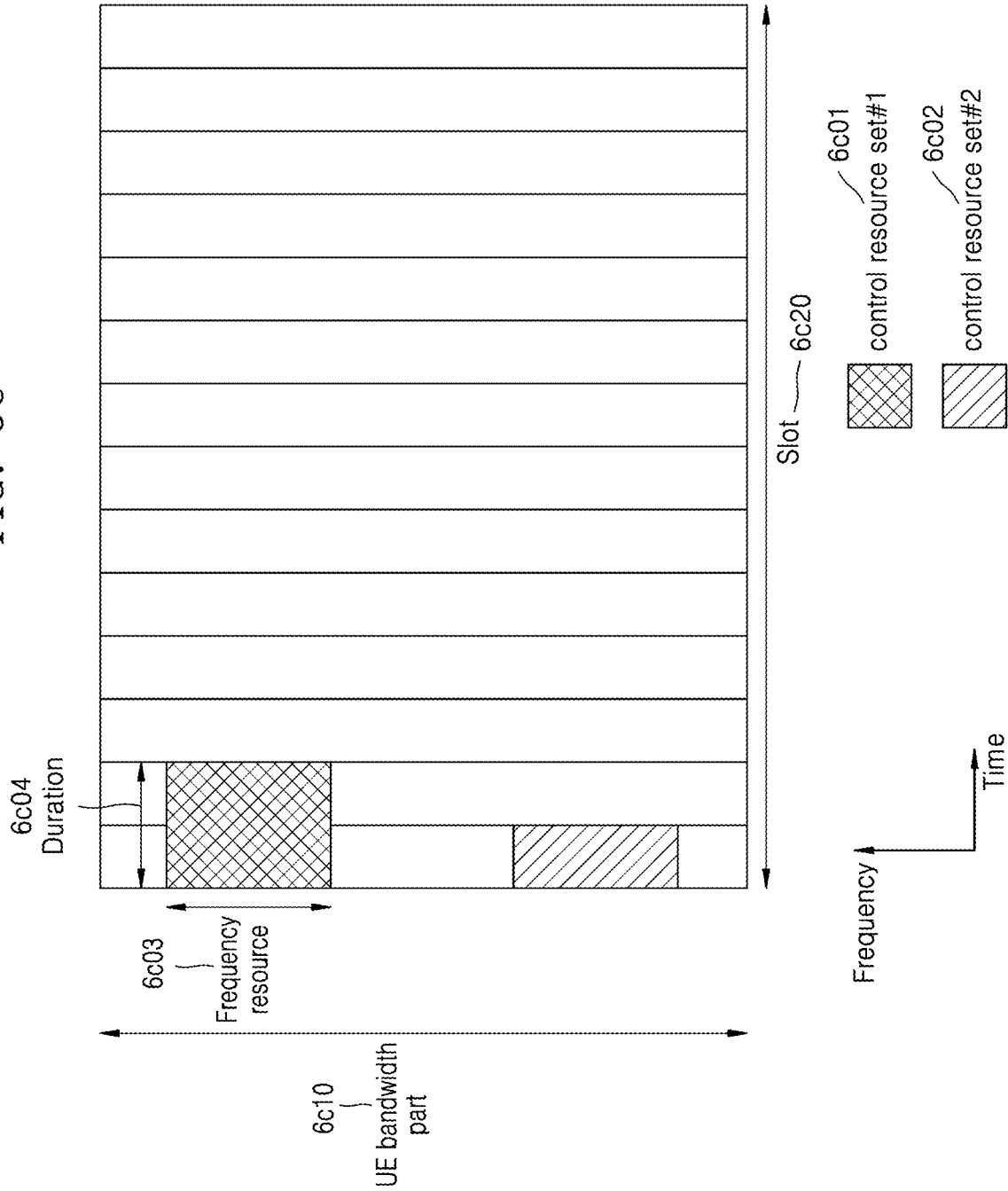
FIG. 6C illustrates an example of a control resource set (CORESET) on which a downlink control channel is transmitted in a wireless communication system, according to an embodiment of the disclosure.

FIG. 6C illustrates an example of a CORESET on which a DL control channel is transmitted in a wireless communication system, according to an embodiment of the disclosure. FIG. 6C illustrates an example in which a bandwidth part of a terminal (UE bandwidth part) 6c10 is configured in a frequency axis and two CORESETs (a CORESET #1 6c01 and a CORESET #2 6c02) in one slot 6c20 are configured in a time axis. The CORESETs #1 and #2 6c01 and 6c02 may be configured in a specific frequency resource 6c03 within the UE bandwidth part 6c10 in the frequency axis. One or a plurality of OFDM symbols may be configured in the time axis and may be defined as a CORESET duration 6c04. Referring to the example shown in FIG. 6C, the CORESET #1 6c01 may be configured as a CORESET length of two symbols and the CORESET #2 6c02 may be configured as a CORESET length of one symbol.

In 5G described above, a CORESET may be configured to a UE by a base station via higher layer signaling (for example, system information, master information block (MIB), or radio resource control (RRC) signaling). The configuring of the CORESET to the UE indicates providing information, such as a CORESET identity, a frequency location of the CORESET, and a symbol length of the CORESET. For example, information provided to configure the CORESET is shown in Table 5.

TABLE 5

```
ControlResourceSet ::=                    SEQUENCE {
    -- Corresponds to L1 parameter 'CORESET-ID'
    controlResourceSetId          ControlResourceSetId,
    (Control Resource Set Identity)
    frequencyDomainResources      BIT STRING (SIZE (45)),
    (Frequency Domain Resource Assignment Information)
    duration                      INTEGER (1..maxCoReSetDuration),
    (Time Domain Resource Assignment Information)
    cce-REG-MappingType           CHOICE {
    (CCE-to-REG Mapping Type)
        interleaved               SEQUENCE {
            reg-BundleSize        ENUMERATED {n2, n3, n6},
        (REG Bundle Size)
            precoderGranularity   ENUMERATED   {sameAsREG-bundle,
        allContiguousRBs},
            interleaverSize       ENUMERATED {n2, n3, n6}
            (Interleaver Size)
            shiftIndex
            INTEGER(0..maxNrofPhysicalResourceBlocks-1)
            OPTIONAL
            (Interleaver Shift)
        },
        nonInterleaved            NULL
    },
    tci-StatesPDCCH               SEQUENCE(SIZE    (1..maxNrofTCI-
        StatesPDCCH)) OF TCI-StateId    OPTIONAL,
    (QCL Configuration Information)
    tci-PresentInDCI              ENUMERATED {enabled}
                                  OPTIONAL, -- Need S
}
```

In the 5G, a CORESET may consist of $N_{RB}^{CORESET}$ RBs in a frequency domain (axis) and $N_{symb}^{CORESET} \in \{1, 2, 3\}$ symbols in a time domain. One control channel element (CCE) may consist of six resource element groups (REGs), and the REG may be defined as 1 RB for one OFDM symbol. In one CORESET, the REGs may be indexed in a time-first order starting from an REG index 0, from a first OFDM symbol, i.e., a lowest RB.

In the 5G, an interleaved method and a non-interleaved method are supported as a transmitting method for a PDCCH. The base station may configure, to the UE via higher layer signaling, interleaved or non-interleaved transmission for each CORESET. The interleaving may be performed in units of REG bundles. An REG bundle may be defined by one REG or a set of a plurality of REGs. The UE may determine a CCE-to-REG mapping type in the CORESET as follows, based on the interleaved or non-interleaved transmission configured from the base station.

Figure 6D:
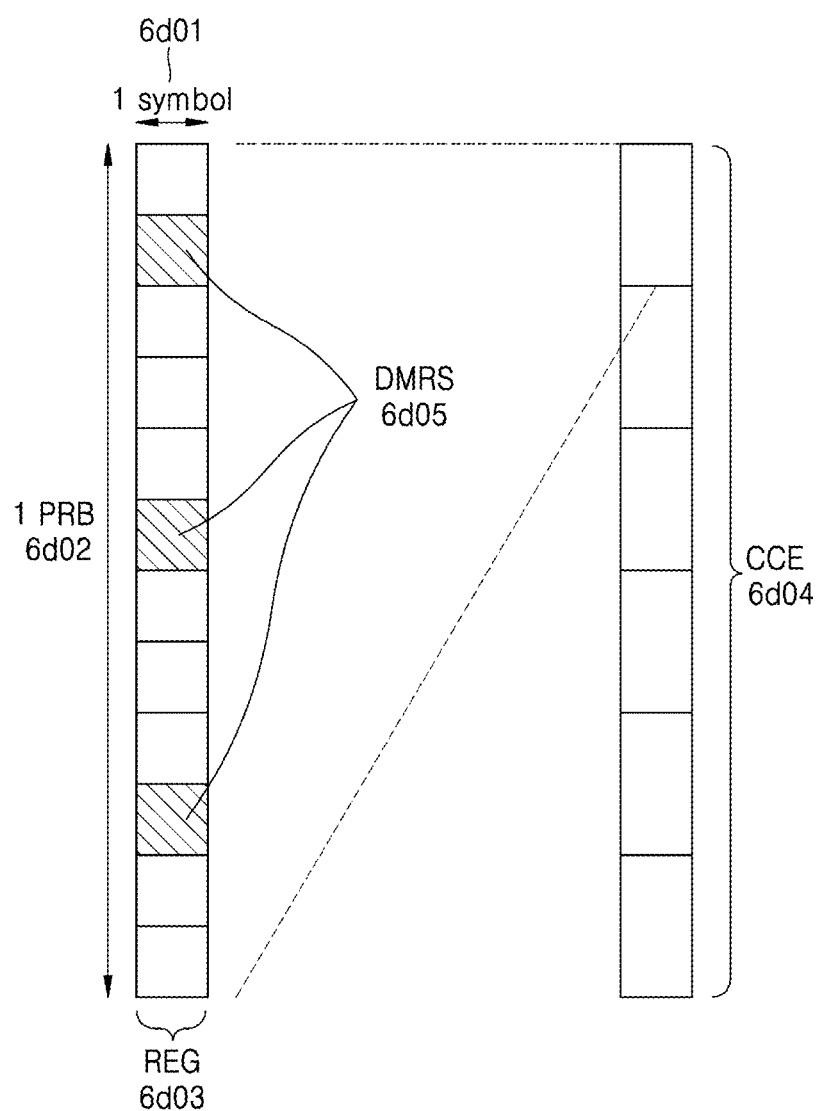
FIG. 6D illustrates an example in which resource elements (REs) to which downlink control information (DCI) is mapped and a region to which a demodulation reference signal (DMRS) that is a reference signal for decoding the Res is mapped are both included in a resource element group (REG) that is a base unit of a downlink control channel, according to an embodiment of the disclosure.

A base unit of a DL control channel, i.e., an REG 6d03 of FIG. 6D, may include both REs to which DCI is mapped and a region to which a DMRS 6d05 that is a reference signal for decoding the REs is mapped. As shown in FIG. 6D, three DMRSs 6d05 may be transmitted within one REG 6d03. The number of CCEs required to transmit a PDCCH may be 1, 2, 4, 8, or 16 depending on an aggregation level (AL), and the different numbers of CCEs may be used to implement link adaptation of a DL control channel. For example, when AL=L, one DL control channel may be transmitted via L CCEs. A UE needs to detect a signal while information about a DL control channel is unknown, and a search space indicating a set of CCEs is defined for blind decoding. The search space is a set of DL control channel candidates including CCEs that are attempted to be decoded by the UE on a given AL, and the UE may have a plurality of search spaces because there are several ALs forming one group by using 1, 2, 4, 8, or 16 CCEs. A search space set may be defined as a set of search spaces in all configured ALs.

The search spaces may be classified into a common search space and a UE-specific search space. UEs of a certain group or all UEs may monitor a common search space of a PDCCH to receive cell-common control information, such as a paging message or dynamic scheduling for system information. For example, PDSCH scheduling assignment information for transmission of a system information block (SIB) including operator information of a cell or the like may be received by monitoring the common search space of the PDCCH. The common search space may be defined as a set of pre-promised CCEs because the certain group of UEs or all UEs need to receive the PDCCH. Scheduling assignment information for a UE-specific PDSCH or PUSCH may be received by monitoring a UE-specific search space of the PDCCH. The UE-specific search space may be UE-specifically defined as a function of an identity of a UE and various system parameters.

In the 5G, a parameter for a search space of the PDCCH may be configured to the UE by a base station via higher layer signaling (for example, SIB, MIB, or RRC signaling). For example, the base station may configure, to the UE, the number of PDCCH candidates in each of the L ALs, a monitoring period for the search space, a monitoring occasion of a symbol unit within a slot for the search space, a search space type (common search space or UE-specific search space), a combination of a DCI format and RNTI to be monitored in the search space, and a CORESET index for monitoring the search space. For example, the parameter for the search space of the PDCCH may include following pieces of information as shown in Table 6.

TABLE 6

```
SearchSpace ::=                         SEQUENCE {
    -- Identity of the search space. SearchSpaceId = 0 identifies the SearchSpace
       configured via PBCH (MIB) or ServingCellConfigCommon.
    searchSpaceId                       SearchSpaceId,
    (Search Space Identity)
    controlResourceSetId                ControlResourceSetId,
    (Control Resource Set Identity)
    monitoringSlotPeriodicityAndOffset  CHOICE {
    (Monitoring Slot Level Period)
        sl1                             NULL,
        sl2                             INTEGER (0..1),
        sl4                             INTEGER (0..3),
        sl5                             INTEGER (0..4),
        sl8                             INTEGER (0..7),
        sl10                            INTEGER (0..9),
        sl16                            INTEGER (0..15),
        sl20                            INTEGER (0..19),
        sl40                            INTEGER (0..39),
        sl80        INTEGER (0..79),
        sl160       INTEGER (0..159),
        sl320       INTEGER (0..319),
        sl640       INTEGER (0..639),
        sl1280      INTEGER (0..1279),
        sl2560      INTEGER (0..2559)
    }
                                        OPTIONAL,
    duration(Monitoring Length)         INTEGER (2..2559)
    monitoringSymbolsWithinSlot             BIT STRING (SIZE (14))
                                        OPTIONAL,
    (Monitoring Symbol within Slot)
    nrofCandidates                      SEQUENCE {
    (Number of PDCCH Candidates per Aggregation Level)
        aggregationLevel1               ENUMERATED {n0, n1, n2, n3, n4, n5, n6, n8},
        aggregationLevel2               ENUMERATED {n0, n1, n2, n3, n4, n5, n6, n8},
        aggregationLevel4               ENUMERATED {n0, n1, n2, n3, n4, n5, n6, n8},
        aggregationLevel8               ENUMERATED {n0, n1, n2, n3, n4, n5, n6, n8},
        aggregationLevel16              ENUMERATED {n0, n1, n2, n3, n4, n5, n6, n8}
    },
```

TABLE 6-continued

```
searchSpaceType                     CHOICE {
(Search Space Type)
    -- Configures this search space as common search space (CSS) and DCI formats
    to monitor.
    common                          SEQUENCE {
    (Common Search Space)
}
    ue-Specific                     SEQUENCE {
    (UE-Specific Search Space)
        --Indicates whether the UE monitors in this USS for DCI formats 0-0 and 1-
    0 or for formats 0-1 and 1-1.
        formats                     ENUMERATED   {formats0-0-And-1-0,
    formats0-1-And-1-1},
        ...
    }
```

The base station may configure, to the UE, one or a plurality of search space sets, according to configuration information. According to an embodiment of the disclosure, the base station may configure, to the UE, a search space set 1 and a search space set 2. The search space set 1 may be configured such that the UE monitors a DCI format A scrambled by X-RNTI in the common search space, and the search space set 2 may be configured such that the UE monitors a DCI format B scrambled by Y-RNTI in the UE-specific search space.

According to the configuration information, there may be one or a plurality of search space sets in the common search space or the UE-specific search space. For example, a search space set #1 and a search space set #2 may be configured as the common search space, and a search space set #3 and a search space set #4 may be configured as the UE-specific search space.

In the common search space, a combination of a DCI format and RNTI below may be monitored. However, the combination is not limited to following examples.

DCI format 0_0/1_0 with CRC scrambled by C-RNTI, CS-RNTI, SP-CSI-RNTI, RA-RNTI, TC-RNTI, P-RNTI, SI-RNTI.

DCI format 2_0 with CRC scrambled by SFI-RNTI.

DCI format 2_1 with CRC scrambled by INT-RNTI.

DCI format 2_2 with CRC scrambled by TPC-PUSCH-RNTI, TPC-PUCCH-RNTI.

DCI format 2_3 with CRC scrambled by TPC-SRS-RNTI.

DCI format 2_4 with CRC scrambled by CI-RNTI.

DCI format 2_5 with CRC scrambled by AI-RNTI.

DCI format 2_6 with CRC scrambled by PS-RNTI.

In the UE-specific search space, a combination of a DCI format and RNTI below may be monitored. However, the combination is not limited to following examples.

DCI format 0_0/1_0 with CRC scrambled by C-RNTI, CS-RNTI, TC-RNTI.

DCI format 1_0/1_1 with CRC scrambled by C-RNTI, CS-RNTI, TC-RNTI.

The specified RNTIs may follow below definitions and usages.

Cell RNTI (C-RNTI): for scheduling UE-specific PDSCH.

Temporary cell RNTI (TC-RNTI): for scheduling UE-specific PDSCH.

Configured scheduling RNTI (CS-RNTI): for scheduling quasi-statically configured UE-specific PDSCH.

Random access RNTI (RA-RNTI): for scheduling PDSCH during random access.

Paging RNTI (P-RNTI): for scheduling PDSCH where paging is transmitted.

System information RNTI (SI-RNTI): for scheduling PDSCH where system information is transmitted.

Interruption RNTI (INT-RNTI): for notifying puncturing of PDSCH.

Transmit power control for PUSCH RNTI (TPC-PUSCH-RNTI): for indicating power adjustment command for PUSCH Transmit power control for PUCCH RNTI (TPC-PUCCH-RNTI): for indicating power adjustment command for PUCCH.

Transmit power control for SRS RNTI (TPC-SRS-RNTI): for indicating power adjustment command for SRS Cancellation indicator RNTI (CI-RNTI): for indicating PUSCH transmission cancellation.

Availability indicator RNTI (AI-RNTI): for indicating availability of soft resources.

Power saving RNTI (PS-RNTI): for indicating power consumption reduction command in DRX inactive section.

The DCI formats specified above may follow definitions of Table 7 below.

TABLE 7

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |
| 2_4 | Notifying the PRB(s) and OFDM symbol(s) where UE cancels the corresponding UL transmission from the UE |
| 2_5 | Notifying the availability of soft resources |
| 2_6 | Notifying the power saving information outside DRX Active Time for one or more UEs |

In the 5G, a CORESET p and a search space of an AL L in a search space set s may be represented as an equation below.

$$L \cdot \left\{ \left( Y_{p,n_{s,f}^\mu} + \left\lfloor \frac{m_{s,n_{CI}} \cdot N_{CCE,p}}{L \cdot M_{p,s,max}^{(L)}} \right\rfloor + n_{CI} \right) \mod \lfloor N_{CCE,p}/L \rfloor \right\} + i$$

L: AL.

$n_{CI}$: carrier index.

$N_{CCE,p}$: a total number of CCEs present within CORESET p.

$n_{s,f}^{\mu}$: slot index.

$M_{p,s,max}^{(L)}$: a number of PDCCH candidates of AL L.

$m_{s,n_{CI}}=0, \ldots, M_{p,s,max}^{(L)} -1$: index of PDCCH candidate of AL L $i=0, \ldots, L-1$.

PDCCH-to-PUSCH slot timing (corresponds to a time interval in a slot unit between a time point when the PDCCH is received and a time point when the PUSCH scheduled by the received PDCCH is transmitted, indicated by K2), information about a location and length of a start symbol where the PDSCH or PUSCH is scheduled within a slot, and a mapping type of the PDCCH or PUSCH. For example, following pieces of information may be notified from the base station to the UE as shown in Table 8.

TABLE 8

PDSCH-TimeDomainResourceAllocationList information element

| | |
|---|---|
| PDSCH-TimeDomainResourceAllocationList ::= OF PDSCH-TimeDomainResourceAllocation | SEQUENCE (SIZE(1..maxNrofDL-Allocations)) |
| PDSCH-TimeDomainResourceAllocation ::= | SEQUENCE { |
| k0 | INTEGER(0..32) |
| OPTIONAL, -- Need S | |
| (PDCCH-to-PDSCH Timing, Slot Unit) | |
| mappingtype | ENUMERATED {typeA, typeB}, |
| (PDSCH Mapping Type) | |
| startSymbolAndLength | INTEGER (0..127) |
| (Start Symbol and Length of PDSCH) | |
| } | |

PUSCH-TimeDomainResourceAllocation information element

| | | |
|---|---|---|
| PUSCH-TimeDomainResourceAllocationList ::= Allocations)) OF PUSCH-TimeDomainResourceAllocation | SEQUENCE (SIZE(1..maxNrofUL- | |
| PUSCH-TimeDomainResourceAllocation ::= | SEQUENCE { | |
| k2 | INTEGER(0..32) | OPTIONAL, -- |
| Need S | | |
| (PDCCH-to-PUSCH Timing, Slot Unit) | | |
| mappingType | ENUMERATED {typeA, typeB}, | |
| (PUSCH Mapping Type) | | |
| startSymbolAndLength | INTEGER (0..127) | |
| (Start Symbol and Length of PUSCH) | | |
| } | | |

$$Y_{p,n_{s,f}^{\mu}} = \left( A_p \cdot Y_{p,n_{s,f}^{\mu}-1} \right)$$

mod D, ..., $Y_{p,-1}=n_{RNTI} \neq 0$, $A_0=39827$, $A_1=39829$, $A_2=39839$, $D=65537$.

$n_{RNTI}$: UE Identity.

A value of $Y_{p,n_{s,f}^{\mu}}$ may correspond to 0 in the common search space.

The value of $Y_{p,n_{s,f}^{\mu}}$ may correspond to a value changing according to the UE identity (C-RNTI or ID configured to the UE by the base station) and a time index, in the UE-specific search space.

Hereinafter, a method of assigning a time domain resource for a data channel in a 5G communication system will be described.

A base station may configure, to a UE, a table regarding time domain resource assignment information for a PDSCH and a PUSCH, via higher layer signaling (for example, RRC signaling). For the PDSCH, a table consisting of up to maxNrofDL-Allocations=16 entries may be configured, and for the PUSCH, a table consisting of up to maxNrofUL-Allocations=16 entries may be configured. The time domain resource assignment information may include, for example, a PDCCH-to-PDSCH slot timing (corresponds to a time interval in a slot unit between a time point when the PDCCH is received and a time point when the PDSCH scheduled by the received PDCCH is transmitted, indicated by K0), or a The base station may notify the UE of one of the entries in the table of the time domain resource assignment information, via L1 signaling (for example, DCI) (for example, indicated via a 'time domain resource assignment' field within DCI). The UE may obtain the time domain resource assignment information for the PDSCH or PUSCH, based on the DCI received from the base station.

Hereinafter, a method of assigning a frequency domain resource for a data channel in a 5G communication system will be described.

In the 5G, two types, i.e., a resource assignment type 0 and a resource assignment type 1, are supported as a method of indicating frequency domain resource assignment information for a PDSCH and a PUSCH.

Resource Assignment Type 0.

RB assignment information may be notified from a base station to a UE in a form of a bitmap for a resource block group (RBG). Here, the RBG may consist of a set of consecutive virtual RBs (VRBs), and a size P of the RBG may be determined based on a value configured in a higher layer parameter rbg-Size and a size value of a bandwidth part defined in Table 9 below.

TABLE 9

| | Nominal RBG size P | |
|---|---|---|
| Bandwidth Part Size | Configuration 1 | Configuration 2 |
| 1-36 | 2 | 4 |
| 37-72 | 4 | 8 |
| 73-144 | 8 | 16 |
| 145-275 | 16 | 16 |

Total number of RBGs ($N_{RBG}$) of a bandwidth part i having a size of $N_{BWP,i}^{size}$ may be defined as follows.

$$N_{RBG} = \lceil (N_{BWP,i}^{size} + (N_{BWP,i}^{start} \bmod P))/P \rceil,$$

where
the size of the first RBG is $RBG_0^{size}=P-N_{BWP,i}^{start} \bmod P$,
the size of last RBG is $RBG_{last}^{size}=(N_{BWP,i}^{start}+N_{BWP,i}^{size}) \bmod P$ if $(N_{BWP,i}^{start}+N_{BWP,i}^{size}) \bmod P>0$ and P otherwise, and
the size of all other RBGs is P.

Each bit of a bitmap having a $N_{RBG}$ bit size may correspond to the RBG. The RBGs may be assigned with indexes in an increasing order of a frequency from the lowest frequency of a bandwidth part. Regarding the $N_{RBG}$ RBGs within the bandwidth part, RBG #0 to RBG #($N_{RBG}-1$) may be mapped from a most significant bit (MSB) to a least significant bit (LSB) of an RBG bitmap. When a specific bit value in the bitmap is 1, the UE may determine that an RBG corresponding to the specific bit value is assigned, and when the specific bit value in the bitmap is 0, the UE may determine that an RBG corresponding to the specific bit value is not assigned.

Resource Assignment Type 1.

RB assignment information may be notified from the base station to the UE via information about a start location and length of consecutively assigned VRBs. Here, interleaving or non-interleaving may be additionally applied to the consecutively assigned VRBs. A resource assignment field of the resource assignment type 1 may include a resource indication value (RIV), and the RIV may include a start point ($RB_{start}$) of a VRB and a length ($L_{RBs}$) of consecutively assigned RBs. In detail, the RIV within a bandwidth part having the size of $N_{BWP}^{size}$ may be defined as below.

if $(L_{RBs} - 1) \le \lfloor N_{BWP}^{size}/2 \rfloor$ then $RIV = N_{BWP}^{size}(L_{RBS} - 1) + RB_{start}$ else $RIV = N_{BWP}^{size}(N_{BWP}^{size} - L_{RBs} + 1) + (N_{BWP}^{size} - 1 - RB_{start})$ where $L_{RBs} \ge 1$ and may not exceed $N_{BWP}^{size}-RB_{start}$.

Hereinafter, a method of measuring and reporting a channel state in a 5G communication system will be described in detail.

Channel state information (CSI) may include a channel quality information (CQI), a precoding matric indicator (PMI), a CSI-reference signal (RS) resource indicator (CRI), a synchronization signal/physical broadcast channel (SS/PBCH) block resource indicator SSBRI, a layer indicator (LI), a rank indicator (RI), and/or an L1-reference signal received power (RSRP). A base station may control time and frequency resources for CSI measurement and reporting of a UE.

For the CSI measurement and reporting, the UE may be configured with, via higher layer signaling, N ($\ge 1$) pieces of setting information (CSI-ReportConfig) for CSI reporting, M ($\ge 1$) pieces of setting information (CSI-ResourceConfig) for RS transmission resources, one or two pieces of trigger state list information (CSI-AperiodicTriggerStateList or CSI-SemiPersistentOnPUSCH-TriggerStateList).

Each CSI report setting (CSI-ReportConfig) may be associated with one DL bandwidth part identified by a higher layer parameter bandwidth part identity (bwp-id) provided via CSI resource setting (CSI-ResourceConfig) associated with the CSI report setting. Aperiodic, semi-persistent, and periodic types are supported for a time domain reporting operation regarding each CSI-ReportConfig, and may be configured by the base station to the UE via a reportConfigType parameter configured from a higher layer. A semi-persistent CSI reporting method supports a physical UL control channel (PUCCH)-based semi-persistent (semi-PersistentOnPUCCH) and PUSCH-based semi-persistent (semi-PersistentOnPUSCH) reporting method. In a periodic or semi-persistent CSI reporting method, the UE may be configured with a PUCCH or PUSCH resource for transmitting the CSI from the base station via higher layer signaling. A period and slot offset of the PUCCH or PUSCH resource for transmitting the CSI may be provided via numerology of an UL bandwidth part configured to transmit CSI reporting. In an aperiodic CSI reporting method, the PUSCH resource for transmitting the CSI may be scheduled to the UE via L1 signaling (the DCI format 0_1 described above).

Regarding the CSI resource setting (CSI-ResourceConfig), each CSI resource setting (CSI-ResourceConfig) may include S ($\ge 1$) CSI resource sets (provided as a higher layer parameter csi-RS-ResourceSetList). A CSI resource set list may include a non-zero power (NZP) CSI-RS resource set and a SS/PBCH block set or may include a CSI-interference measurement (CSI-IM) resource set. Each CSI resource setting may be located at a DL bandwidth part identified by the bwp-id, and the CSI resource setting may be connected to the CSI report setting at the same DL bandwidth part. A time domain operation of a CSI-RS resource in the CSI resource setting may be configured, by a higher layer parameter resourceType to be one of aperiodic, periodic, or semi-persistent. Regarding the periodic or semi-persistent CSI resource setting, the number of CSI-RS resource sets may be limited to S=1, and a configured period and a slot offset may be provided by a numerology of the DL bandwidth part identified by bwp-id. The UE may be configured with, by the base station, the one or more CSI resource setting for channel or interference measurement via higher layer signaling, and for example, may include following CSI resources.

CSI-interference measurement (IM) resource for IM.
NZP CSI-RS resource for IM.
NZP CSI-RS resource for channel measurement.

Regarding the CSI-RS resource sets associated with resource setting in which the higher layer parameter resourceType is configured to be "aperiodic," "periodic," or "semi-persistent," a trigger state for the CSI report setting in which the reportType is configured to be "aperiodic" and a resource setting for channel or interference measurement for one or more component cells (CCs) may be configured as a higher layer parameter CSI-AperiodicTriggerStateList.

Aperiodic CSI reporting of the UE may use a PUSCH, periodic CSI reporting may use a PUCCH, and a semi-persistent CSI reporting may use a PUSCH when triggered or activated by DCI and may use a PUCCH after being activated by an MAC CE. As described above, the CSI-ResourceConfig may be configured to be aperiodic, periodic, or semi-persistent. A combination of the CSI report setting and the CSI resource setting may be supported based on Table 10 below.

TABLE 10

Triggering/Activation of CSI Reporting for the possible CSI-RS Configurations.

| CSI-RS Configuration | Periodic CSI Reporting | Semi-Persistent CSI Reporting | Aperiodic CSI Reporting |
|---|---|---|---|
| Periodic CSI-RS | No dynamic triggering/ activation | For reporting on PUCCH, the UE receives an activation command [10, TS 38.321]; for reporting on PUSCH, the UE receives triggering on DCI | Triggered by DCI; additionally, activation command [10, TS 38.321] possible as defined in Subclause 5.2.1.5.1. |
| Semi-Persistent CSI-RS | Not Supported | For reporting on PUCCH, the UE receives an activation command [10. TS 38.321]; for reporting on PUSCH, the UE receives triggering on DCI | Triggered by DCI; additionally, activation command [10, TS 38.321] possible as defined in Subclause 5.2.1.5.1. |
| Aperiodic CSI-RS | Not Supported | Not Supported | Triggered by DCI; additionally, activation command [10, TS 38.321] possible as defined in Subclause 5.2.1.5.1. |

The aperiodic CSI reporting may be triggered by "CSI request" of the DCI format 0_1 corresponding to scheduling DCI for a PUSCH. The UE may monitor a PDCCH, obtain the DCI format 0_1, and obtain scheduling information for the PUSCH and a CSI request indicator. The CSI request indicator may be configured in $N_{TS}$ (=0, 1, 2, 3, 4, 5, or 6) bits and may be determined by a higher layer signaling reportTriggerSize. One trigger state from among one or more aperiodic CSI reporting trigger states that may be configured via the higher layer signaling (CSI-Aperiodic-TriggerStateList) may be triggered by the CSI request indicator.

When all bits of a CSI request field is 0, the CSI reporting may not have requested.

When the number M of CSI trigger states within the configured CSI-AperiodicTriggerStateList is greater than $2^{N_{Ts}}-1$, the M CSI trigger states may be mapped to $2^{N_{Ts}}-1$ according to a pre-defined mapping relationship, and one of $2^{N_{Ts}}-1$ trigger states may be indicated via the CSI request field.

When the number M of CSI trigger states in the configured CSI-AperiodicTriggerStateList is equal to or less than $2^{N_{Ts}}-1$, one of M CSI trigger states may be indicated via the CSI request field.

Table 11 below shows an example of relationships between a CSI request indicator and a CSI trigger state indicatable by the CSI request indicator.

TABLE 11

| CSI request field | CSI trigger state | CSI-ReportConfigId | CSI-ResourceConfigId |
|---|---|---|---|
| 00 | no CSI request | N/A | N/A |
| 01 | CSI trigger state#1 | CSI report#1 CSI report#2 | CSI resource#1 CSI resource#2 |
| 10 | CSI trigger state#2 | CSI report#3 | CSI resource#3 |
| 11 | CSI trigger state#3 | CSI report#4 | CSI resource#4 |

The UE may perform measurement on a CSI resource in the CSI trigger state triggered by the CSI request field, and generate CSI (including at least one of CQI, PMI, CRI, SSBRI, LI, RI, or L1-RSRP described above) therefrom. The UE may transmit the obtained CSI by using the PUSCH scheduled by the DCI format 0_1. When 1 bit corresponding to an UL data indicator (UL-SCH indicator) in the DCI format 0_1 indicates "1," UL data (UL-SCH) and the obtained CSI may be multiplexed and transmitted with the PUSCH resource scheduled by the DCI format 0_1. When the 1 bit corresponding to the UL data indicator (UL-SCH indicator) in the DCI format 0_1 indicates "0," only the CSI may be mapped and transmitted with the PUSCH resource scheduled by the DCI format 0_1, without the UL data (UL-SCH).

Figure 6E:
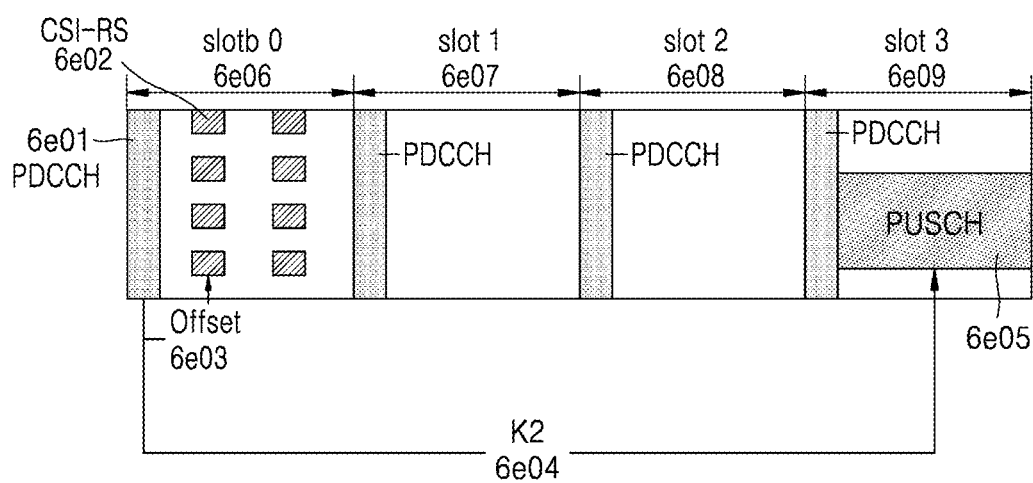
FIG. 6E illustrates an example of an aperiodic channel state information (CSI) reporting method according to an embodiment of the disclosure.
Figure 6F:
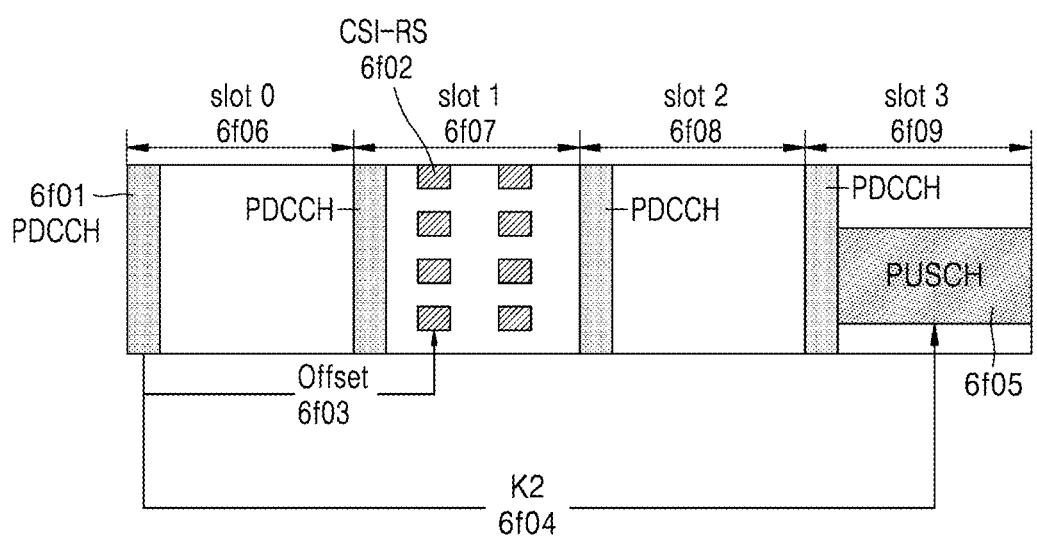
FIG. 6F illustrates another example of an aperiodic CSI reporting method according to an embodiment of the disclosure.

FIGS. 6E and 6F each illustrates an example of an aperiodic CSI reporting method according to an embodiment of the disclosure.

In the example of FIG. 6E, the UE may obtain the DCI format 0_1 by monitoring a PDCCH 6e01, and obtain scheduling information and CSI request information for a PUSCH 6e05 therefrom. The UE may obtain resource information for a CSI-RS 6e02 to be measured from a received CSI request indicator. The UE may determine a resource of the transmitted CSI-RS 6e02 for performing measurement, based on a time point when the DCI format 0_1 is received and a parameter (aperiodicTriggeringOffset described above) for an offset in CSI resource set configuration (for example, NZP CSI-RS resource set configuration (NZP-CSI-RS-ResourceSet). In detail, the UE may be configured with, by the base station via higher layer signaling, an offset value X of the parameter (aperiodicTriggeringOffset) in the NZP-CSI-RS resource set configuration, and the configured offset value X may denote an offset between a slot where a CSI-RS resource is transmitted and a slot where DCI triggering aperiodic CSI reporting is received. For example, a parameter value of the aperiodicTriggeringOffset and the offset value X may have a mapping relationship of Table 12 below.

TABLE 12

| aperiodicTriggeringOffset | Offset X |
|---|---|
| 0 | 0 slot |
| 1 | 1 slot |
| 2 | 2 slots |

TABLE 12-continued

| aperiodicTriggeringOffset | Offset X |
|---|---|
| 3 | 3 slots |
| 4 | 4 slots |
| 5 | 16 slots |
| 6 | 24 slots |

In the example of FIG. 6E, an offset value 6e03 is configured to X=0. In this case, the UE may receive the CSI-RS 6e02 from a slot (a slot 0 6e06 of FIG. 6E) that received the DCI format 0_1 triggering the aperiodic CSI reporting, and report, to the base station, CSI information measured by the received CSI-RS 6e02 via the PUSCH 6e05. The UE may obtain scheduling information (information corresponding to each field of the DCI format 0_1) for the PUSCH 6e05 for CSI reporting, from the DCI format 0_1. For example, the UE may obtain information about a slot for transmitting the PUSCH 6e05 from time domain resource assignment information for the PUSCH 6e05 in the DCI format 0_1. In the example of FIG. 6E, the UE has obtained 3 as a K2 value 6e04 corresponding to a slot offset value for PDCCH-to-PUSCH, and accordingly, the PUSCH 6e05 may be transmitted from a slot 3 6e09 that is 3 slots away from the slot 0 6e06, i.e., when the PDCCH 6e01 is received.

In the example of FIG. 6F, the UE may obtain the DCI format 0_1 by monitoring a PDCCH 6f01, and obtain scheduling information and CSI request information for a PUSCH 6f05 therefrom. The UE may obtain resource information for a CSI-RS 6f02 to be measured from a received CSI request indicator. In the example of FIG. 6F, an offset value 6f03 for the CSI-RS is configured to X=1. In this case, the UE may receive the CSI-RS 6f02 from a slot (a slot 0 6f06 of FIG. 6F) that received the DCI format 0_1 triggering the aperiodic CSI reporting, and report CSI information measured by the received CSI-RS 6f02 to the base station via the PUSCH 6f05 from a slot 3 6f09 that is 3 slots away from the slot 0 6f06 according to a K2 value 6f04 corresponding to a slot offset value for PDCCH-to-PUSCH.

Control information is transmitted within the number of first N OFDM symbols in a subframe. A control channel transmission interval N is generally N={1, 2, 3}. Accordingly, in accordance with an amount of control information to be transmitted in a current subframe, the value N may be varied for each subframe. For example, the control information may include an indicator indicating the number of OFDM symbols over which the control information is transmitted, scheduling information for UL or DL data, and a hybrid automatic repeat signal (HARQ) acknowledgement (ACK)/negative ACK (NACK) signal.

A wireless communication system employs an HARQ method of retransmitting data from a physical layer when a decoding failure occurs in initial transmission. The HARQ method enables a transmitter to retransmit the data from the physical layer by transmitting, by a receiver, information (for example, NACK) indicating the decoding failure to the transmitter, when the receiver does not accurately decode the data. The receiver combines the data retransmitted by the transmitter with data whose previous decoding has failed so as to improve data reception performance. Also, when the receiver accurately decodes the data, information (for example, ACK) indicating a decoding success is transmitted such that the transmitter transmits new data.

In the wireless communication system, one of important factors for providing a high-speed data service is supporting a scalable bandwidth. According to some embodiments of the disclosure, a system transmission bandwidth of an LTE system may have various bandwidths, such as 20/15/10/5/3/1.4 MHz. Accordingly, service operators may provide a service by selecting a specific bandwidth among various bandwidths. There may be various types of UEs (for example, the terminal 120) from one that is able to support up to a 20 MHz bandwidth to one that supports only a 1.4 MHz.

In the wireless communication system, the base station (for example, the base station 110) notifies the UE of scheduling information about DL data or UL data via DCI. UL denotes a radio link where the UE transmits data or a control signal to the base station, and DL denotes a radio link where the base station transmits data or a control signal to the UE. DCI defines various formats, and a DCI format determined depending on scheduling information for UL data (for example, UL grant) or scheduling information for DL data (for example, DL grant), compact DCI having a small size of control information, whether spatial multiplexing using multiple antennas is applied, and power control DCI, is applied and operated. For example, a DCI format 1 that is the scheduling information for DL data (for example, DL grant) may be configured to include following control information.

Resource allocation type 0/1 flag: A resource allocation type 0/1 flag notifies whether a resource allocation type is type 0 or type 1. The type 0 allocates resources in units of RBGs by applying of a bitmap type. In the LTE system, a base unit of scheduling is RB that is expressed as a time and frequency domain resource, and the RBG is composed of a plurality of RBs to be considered as the base unit of scheduling in the type 0. The type 1 allocates a specific RB in the RBG.

Resource block assignment: resource block assignment notifies an RB assigned to data transmission. An expressed resource is determined in accordance with a system bandwidth and a resource assignment method.

MCS: an MCS notifies a modulation scheme and a target code rate used for data transmission or a size of a transport block to be transmitted.

HARQ process number: An HARQ process number notifies a process number of HARQ.

New data indicator: a new data indicator notifies HARQ initial transmission or retransmission.

Redundancy version: a redundancy version indicates a redundancy version (RV) of HARQ.

TPC command for PUCCH: TPC command for PUCCH indicates a power control command for PUCCH.

The DCI is transmitted on a PDCCH via channel coding and modulation scheme.

In general, for each UE, the DCI is channel-coded, is configured as an independent PDCCH, and then is transmitted. In a time domain, the PDCCH is mapped and transmitted for the control channel transmission interval. A frequency domain mapping location of the PDCCH is determined by an identifier (ID) of each UE and is spread throughout a system transmission bandwidth.

The DL data is transmitted through a PDSCH that is a physical channel for transmitting the DL data. The PDSCH is transmitted after the control channel transmission interval, and scheduling information, such as a concrete mapping location or a modulation scheme in a frequency domain, may be notified by the DCI transmitted through the PDCCH.

The base station notifies the UE of a modulation scheme applied to the PDSCH to be transmitted, and a size of data (for example, a TBS) to be transmitted, by using an MCS configured of 5 bits among the control information constituting the DCI. The TBS corresponds to a size before channel coding for error correction is applied to the data to be transmitted by the base station.

In a cellular system, such as 5G NR or LTE/LTE-A system, the base station (for example, the base station 110) needs to transmit an RS so as to measure a DL channel state. For example, in a LTE-A system of 3GPP, the UE (for example, the terminal 120) measures a channel state between the base station and the UE by using the CSI-RS transmitted by the base station. Several factors are considered for a channel state and include an interference amount in DL. The interference amount in DL includes an interference signal and thermal noise generated by an antenna belonging to an adjacent base station and may be used by the UE to determine the channel state of DL. For example, when a base station having one transmission antenna transmits an RS to a UE having one reception antenna, the UE determines energy per symbol to interference density ratio (Es/Io) by determining energy per symbol receivable via a DL from an RS received from the base station and an interference amount to be simultaneously received from an interval where the symbol is received. The determined Es/Io is notified to the base station such that the base station determines a data rate for transmitting data to the UE via the DL.

Figure 7:
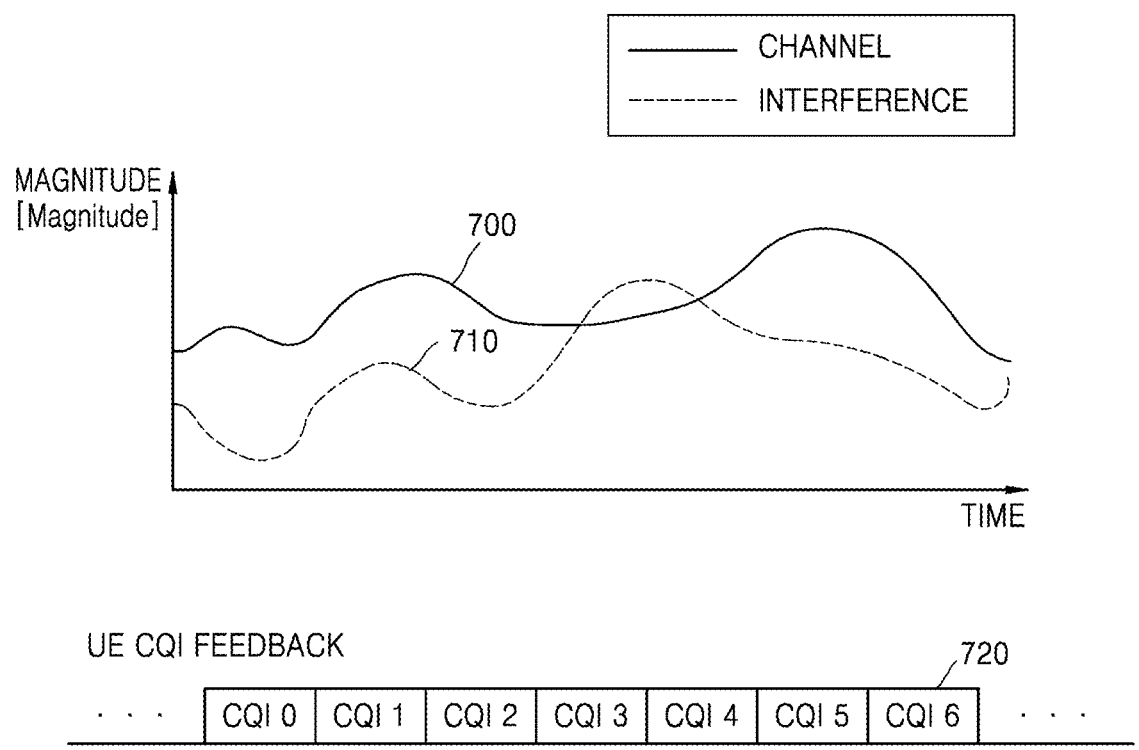
FIG. 7 illustrates an example of transmission of a channel quality indicator (CQI) that is one of pieces of channel state information of a terminal, according to signal energy and interference strength measured by the terminal according to an embodiment of the disclosure.

FIG. 7 illustrates an example of transmission of a CQI that is one of pieces of CSI of a UE, according to signal energy and interference strength measured by the UE, according to an embodiment of the disclosure.

Referring to FIG. 7, the UE (for example, the terminal 120) performs channel estimation by measuring a DL RS such as CSI-RS, and calculates reception signal energy (Es) according to a radio channel 700 indicated by a solid line. Also, the UE calculates strength 710 of interference and noise indicated by a dashed line, by using a separate resource for DL RS or interference and noise measurement. In LTE, a base station uses CRS that is a DL RS for interference and noise measurement or configures an interference measurement resource to the UE to consider a signal measured at a corresponding radio resource as interference and noise. By using the reception signal energy, and the interference and noise strength obtained as such, the UE determines a highest data rate receivable with a uniform success rate in a noise-to-interference and a noise ratio calculated by the UE, and notifies the highest data rate to the base station. Upon being notified with the highest data rate supportable by the UE in the corresponding signal-to-interference and noise ratio, the base station determines an actual data rate of a DL data signal to be transmitted to the UE by using the highest data rate. As such, the highest data date receivable by the UE at a uniform success rate from the base station is referred to as a CQI in the LTE/NR standard. In general, a radio channel changes according to time and thus the UE notifies the base station of the CQI periodically or when requested by the base station. The base station may request the UE for the CQI periodically or aperiodically.

When the CQI information is accurately measured by the UE or the base station and is accurately transmitted and received, efficient transmission and reception becomes possible while following a target error probability configured in a system by configuring an MCS suitable to a channel environment. Accordingly, an evolved wireless communication system requires a definition for a method of generating and applying CQI and MCS tables suitable to services supporting various reliability.

Hereinafter, a method of designing new CQI and MCS tables to determine an MCS combination or accurately report a channel quality according to a target transmission and reception error probability required for efficient communication in a 4G or 5G communication system will be described.

Also, a method of adjusting spectrum efficiency or a code rate based on existing CQI and MCS tables to determine an MCS combination or accurately report a channel quality according to a target transmission and reception error probability required for efficient communication in a 4G or 5G communication system will be described. For reference, the spectrum efficiency may also be referred to as a modulation order product rate (MPR).

Also, a method and apparatus for determining an efficient MCS combination based on a plurality of MCS tables or reporting an accurate channel quality based on a plurality of CQI tables according to a target transmission and reception error probability required for efficient communication in a 4G or 5G communication system will be described.

In a current 5G NR system, different CQI tables and MCS tables are applied according to a target BLER or a maximum modulation order configured in a system. Here, a BLER value may indicate an error occurrence rate after decoding of a received transport block is completed. According to some embodiments of the disclosure, after decoding a plurality of transport blocks, a UE may determine a BLER value via suitable calculation or may determine a BLER value approximately expected via a reception signal-to-noise ratio (SNR). In this case, without having to actually perform the decoding, the UE may measure the reception SNR, predict a decoding success rate based on the reception SNR, and report a CQI index to a base station.

<CSI Reference Resource>

To report a CQI index to a base station, a UE reports based on a CSI reference resource. Following items may be examples of factors constituting the CSI reference resource, and other unmentioned items may also be factors constituting the CSI reference resource.

First 2 OFDM symbols are used as a control signal.
A number of PDSCH and DMRS symbols is 12 symbols.
A CP length and SCS such as a bandwidth part (BWP) configured for PDSCH reception.
A bandwidth size configured for CQI reporting.
RV 0.
There is no RE assigned for NZP CSI-RS and ZP CSI-RS.
A PDSCH symbol does not include a DMRS.
A size of PRB bundling in units of 2 PRBs.
PDSCH transmission may be performed in up to eight transmission layers.

Table 13 or 15 may be used for a case where a CQI is reported when up to 64 QAM is available, and Table 14 may be used for a case where a CQI is to be reported when up to 256 QAM is available. Also, Table 16 or Table 18 may be used for a case where an MCS is determined or configured when up to 64 QAM is available for a PDSCH or PUSCH, and Table 17 may be used for a case where an MCS is determined or configured when up to 256 QAM is available for a PDSCH or PUSCH. Tables 19 and 20 may be used for a case where an MCS is determined or configured for a PUSCH to which transform precoding and 64 QAM are applied. (A value of q in Tables 19 and 20 is a value determined depending on whether pi/2-BPSK is indicated, and when tp-pi2BPSK is configured in higher layer signaling, q=1, and otherwise, q=2). Also, values of CQI tables in Tables 13 through 18 may be configured via a 4-bit indicator, and values of CQI tables in Tables 19 and 20 may be configured via a 5-bit indicator.

TABLE 13

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16 QAM | 378 | 1.4766 |
| 8 | 16 QAM | 490 | 1.9141 |
| 9 | 16 QAM | 616 | 2.4063 |
| 10 | 64 QAM | 466 | 2.7305 |
| 11 | 64 QAM | 567 | 3.3223 |
| 12 | 64 QAM | 666 | 3.9023 |
| 13 | 64 QAM | 772 | 4.5234 |
| 14 | 64 QAM | 873 | 5.1152 |
| 15 | 64 QAM | 948 | 5.5547 |

TABLE 14

| CQI index | modulation | code rate × 1024 | efficiency |
|---|---|---|---|
| 0 | | out of range | |
| 1 | QPSK | 78 | 0.1523 |
| 2 | QPSK | 193 | 0.3770 |
| 3 | QPSK | 449 | 0.8770 |
| 4 | 16 QAM | 378 | 1.4766 |
| 5 | 16 QAM | 490 | 1.9141 |
| 6 | 16 QAM | 616 | 2.4063 |
| 7 | 64 QAM | 466 | 2.7305 |
| 8 | 64 QAM | 567 | 3.3223 |
| 9 | 64 QAM | 666 | 3.9023 |
| 10 | 64 QAM | 772 | 4.5234 |
| 11 | 64 QAM | 873 | 5.1152 |
| 12 | 256 QAM | 711 | 5.5547 |
| 13 | 256 QAM | 797 | 6.2266 |
| 14 | 256 QAM | 885 | 6.9141 |
| 15 | 256 QAM | 948 | 7.4063 |

TABLE 15

| CQI index | modulation | code rate × 1024 | efficiency |
|---|---|---|---|
| 0 | | out of range | |
| 1 | QPSK | 30 | 0.0586 |
| 2 | QPSK | 50 | 0.0977 |
| 3 | QPSK | 78 | 0.1523 |
| 4 | QPSK | 120 | 0.2344 |
| 5 | QPSK | 193 | 0.3770 |
| 6 | QPSK | 308 | 0.6016 |
| 7 | QPSK | 449 | 0.8770 |
| 8 | QPSK | 602 | 1.1758 |
| 9 | 16 QAM | 378 | 1.4766 |
| 10 | 16 QAM | 490 | 1.9141 |
| 11 | 16 QAM | 616 | 2.4063 |
| 12 | 64 QAM | 466 | 2.7305 |
| 13 | 64 QAM | 567 | 3.3223 |
| 14 | 64 QAM | 666 | 3.9023 |
| 15 | 64 QAM | 772 | 4.5234 |

TABLE 16

| MCS Index $I_{MCS}$ | Modulation Order Qm | Target code Rate R × [1024] | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | | reserved |
| 30 | 4 | | reserved |
| 31 | 6 | | reserved |

TABLE 17

| MCS Index $I_{MCS}$ | Modulation Order Qm | Target code Rate R × [1024] | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 517 | 3.0293 |
| 13 | 6 | 567 | 3.3223 |
| 14 | 6 | 616 | 3.6094 |
| 15 | 6 | 666 | 3.9023 |
| 16 | 6 | 719 | 4.2129 |
| 17 | 6 | 772 | 4.5234 |
| 18 | 6 | 822 | 4.8164 |
| 19 | 6 | 873 | 5.1152 |
| 20 | 8 | 682.5 | 5.3320 |
| 21 | 8 | 711 | 5.5547 |
| 22 | 8 | 754 | 5.8906 |
| 23 | 8 | 797 | 6.2266 |
| 24 | 8 | 841 | 6.5703 |
| 25 | 8 | 885 | 6.9141 |
| 26 | 8 | 916.5 | 7.1602 |
| 27 | 8 | 948 | 7.4063 |
| 28 | 2 | | reserved |
| 29 | 4 | | reserved |
| 30 | 6 | | reserved |
| 31 | 8 | | reserved |

TABLE 18

| MCS Index $I_{MCS}$ | Modulation Order Qm | Target code Rate R × [1024] | Spectral efficiency |
|---|---|---|---|
| 0 | 2 | 30 | 0.0586 |
| 1 | 2 | 40 | 0.0781 |
| 2 | 2 | 50 | 0.0977 |
| 3 | 2 | 64 | 0.1250 |
| 4 | 2 | 78 | 0.1523 |
| 5 | 2 | 99 | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 4 | 340 | 1.3281 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 6 | 438 | 2.5664 |
| 22 | 6 | 466 | 2.7305 |
| 23 | 6 | 517 | 3.0293 |
| 24 | 6 | 567 | 3.3223 |
| 25 | 6 | 616 | 3.6094 |
| 26 | 6 | 666 | 3.9023 |
| 27 | 6 | 719 | 4.2129 |
| 28 | 6 | 772 | 4.5234 |
| 29 | 2 | | reserved |
| 30 | 4 | | reserved |
| 31 | 6 | | reserved |

TABLE 19

| MCS Index $I_{MCS}$ | Modulation Order Qm | Target code Rate R × [1024] | Spectral efficiency |
|---|---|---|---|
| 0 | q | 240/q | 0.2344 |
| 1 | q | 314/q | 0.3770 |
| 2 | 2 | 193 | 0.6016 |
| 3 | 2 | 251 | 0.8770 |
| 4 | 2 | 308 | 1.1758 |
| 5 | 2 | 379 | 1.4766 |
| 6 | 2 | 449 | 1.6953 |
| 7 | 2 | 526 | 1.9141 |
| 8 | 2 | 602 | 2.1602 |
| 9 | 2 | 679 | 2.4063 |
| 10 | 4 | 340 | 2.5703 |
| 11 | 4 | 378 | 2.7305 |
| 12 | 4 | 434 | 3.0293 |
| 13 | 4 | 490 | 3.3223 |
| 14 | 4 | 553 | 3.6094 |
| 15 | 4 | 616 | 3.9023 |
| 16 | 4 | 658 | 4.2129 |
| 17 | 6 | 466 | 4.5234 |
| 18 | 6 | 517 | 4.8164 |
| 19 | 6 | 567 | 5.1152 |
| 20 | 6 | 616 | 5.3320 |
| 21 | 6 | 666 | 5.5547 |
| 22 | 6 | 719 | 5.8906 |
| 23 | 6 | 772 | 6.2266 |
| 24 | 6 | 822 | 6.5703 |
| 25 | 6 | 873 | 6.9141 |
| 26 | 6 | 910 | 7.1602 |
| 27 | 6 | 948 | 7.4063 |
| 28 | q | | reserved |
| 29 | 2 | | reserved |
| 30 | 4 | | reserved |
| 31 | 6 | | reserved |

TABLE 20

| MCS Index $I_{MCS}$ | Modulation Order Qm | Target code Rate R × [1024] | Spectral efficiency |
|---|---|---|---|
| 0 | q | 60/q | 0.2344 |
| 1 | q | 80/q | 0.3770 |
| 2 | q | 100/q | 0.6016 |
| 3 | q | 128/q | 0.8770 |
| 4 | q | 156/q | 1.1758 |
| 5 | q | 198/q | 1.4766 |
| 6 | 2 | 120 | 1.6953 |
| 7 | 2 | 157 | 1.9141 |
| 8 | 2 | 193 | 2.1602 |
| 9 | 2 | 251 | 2.4063 |
| 10 | 2 | 308 | 2.5703 |
| 11 | 2 | 379 | 2.7305 |
| 12 | 2 | 449 | 3.0293 |
| 13 | 2 | 526 | 3.3223 |
| 14 | 2 | 602 | 3.6094 |
| 15 | 2 | 679 | 3.9023 |
| 16 | 4 | 378 | 4.2129 |
| 17 | 4 | 434 | 4.5234 |
| 18 | 4 | 490 | 4.8164 |
| 19 | 4 | 553 | 5.1152 |
| 20 | 4 | 616 | 5.3320 |
| 21 | 4 | 658 | 5.5547 |
| 22 | 4 | 699 | 5.8906 |
| 23 | 4 | 772 | 6.2266 |
| 24 | 6 | 567 | 6.5703 |
| 25 | 6 | 616 | 6.9141 |
| 26 | 6 | 666 | 7.1602 |
| 27 | 6 | 772 | 7.4063 |
| 28 | q | | reserved |
| 29 | 2 | | reserved |
| 30 | 4 | | reserved |
| 31 | 6 | | reserved |

With reference to a process of determining a CQI index, the UE derives or determines a highest CQI index satisfying following conditions for a CQI value reported in an UL slot n.

[CQI Determination-1]

A single PDSCH transport block having a combination of a modulation order (or technique) corresponding to a CQI index, a target code rate, and a TBS needs to be received without exceeding a following transport block error probability.

When a CSI-higher layer parameter eqi-Table included in the CSI-ReportConfig configures (or indicates) Table 13 or 14 above, a target transport block error probability is 0.1.

When the CSI-higher layer parameter eqi-Table included in the CSI-ReportConfig configures (or indicates) Table 15 above, the target transport block error probability is 0.00001.

A condition for the transport block error probability may denote an approximated or substantial value, and thus a BLER value satisfied in an actual communication system may be a value in a range somewhat smaller or greater than at least 0.1 or 0.00001 defined temporally in the standard. However, a system is operated such that an average transport block error probability has a value close to the defined 0.1 or 0.00001. Here, the close value may be a value within 10% to 50% of the target BLER value, or may be a value in a different range configured in the system.

According to an embodiment of the disclosure, to derive the suitable target BLER value determined for CQI index reporting, a resource use rate, such as the number of RE resources, implementation capability of a UE for accurate estimation of the CQI index, an SNR difference for each target BLER when a plurality of target BLERs are present and whether different CQI index reportings are possible for each target BLER in various wireless communication environment due to the SNR difference, and UE implementation complexity when a number of types of the plurality of target BLERs increase need to be considered. When the plurality of target BLERs are present, the UE reports the CQI index estimated based on at least one target BLER, and the target BLER value may be configured via a higher signal or L1 signal.

A current 5G NR system considers 0.1 or 0.00001 as the target BLER value, and the latter may be configured considering a service requesting high reliability or low latency, for example, a service scenario such as URLLC. However, with the expansion of LTE or 5G NR system, more various services of different purposes are required. Such various services may request various system conditions considering not only reliability or low latency characteristics according to each service, but also a place where a service is supported, average data traffic, and a shape of the UE. However, it may be difficult for the various services to be efficiently supported only with current two BLER conditions that are different at least 10,000 times, such as 0.1 and 0.00001. Thus, the disclosure proposes a CQI table and an MCS table for efficiently supporting a target BLER other than the target BLERs of 0.1 and 0.00001.

When a maximum modulation order to be applied to a system is configured to 64 QAM, the current 5G NR system uses the CQI table of Table 13 when the target BLER of the system for CQI reporting is 0.1 and uses the CQI table of Table 15 when the target BLER is 0.00001. The disclosure proposes a method of determining a new CQI table when separate CQI tables are used for a target BLER between 0.1 and 0.00001. Hereinafter, embodiments of the disclosure are described under an assumption that the target BLER is configured mostly in a value of 10, P=1, 2, 3, 4, 5, and so on for convenience of description, but the embodiments of the disclosure are not limited thereto, and the target BLER may be configured in a value close to $10^{-P}$, such as 0.2, 0.002, 0.00002, 0.09, 0.009, or 0.000009, according to the system.

Also, in embodiments of the disclosure below, a method of designing a CQI table to transmit CSI from a communication system by an apparatus including a transceiver and at least one processor coupled with the transceiver, and a method of using the designed CQI table will be described. In particular, the method of designing a CQI table and the method of using the designed CQI table when supported services or target BLERs are different will be described. In addition, a method of determining or configuring a suitable MCS by using a suitable MCS table corresponding to the CQI table or a designed MCS table will be described. For reference, to maintain signaling overhead to an LTE level, CQI and MCS indicators may be respectively maintained in 4 bits and 5 bits as before, and a CQI index 0 may also be defined as "out of range".

Embodiment 1

Generally, indexes included in a CQI table or MCS table are evenly determined to be an operation SNR interval supporting a target BLER of a system. Generally, channel capacity based on an SNR is affected by a BLER or error probability of a reception bit allowed in the system. For example, when channel capacity assuming error free is $C_{SNR}(R)$ in a case where channel coding of a code rate R is applied, channel capacity $C_{SNR,b}(R)$ when a target bit error rate is $P_b$ has a relationship of $C_{SNR,b}(R)<C_{SNR}(R)$. This is because the system allows a bit error rate or BLER to some degree compared to an error free strong condition and thus a required SNR level is low. Accordingly, an operation SNR is also variable depending on the target bit error rate or BLER of the system, and thus an optimized combination of a modulation order and a code rate, or a target spectral efficiency value may change according to the target bit error rate. Because the bit error rate exponentially decreases compared to an SNR increase in general, an optimum CQI table or MCS table may be designed or configured considering a log-scale regarding a target BLER or bit error rate. For example, a target BLER 0.001 corresponds to an intermediate value in a log-scale of target BLERs 0.1 and 0.00001, a CQI table for the target BLER 0.001 may be generated by using the CQI table of Table 13 and the CQI table of Table 15. For reference, spectral efficiency may be simply expressed by a modulation order product rate (MPR), i.e., a multiplication R*Qm of a modulation rate Qm and a code rate R, in some cases.

Tables 13 and 15 consider a case where a modulation order is up to 6, i.e., up to 64QAM, and are CQI tables used when the target BLERs are 0.1 and 0.00001, respectively. Generally, the CQI table or the MCS table is designed considering an almost uniform operation SNR and target BLER. Accordingly, when a new CQI table is generated based on the two CQI tables where the target BLERs are 0.1 and 0.00001, a combination of modulation and code rate of an existing table or corresponding spectral efficiency may be reused as much as possible.

First, there may be a first CQI table and a second CQI table in which maximum modulation schemes or orders are the same while target BLERs are different, for example, $10^{-P1}$ and $10^{-P2}$. A new third CQI table in which a target BLER is $10^{-P}$ and a maximum modulation order is the same may be generated to satisfy at least some or all of following conditions. (wherein P1<P<P2 are assumed.)

Condition 1: spectral efficiency corresponding to a combination of modulation and a code rate of an index I of the third CQI table is smaller than or equal to spectral efficiency corresponding to a combination of modulation and a code rate of an index I of the first CQI table and is equal to or greater than spectral efficiency corresponding to a combination of modulation and a code rate of an index I of the second CQI table.

Condition 2: same combinations of modulation and a code rate commonly included in the first CQI table and the second CQI table are all included in the third CQI table. Hereinafter, a set including the same combinations of modulation and a code rate is referred to as S for convenience.

Condition 3: when P=a*(P1+P2) and a number of the same combinations in Condition 2 is X, an index of a combination having lowest spectral efficiency among the same combinations is determined to be $g_{CQI}(a)$−floor(X/2) or $g_{CQI}(a)$−ceil(X/2), and indexes are sequentially determined for the remaining same combinations. Here, floor(x) denotes a largest integer equal to or smaller than a real number x, ceil(x) denotes a smallest integer equal to or greater than the real number x, and $g_{CQI}(a)$ denotes an integer determined according to a. a is a value suitably selected according to the target BLER, and a=⅓ to configure P=2, a=½ to configure P=3, and a=⅔ to configure P=4 when P1=1 and P2=5. In the present disclosure, $g_{CQI}(⅓)$=5 (or 4), $g_{CQI}(½)$=8, and $g_{CQI}(⅔)$=10 (11, or 12) for convenience, but may vary. When $g_{CQI}(a)$−floor(X/2)<1, $g_{CQI}(a)$−ceil(X/2)<1, $g_{CQI}(a)$−floor(X/2)+X>15, or $g_{CQI}(a)$−ceil(X/2)+X>15, a combination of modulation and a code rate corresponding to less than index 1 or more than index 15 is excluded.

Condition 4: when an index assigned to the combination having the lowest spectral efficiency among the combinations included in the set S is J, (J−1) combinations having high spectral efficiency are sequentially assigned to indexes 1 to (J−1) from among combinations of modulation and a code rate not included in the set S and having low spectral efficiency rather than the combinations of modulation and a code rate included in the set S from among combinations of modulation and a code rate of the second CQI table.

Condition 5: when an index assigned to a combination having highest spectral efficiency among the combinations included in the set S is K, (15−K) combinations having low spectral efficiency are sequentially assigned to indexes (K+1) to 15 from among the combinations of modulation and a code rate not included in the set S and having high spectral efficiency rather than the combinations of modulation and a code rate included in the set S from among combinations of modulation and a code rate of the first CQI table.

A method of generating a new CQI table in which a target BLER is $10^{-3}$ by using Tables 13 and 15, according to a specific embodiment of the disclosure considering the above conditions will now be described. First, combinations of modulation and a code rate commonly included in Tables 13 and 15 are determined according to Condition 2. There are total 13 common combinations, i.e., (QPSK, 78/1024), (QPSK, 120/1024), (QPSK, 193/1024), (QPSK, 308/1024),
(QPSK, 449/1024), (QPSK, 602/1024), (16QAM, 378/1024), (16QAM, 490/1024),
(16QAM, 616/1024), (64QAM, 466/1024), (64QAM, 567/1024),
(64QAM, 666/1024), and (64QAM, 772/1024). (X=13)

Because a=½ according to Condition 3, when $g_{CQI}(\frac{1}{2})=8$, $g_{CQI}(a)-\text{floor}(X/2)=8-6=2$. Accordingly, indexes 2 to 14 are sequentially assigned to the 13 combinations. Then, according to Condition 4, an index 1 is assigned to a combination of (QPSK, 50/1024) in Table 15, and an index 15 is assigned to a combination of (64QAM, 873/1024) in Table 13. The CQI table generated as such is shown in Table 21.

second CQI table, may be referred to as $A_J$ and $B_J$, respectively. When spectral efficiency for the index J of the new third CQI table is $C_J$, $C_J$ may be represented as Table 22 and as follows by using a function F (A, B) defining a new value based on $A_J$ and $B_J$: $C_J=F (A_J, B_J)$. Here, the function F (A, B) may be defined in various forms, and for example, may be defined as a function considering the target BLER, such as F (A, B)=(1−a)*A+a*B. (Here, a denotes a value defined in Condition 3 of Embodiment 1.) Also, when a same modulation scheme or order is provided for a same index generally, $C_J$ may be defined according to a code rate instead of the spectral efficiency. Also, $C_J=F(A_J, B_J)$ may be represented in another approximated value. For example, when $C_J=0.1934$, $1024*R=1024*0.1934/2$ to 99, and for a simple expression, such as $1024*R=100$, $C_J$ may be changed to an approximated value such as 0.1953. Generally, an approximated value of a provided value may be a value within a range of about 10 to 20%.

TABLE 22

| CQI index | modulation | code rate × 1024 | efficiency |
|---|---|---|---|
| 0 | | out of range | |
| 1 | QPSK | 1024 × F(A1, B1)/2 | F(A1, B1) |
| 2 | QPSK | 1024 × F(A2, B2)/2 | F(A2, B2) |
| 3 | QPSK | 1024 × F(A3, B3)/2 | F(A3, B3) |
| 4 | QPSK | 1024 × F(A4, B4)/2 | F(A4, B4) |
| 5 | QPSK | 1024 × F(A5, B5)/2 | F(A5, B5) |
| 6 | QPSK | 1024 × F(A6, B6)/2 | F(A6, B6) |
| 7 | QPSK | 1024 × F(A7, B7)/2 | F(A7, B7) |
| 8 | 16 QAM | 1024 × F(A8, B8)/4 | F(A8, B8) |
| 9 | 16 QAM | 1024 × F(A9, B9)/4 | F(A9, B9) |
| 10 | 16 QAM (or 64 QAM) | 1024 × F(A10, B10)/4 (or 1024 × F(A10, B10)/6) | F(A10, B10) |
| 11 | 64 QAM | 1024 × F(A11, B11)/6 | F(A11, B11) |
| 12 | 64 QAM | 1024 × F(A12, B12)/6 | F(A12, B12) |
| 13 | 64 QAM | 1024 × F(A13, B13)/6 | F(A13, B13) |
| 14 | 64 QAM | 1024 × F(A14, B14)/6 | F(A14, B14) |
| 15 | 64 QAM | 1024 × F(A15, B15)/6 | F(A15, B15) |

When the new CQI table in which the target BLER=$10^{-2}$, $10^{-3}$, $10^{-4}$ is generated by using a method of generating Table 22 based on Tables 13 and 15, Tables 23 through 25 may be obtained.

TABLE 21

| CQI index | modulation | code rate × 1024 | efficiency |
|---|---|---|---|
| 0 | | out of range | |
| 1 | QPSK | 50 | 0.0977 |
| 2 | QPSK | 78 | 0.1523 |
| 3 | QPSK | 120 | 0.2344 |
| 4 | QPSK | 193 | 0.3770 |
| 5 | QPSK | 308 | 0.6016 |
| 6 | QPSK | 449 | 0.8770 |
| 7 | QPSK | 602 | 1.1758 |
| 8 | 16 QAM | 378 | 1.4766 |
| 9 | 16 QAM | 490 | 1.9141 |
| 10 | 16 QAM | 616 | 2.4063 |
| 11 | 64 QAM | 466 | 2.7305 |
| 12 | 64 QAM | 567 | 3.3223 |
| 13 | 64 QAM | 666 | 3.9023 |
| 14 | 64 QAM | 772 | 4.5234 |
| 15 | 64 QAM | 873 | 5.1152 |

Embodiment 2

In Embodiment 1, there may be a case where $g_{CQI}(a)-\text{floor}(X/2)<2$ or $g_{CQI}(a)-\text{ceil}(X/2)<2$ when (P1=1, P2=5, P=2) or (P1=1, P2=5, P=4), and at this time, the new third CQI table may be generated via another method.

First, spectral efficiencies for indexes J (J=1, 2, . . . ) of the two provided CQI tables, i.e., the first CQI table and the

TABLE 23

| CQI index | modulation | code rate × 1024 | efficiency |
|---|---|---|---|
| 0 | | out of range | |
| 1 | QPSK | 62 | 0.1211 |
| 2 | QPSK | 97 | 0.1895 |
| 3 | QPSK | 155 | 0.3027 |
| 4 | QPSK | 245 | 0.4785 |
| 5 | QPSK | 364 | 0.7109 |
| 6 | QPSK | 504 | 0.9844 |
| 7 | QPSK | 654 | 1.2773 |
| 8 | 16 QAM | 427 | 1.6680 |
| 9 | 16 QAM | 537 | 2.0977 |
| 10 | 16 QAM | 629 | 2.4570 |
| 11 | 64 QAM | 515 | 3.0176 |
| 12 | 64 QAM | 599 | 3.5098 |
| 13 | 64 QAM | 704 | 4.1250 |
| 14 | 64 QAM | 804 | 4.7109 |
| 15 | 64 QAM | 889 | 5.2090 |

TABLE 24

| CQI index | modulation | code rate × 1024 | efficiency |
|---|---|---|---|
| 0 | | out of range | |
| 1 | QPSK | 54 | 0.1055 |

TABLE 24-continued

| CQI index | modulation | code rate × 1024 | efficiency |
|---|---|---|---|
| 2 | QPSK | 85 | 0.1660 |
| 3 | QPSK | 136 | 0.2656 |
| 4 | QPSK | 214 | 0.4180 |
| 5 | QPSK | 321 | 0.6270 |
| 6 | QPSK | 455 | 0.8887 |
| 7 | QPSK | 602 | 1.1758 |
| 8 | 16 QAM | 396 | 1.5469 |
| 9 | 16 QAM | 497 | 1.9414 |
| 10 | 16 QAM | 595 | 2.3242 |
| 11 | 64 QAM | 489 | 2.8652 |
| 12 | 64 QAM | 566 | 3.3164 |
| 13 | 64 QAM | 670 | 3.9258 |
| 14 | 64 QAM | 770 | 4.5117 |
| 15 | 64 QAM | 856 | 5.0156 |

TABLE 25

| CQI index | modulation | code rate × 1024 | efficiency |
|---|---|---|---|
| 0 | | out of range | |
| 1 | QPSK | 46 | 0.08984375 |
| 2 | QPSK | 73 | 0.142578125 |
| 3 | QPSK | 116 | 0.2265625 |
| 4 | QPSK | 182 | 0.35546875 |
| 5 | QPSK | 278 | 0.54296875 |
| 6 | QPSK | 406 | 0.79296875 |
| 7 | QPSK | 551 | 1.076171875 |
| 8 | 16 QAM | 364 | 1.421875 |
| 9 | 16 QAM | 457 | 1.78515625 |
| 10 | 16 QAM | 560 | 2.1875 |
| 11 | 64 QAM | 463 | 2.712890625 |
| 12 | 64 QAM | 533 | 3.123046875 |
| 13 | 64 QAM | 635 | 3.720703125 |
| 14 | 64 QAM | 735 | 4.306640625 |
| 15 | 64 QAM | 831 | 4.869140625 |

An example of generating the new CQI table in which the target BLER=$10^{-2}$ by using the method of Table 22 based on Tables 13 and 21 is shown in Table 26, and an example of generating the new CQI table in which the target BLER=$10^{-4}$ by using the method of Table 22 based on Tables 15 and 21 is shown in Table 27. When Tables 13 and 21 are used, in P=a*(P1+P2), P1=1, P2=3, and a=½, and when Tables 15 and 21 are used, P1=3, P2=5, and a=½.

TABLE 26

| CQI index | modulation | code rate × 1024 | efficiency |
|---|---|---|---|
| 0 | | out of range | |
| 1 | QPSK | 64 | 0.1250 |
| 2 | QPSK | 99 | 0.1934 |
| 3 | QPSK | 157 | 0.3066 |
| 4 | QPSK | 251 | 0.4902 |
| 5 | QPSK | 379 | 0.7402 |
| 6 | QPSK | 526 | 1.0273 |
| 7 | 16QAM | 340 | 1.3281 |
| | (or QPSK) | (or 679) | (or 1.3262) |
| 8 | 16QAM | 434 | 1.6953 |
| 9 | 16QAM | 553 | 2.1602 |
| 10 | 64QAM | 438 | 2.5664 |
| | (or 16QAM) | (or 658) | (or 2.5703) |
| 11 | 64QAM | 517 | 3.0293 |
| 12 | 64QAM | 616 | 3.6094 |
| 13 | 64QAM | 719 | 4.2129 |
| 14 | 64QAM | 822 | 4.8164 |
| 15 | 64QAM | 910 | 5.3320 |

TABLE 27

| CQI index | modulation | code rate × 1024 | efficiency |
|---|---|---|---|
| 0 | | out of range | |
| 1 | QPSK | 40 | 0.0781 |
| 2 | QPSK | 64 | 0.1250 |
| 3 | QPSK | 99 | 0.1934 |
| 4 | QPSK | 157 | 0.3066 |
| 5 | QPSK | 251 | 0.4902 |
| 6 | QPSK | 379 | 0.7402 |
| 7 | QPSK | 526 | 1.0273 |
| 8 | 16QAM | 340 | 1.3281 |
| | (or QPSK) | (or 679) | (or 1.3262) |
| 9 | 16QAM | 434 | 1.6953 |
| 10 | 16QAM | 553 | 2.1602 |
| 11 | 64QAM | 438 | 2.5664 |
| | (or 16QAM) | (or 658) | (or 2.5703) |
| 12 | 64QAM | 517 | 3.0293 |
| 13 | 64QAM | 616 | 3.6094 |
| 14 | 64QAM | 719 | 4.2129 |
| 15 | 64QAM | 822 | 4.8164 |

Hereinabove, the method of determining the third CQI table by newly determining the spectral efficiency considering the target BLER and the spectral efficiency for each index in the two different first CQI table and second CQI table has been described, and the CQI tables in Tables 22 to 27 may be determined as described above. The code rate or spectral efficiency of each CQI table may be determined by a value of "a" determined according to the target BLER. In other words, the code rate or spectral efficiency for the index J of the third CQI table may have a value of $(1-a)*R_1(J)+a*R_2(J)$ or $(1-a)*SE_1(J)+a*SE_2(J)$, or a value approximated thereto with respect to code rates $R_1(J)$ and $R_2(J)$ or spectral efficiencies $SE_1(J)$ and $SE_2(J)$ respectively corresponding to the first CQI table and the second CQI table.

Embodiment 3

In the 5G NR system, when the maximum modulation order is 8, i.e., when a 256QAM modulation scheme is allowed, there is only one CQI table for a case where the target BLER=0.1 of Table 14. In this case, a following method may be applied to generate the third CQI table in which the target BLER=0.001.

First, it may be determined that (QPSK, 50/1024) or (QPSK, 54/1024) is suitable as a combination of modulation and a code rate for an index 1 when the target BLER=0.001, from Table 21 of Embodiment 1 or Table 24 of Embodiment 2. As such, combinations suitable for an initial index may be first configured in a CQI table where the target BLER=0.001. (Here, a method of another embodiment of the disclosure may be used to configure the combinations, or the combinations may be determined after the operation SNR or the like is determined via simulation.) Then, indexes are assigned, sequentially from 1, to combinations corresponding to spectral efficiencies lower than lowest spectral efficiency in Table 14 from among the combinations suitable for the initial index, and remaining indexes are sequentially assigned to the combinations of modulation and a code rate in Table 14. For example, when the combination suitable for the initial index of the CQI table where BELR=0.001 is (QPSK, 50/1024), spectral efficiency of a combination of (QPSK, 50/1024) is lower than that of a combination of (QPSK, 78/1024) corresponding to the lowest spectral efficiency of Table 14, and thus index 1 is assigned to the combination as in Table 28, and remaining indexes are sequentially assigned to the combinations of Table 14. When X combinations suitable for the initial index are selected, X indexes among the combinations of Table 14 may be replaced by the combinations suitable for the initial index.

TABLE 28

| CQI index | modulation | code rate × 1024 | efficiency |
|---|---|---|---|
| 0 | | out of range | |
| 1 | QPSK | 50 | 0.0977 |
| 2 | QPSK | 78 | 0.1523 |
| 3 | QPSK | 193 | 0.3770 |
| 4 | QPSK | 449 | 0.8770 |
| 5 | 16QAM | 378 | 1.4766 |
| 6 | 16QAM | 490 | 1.9141 |
| 7 | 16QAM | 616 | 2.4063 |
| 8 | 64QAM | 466 | 2.7305 |
| 9 | 64QAM | 567 | 3.3223 |
| 10 | 64QAM | 666 | 3.9023 |
| 11 | 64QAM | 772 | 4.5234 |
| 12 | 64QAM | 873 | 5.1152 |
| 13 | 256QAM | 711 | 5.5547 |
| 14 | 256QAM | 797 | 6.2266 |
| 15 | 256QAM | 885 | 6.9141 |

The CQI tables of Tables 21 to 28 designed above are only examples, and in some cases, other combinations of modulation and a code rate, in which each code rate or spectral efficiency has an approximated value within 10 to 20% may be configured.

Embodiment 4

A method of determining the combination of modulation and code rate according to a CQI index, based on a pre-agreed rule while using an existing CQI table will be described. Generally, when a newly designed CQI table is applied to the system as in Embodiments 1 through 3, a parameter indicating corresponding CQI tables may be defined in higher layer signaling. For example, a eqi-Table parameter included in CSI-ReportConfig configures may be used to indicate the CQI tables in the 5G NR system. Also, in RRC or the like, it may be possible to indirectly indicate the CQI table by directly indicating the target BLER or a parameter corresponding thereto.

For example, when a specific CQI table is indicated via the cqi-Table included in the CSI-ReportConfig configures and the target BLER or a user category is separately indicated, a suitable CQI index may be determined based on a pre-agreed rule from the CQI table based on the CQI table, the BLER, or the user category indicated as above. Here, to report CSI to the base station, the UE may transmit, to the base station, the target BLER or user category, the CQI table, and CQI indexes determined based on a measured reception SNR via suitable parameters.

First, a code rate*1024 and spectral efficiency according to the index J in the CQI table are respectively referred to as R(J) and SE(J), a modulation order is referred to as Q(J), and the target BLER=$10^{-P}$. A method of determining a final code rate by determining a suitable value F(Q(J), P) based on the target BLER and the modulation order, and subtracting or adding the determined suitable value F(Q(J), P) from or to the code rate R(J) will be described. In other words, when the target BLER is indicated via higher layer signaling and the CQI table to be used is indicated, an actual code rate $R_{eff}(J)*1024$ may be calculated by using a method as Equation 1 below in general. (In the present disclosure, a value obtained by multiplying 1024 by a code rate is used for convenience, but the code rate may be used as it is.)

$$R_{eff}(J) = R(J) - F(Q(J), P)$$ [Equation 1]

In Equation 1, F(Q(J), P) may be a function complexly determined to a value P corresponding to the modulation order Q(J) and the target BLER. Also, F(Q(J), P) may be divided into independent functions, such as $F_1(Q(J))$ indicating a value determined based on the modulation order and $F_2(P)$ indicating a value determined according to the target BLER, such as $F(Q(J), P)=F_1(Q(J))+F_2(P)$. Also, in some cases, $F_1(Q(J))=0$ and thus $R_{eff}(J)$ may be configured to a value irrelevant to the modulation order. For example, when $F_1(Q(J))=0$, $F_2(P)=(P-1)*c$, according to Equation 1, $R_{eff}(J)= R(J)-c$ when the target BLER=$10^{-2}$, $R_{eff}(J)=R(J)-2*c$ when the target BLER BLER=$10^{-3}$, $R_{eff}(J)=R(J)-3*c$ when the target BLER=$10^{-4}$, and $R_{eff}(J)=R(J)-4*c$ when the target BLER=$10^{-5}$. In Equation 1, a suitable value may be selected for the constant c according to the system. For example, the constant c may be configured to be a value of 12 by evenly dividing a difference of 48 between values of 78 and 30 of index 1 in Tables 13 and 15, or may be a value configured considering an average of differences according to the combinations of modulation and a code rate.

In Equation 1, specific values are subtracted or added from or to an existing code rate according to a pre-agreed rule, but generally, a method of using specific ratio values may be used, for example, multiplying or dividing a suitable value to or by the existing code rate according to a pre-agreed rule.

Embodiment 5

In Embodiments 1 to 4 above, a method of designing or determining a CQI table has been described. The CQI table designed as such may be stored in the base station or UE and used to determine the CQI index or report the CSI.

For example, the CQI tables designed for the target BLER=0.001 as in Table 21, in addition to Tables 13, 14, and 15 may be used as follows to determine the CQI index or report the CSI.
[CQI Determination-2]
  A single PDSCH transport block having a combination of
    a modulation order (or technique), a target code rate, and a TBS corresponding to a CQI index needs to be received without exceeding a following transport block error probability.
  When a CSI-higher layer parameter cqi-Table included in
    the CSI-ReportConfig configures (or indicates) Table 13 or 10 above, a target transport block error probability is 0.1.
  When the CSI-higher layer parameter cqi-Table included
    in the CSI-ReportConfig configures (or indicates) Table 15 above, the target transport block error probability is 0.001.
  When the CSI-higher layer parameter cqi-Table included
    in the CSI-ReportConfig configures (or indicates) Table 15 above, the target transport block error probability is 0.00001.

In the above example, a case where the target BLER=0.001 is added and thus there are four CQI tables, but generally, some of Tables 23 to 28 may be additionally used when there are more target BLERs and considering further various service scenarios.

In Embodiments 1 to 5, a method of newly generating a CQI table or using the generated CQI table, and features of the generated CQI table have been described. Next, a method of designing an MCS table according to the target BLER will be described.

Embodiment 6

Because the error probability exponentially decreases compared to the SNR increase, an optimum MCS table may also be designed or configured considering the log-scale regarding the target BLER or the bit error rate. For example, the target BLER 0.001 corresponds to an intermediate value in a log-scale of the target BLERs 0.1 and 0.00001, an MCS table for the target BLER 0.001 may be generated by suitably using the MCS table of Table 16 and the MCS table of Table 20.

There may be a first MCS table and a second MCS table in which maximum modulation schemes or orders are the same while target BLERs are different, for example, $10^{-P1}$ and $10^{-P2}$. A new third MCS table in which a target BLER is $10^{-P}$ and a maximum modulation order is the same may be generated to satisfy at least some or all of following conditions. (wherein P1<P<P2.)

Condition 1: spectral efficiency corresponding to a combination of modulation and a code rate of an index I of the third MCS table is smaller than or equal to spectral efficiency corresponding to a combination of modulation and a code rate of an index I of the first MCS table and is equal to or greater than spectral efficiency corresponding to a combination of modulation and a code rate of an index I of the second MCS table.

Condition 2-1: same combinations of modulation and a code rate commonly included in the first MCS table and the second MCS table are all included in the third MCS table. Hereinafter, a set including the same combinations of modulation and a code rate is referred to as S1 for convenience.

Condition 2-2: when a combination having lowest spectral efficiency is C1 and a combination having highest spectral efficiency is C2 among the same combinations of modulation and a code rate commonly included in the first MCS table and the second MCS table, the third MCS table includes all combinations of modulation and a code rate, which is equal to or higher than C1 and less than or equal to C2 from the first and second MCS tables. Hereinafter, a set including the same combinations of modulation and a code rate is referred to as S2 for convenience.

Condition 3: when P=a*(P1+P2) and a number of the same combinations in Condition 2 is X, an index of a combination having lowest spectral efficiency among the same combinations is determined to be $g_{MCS}(a)$–floor(X/2) or $g_{MCS}(a)$–ceil(X/2), and indexes are sequentially determined for the remaining same combinations. Here, floor(x) denotes a largest integer equal to or smaller than a real number x, ceil(x) denotes a smallest integer equal to or greater than the real number x, and $g_{MCS}(a)$ denotes an integer determined according to a. a is a value suitably selected according to the target BLER, and a=⅓ to configure P=2, a=½ to configure P=3, and a=⅔ to configure P=4 when P1=1 and P2=5. In the disclosure, for convenience, $g_{MCS}$(½)=14 or 15, but another value may be configured. When $g_{MCS}(a)$–floor(X/2)<0, $g_{MCS}(a)$–ceil(X/2)<0, $g_{MCS}(a)$–floor(X/2)+X>28 (or 27), or $g_{MCS}(a)$–ceil(X/2)+X>28 (or 27), a combination of modulation and a code rate corresponding to less than index 1 or more than index 28 (or 27) is excluded.

Condition 4: when an index assigned to a combination having lowest spectral efficiency among the combinations included in the set S1 or S2 is J, J combinations having high spectral efficiency are sequentially assigned to indexes 0 to (J–1) from among the combinations of modulation and a code rate not included in the set S1 or S2 and having low spectral efficiency rather than the combinations of modulation and a code rate included in the set S1 or S2 from among combinations of modulation and a code rate of the second MCS table.

Condition 5: when an index assigned to a combination having highest spectral efficiency among the combinations included in the set S1 or S2 is K, (28–K) or (27–K) combinations having low spectral efficiency are sequentially assigned to indexes (K+1) to 28 or 27 from among the combinations of modulation and a code rate not included in the set S1 or S2 and having high spectral efficiency rather than the combinations of modulation and a code rate included in the set S1 or S2 from among combinations of modulation and a code rate of the first MCS table. Here, the value of 28 or 27 may vary depending on a number of indexes reserved in a provided MCS table. (For example, 31–(number of reserved indexes))

A method of generating a new MCS table in which a target BLER is 10' by using Tables 16 and 18, according to a specific embodiment of the disclosure considering the above conditions will now be described. First, the set S1 of the combinations of modulation and a code rate commonly included in Tables 16 and 18 are determined according to Condition 2-1. There are total 23 common combinations, i.e., (QPSK, 120/1024), (QPSK, 157/1024), (QPSK, 193/1024), (QPSK, 251/1024), (QPSK, 308/1024), (QPSK, 379/1024), (QPSK, 449/1024), (QPSK, 526/1024), (QPSK, 602/1024), (16QAM, 340/1024), (16QAM, 378/1024), (16QAM, 434/1024), (16QAM, 490/1024), (16QAM, 553/1024), (16QAM, 616/1024), (64QAM, 438/1024), (64QAM, 466/1024), (64QAM, 517/1024), (64QAM, 567/1024), (64QAM, 616/1024), (64QAM, 666/1024), and (64QAM, 719/1024), and (64QAM, 772/1024). (X1=23).

When the set S2 of the combinations of modulation and a code rate is determined according to Condition 2-2 for Tables 16 and 18, there are total 25 combinations included in S2, i.e., (QPSK, 120/1024), (QPSK, 157/1024), (QPSK, 193/1024), (QPSK, 251/1024), (QPSK, 308/1024), (QPSK, 379/1024), (QPSK, 449/1024), (QPSK, 526/1024), (QPSK, 602/1024), (QPSK, 679/1024), (16QAM, 340/1024), (16QAM, 378/1024), (16QAM, 434/1024), (16QAM, 490/1024), (16QAM, 553/1024), (16QAM, 616/1024), (16QAM, 658/1024), (64QAM, 438/1024), (64QAM, 466/1024), (64QAM, 517/1024), (64QAM, 567/1024), (64QAM, 616/1024), (64QAM, 666/1024), (64QAM, 719/1024), and (64QAM, 772/1024).

(X2=25).

Then, because a=½ according to Condition 3, when $g_{MCS}$(½)=14, $g_{MCS}(a)$–floor(X/2)=14–12=2. Accordingly, indexes 2 to 24 are sequentially assigned to the 23 combinations included in the set S1. Then, according to Condition 4, index 0 is assigned to the combination of (QPSK, 78/1024) and index 1 is assigned to the combination of (QPSK, 99/1024) in Table 18, and indexes 25, 26, 27, and 28 are sequentially assigned to the combinations of (64QAM, 822/1024), (64QAM, 873/1024), (64QAM, 910/1024), and (64QAM, 948/1024) in Table 16.

The MCS table generated as such is shown in Table 29.

TABLE 29

| MCS Index $I_{MCS}$ | Modulation Order Qm | Target code Rate R × [1024] | Spectral efficiency |
|---|---|---|---|
| 0 | 2 | 78 | 0.1523 |
| 1 | 2 | 99 | 0.1934 |
| 2 | 2 | 120 | 0.2344 |
| 3 | 2 | 157 | 0.3066 |
| 4 | 2 | 193 | 0.3770 |
| 5 | 2 | 251 | 0.4902 |
| 6 | 2 | 308 | 0.6016 |
| 7 | 2 | 379 | 0.7402 |
| 8 | 2 | 449 | 0.8770 |
| 9 | 2 | 526 | 1.0273 |
| 10 | 2 | 602 | 1.1758 |
| 11 | 4 | 340 | 1.3281 |
| 12 | 4 | 378 | 1.4766 |
| 13 | 4 | 434 | 1.6953 |
| 14 | 4 | 490 | 1.9141 |
| 15 | 4 | 553 | 2.1602 |
| 16 | 4 | 616 | 2.4063 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | reserved | |
| 30 | 4 | reserved | |
| 31 | 6 | reserved | |

In Condition 3, when $g_{MCS}(1/2)=15$, $g_{MCS}(a)-\text{floor}(X/2)=15-12=3$, and thus indexes 3 to 25 are sequentially assigned to the 23 combinations included in the set S1. Also, according to Condition 4, indexes 0, 1, and 2 are assigned to the combinations of (QPSK, 64/1024), (QPSK, 78/1024), and (QPSK, 99/1024) in Table 18, and indexes 26, 27, and 28 are sequentially assigned to the combinations of (64QAM, 822/1024), (64QAM, 873/1024), and (64QAM, 910/1024) in Table 16.

The MCS table generated as such is shown in Table 30.

TABLE 30

| MCS Index $I_{MCS}$ | Modulation Order Qm | Target code Rate R × [1024] | Spectral efficiency |
|---|---|---|---|
| 0 | 2 | 64 | 0.1250 |
| 1 | 2 | 78 | 0.1523 |
| 2 | 2 | 99 | 0.1934 |
| 3 | 2 | 120 | 0.2344 |
| 4 | 2 | 157 | 0.3066 |
| 5 | 2 | 193 | 0.3770 |
| 6 | 2 | 251 | 0.4902 |
| 7 | 2 | 308 | 0.6016 |
| 8 | 2 | 379 | 0.7402 |
| 9 | 2 | 449 | 0.8770 |
| 10 | 2 | 526 | 1.0273 |
| 11 | 2 | 602 | 1.1758 |
| 12 | 4 | 340 | 1.3281 |
| 13 | 4 | 378 | 1.4766 |
| 14 | 4 | 434 | 1.6953 |
| 15 | 4 | 490 | 1.9141 |
| 16 | 4 | 553 | 2.1602 |
| 17 | 4 | 616 | 2.4063 |
| 18 | 6 | 438 | 2.5664 |
| 19 | 6 | 466 | 2.7305 |
| 20 | 6 | 517 | 3.0293 |
| 21 | 6 | 567 | 3.3223 |
| 22 | 6 | 616 | 3.6094 |
| 23 | 6 | 666 | 3.9023 |
| 24 | 6 | 719 | 4.2129 |
| 25 | 6 | 772 | 4.5234 |
| 26 | 6 | 822 | 4.8164 |
| 27 | 6 | 873 | 5.1152 |
| 28 | 6 | 910 | 5.3320 |
| 29 | 2 | reserved | |
| 30 | 4 | reserved | |
| 31 | 6 | reserved | |

In Condition 3, when $g_{MCS}(1/2)=14$ and the MCS table is generated based on the set S2, $g_{MCS}(a)-\text{floor}(X/2)=14-12=2$, and thus indexes 2 to 26 are sequentially assigned to the 25 combinations included in the set S2. Also, according to Condition 4, indexes 0 and 1 are sequentially assigned to the combination of (QPSK, 78/1024) and (QPSK, 99/1024) in Table 18, and indexes 27 and 28 are sequentially assigned to the combinations of (64QAM, 822/1024) and (64QAM, 873/1024) in Table 16.

The MCS table generated as such is shown in Table 31.

TABLE 31

| MCS Index $I_{MCS}$ | Modulation Order Qm | Target code Rate R × [1024] | Spectral efficiency |
|---|---|---|---|
| 0 | 2 | 78 | 0.1523 |
| 1 | 2 | 99 | 0.1934 |
| 2 | 2 | 120 | 0.2344 |
| 3 | 2 | 157 | 0.3066 |
| 4 | 2 | 193 | 0.3770 |
| 5 | 2 | 251 | 0.4902 |
| 6 | 2 | 308 | 0.6016 |
| 7 | 2 | 379 | 0.7402 |
| 8 | 2 | 449 | 0.8770 |
| 9 | 2 | 526 | 1.0273 |
| 10 | 2 | 602 | 1.1758 |
| 11 | 2 | 679 | 1.3262 |
| 12 | 4 | 340 | 1.3281 |
| 13 | 4 | 378 | 1.4766 |
| 14 | 4 | 434 | 1.6953 |
| 15 | 4 | 490 | 1.9141 |
| 16 | 4 | 553 | 2.1602 |
| 17 | 4 | 616 | 2.4063 |
| 18 | 4 | 658 | 2.5703 |
| 19 | 6 | 438 | 2.5664 |
| 20 | 6 | 466 | 2.7305 |
| 21 | 6 | 517 | 3.0293 |
| 22 | 6 | 567 | 3.3223 |
| 23 | 6 | 616 | 3.6094 |
| 24 | 6 | 666 | 3.9023 |
| 25 | 6 | 719 | 4.2129 |
| 26 | 6 | 772 | 4.5234 |
| 27 | 6 | 822 | 4.8164 |
| 28 | 6 | 873 | 5.1152 |
| 29 | 2 | reserved | |
| 30 | 4 | reserved | |
| 31 | 6 | reserved | |

As such, another MCS table may be generated by using the set S1 or S2 while changing a value of $g_{MCS}(a)$ and a calculation value of floor(X/2) or ceil(X/2).

Embodiment 7

In the 5G NR system, when the maximum modulation order is 8, i.e., when a 256QAM modulation scheme is allowed, there is only one MCS table for a case where the target BLER=0.1 of Table 14. In this case, a following method may be applied to generate the third MCS table in which the target BLER=0.001.

First, it may be determined that (QPSK, 64/1024) or (QPSK, 78/1024) is suitable as the combination of modulation and a code rate for the index 0 when the target BLER=0.001 from Tables 29 to 31 in Embodiment 6, and the combinations suitable for the initial index in the MCS table where the target BLER=0.001 may be configured to be (QPSK, 64/1024), (QPSK, 78/1024), and (QPSK, 99/1024). (Here, a method of another embodiment of the disclosure may be used to configure the combinations, or the combinations may be determined after the operation SNR or the like is determined via simulation.) Then, indexes are assigned, sequentially from 0, to combinations corresponding to spectral efficiencies lower than lowest spectral efficiency in Table 17 from among the combinations suitable for the initial index, and remaining indexes are sequentially assigned to the combinations of modulation and a code rate in Table 14. For example, because spectral efficiencies of the combinations of (QPSK, 64/1024), (QPSK, 78/1024), (QPSK, 99/1024) are less than that of the combination of (QPSK, 120/1024) corresponding to lowest spectral efficiency in Table 17, indexes 0, 1, and 2 may be respectively assigned to the combinations as shown in Table 32, and the remaining indexes are sequentially assigned to the existing combinations of Table 17. Similarly, when (QPSK, 78/1024) and (QPSK, 99/1024) are configured as the combinations suitable for the initial index, an MCS table of Table 33 may be obtained, and when X combinations suitable for the initial index are selected, X indexes in the combinations of Table 17 may be replaced by the combinations suitable for the initial index.

TABLE 32

| MCS Index $I_{MCS}$ | Modulation Order Qm | Target code Rate R × [1024] | Spectral efficiency |
|---|---|---|---|
| 0 | 2 | 64 | 0.1250 |
| 1 | 2 | 78 | 0.1523 |
| 2 | 2 | 99 | 0.1934 |
| 3 | 2 | 120 | 0.2344 |
| 4 | 2 | 193 | 0.3770 |
| 5 | 2 | 308 | 0.6016 |
| 6 | 2 | 449 | 0.8770 |
| 7 | 2 | 602 | 1.1758 |
| 8 | 4 | 378 | 1.4766 |
| 9 | 4 | 434 | 1.6953 |
| 10 | 4 | 490 | 1.9141 |
| 11 | 4 | 553 | 2.1602 |
| 12 | 4 | 616 | 2.4063 |
| 13 | 4 | 658 | 2.5703 |
| 14 | 6 | 466 | 2.7305 |
| 15 | 6 | 517 | 3.0293 |
| 16 | 6 | 567 | 3.3223 |
| 17 | 6 | 616 | 3.6094 |
| 18 | 6 | 666 | 3.9023 |
| 19 | 6 | 719 | 4.2129 |
| 20 | 6 | 772 | 4.5234 |
| 21 | 6 | 822 | 4.8164 |
| 22 | 6 | 873 | 5.1152 |
| 23 | 8 | 682.5 | 5.3320 |
| 24 | 8 | 711 | 5.5547 |
| 25 | 8 | 754 | 5.8906 |
| 26 | 8 | 797 | 6.2266 |
| 27 | 8 | 841 | 6.5703 |
| 28 | 2 | reserved | |
| 29 | 4 | reserved | |
| 30 | 6 | reserved | |
| 31 | 8 | reserved | |

TABLE 33

| MCS Index $I_{MCS}$ | Modulation Order Qm | Target code Rate R × [1024] | Spectral efficiency |
|---|---|---|---|
| 0 | 2 | 78 | 0.1523 |
| 1 | 2 | 99 | 0.1934 |
| 2 | 2 | 120 | 0.2344 |
| 3 | 2 | 193 | 0.3770 |
| 4 | 2 | 308 | 0.6016 |
| 5 | 2 | 449 | 0.8770 |
| 6 | 2 | 602 | 1.1758 |
| 7 | 4 | 378 | 1.4766 |
| 8 | 4 | 434 | 1.6953 |
| 9 | 4 | 490 | 1.9141 |
| 10 | 4 | 553 | 2.1602 |
| 11 | 4 | 616 | 2.4063 |
| 12 | 4 | 658 | 2.5703 |
| 13 | 6 | 466 | 2.7305 |
| 14 | 6 | 517 | 3.0293 |
| 15 | 6 | 567 | 3.3223 |
| 16 | 6 | 616 | 3.6094 |
| 17 | 6 | 666 | 3.9023 |
| 18 | 6 | 719 | 4.2129 |
| 19 | 6 | 772 | 4.5234 |
| 20 | 6 | 822 | 4.8164 |
| 21 | 6 | 873 | 5.1152 |
| 22 | 8 | 682.5 | 5.3320 |
| 23 | 8 | 711 | 5.5547 |
| 24 | 8 | 754 | 5.8906 |
| 25 | 8 | 797 | 6.2266 |
| 26 | 8 | 841 | 6.5703 |
| 27 | 8 | 885 | 6.9141 |
| 28 | 2 | reserved | |
| 29 | 4 | reserved | |
| 30 | 6 | reserved | |
| 31 | 8 | reserved | |

The MCS tables of Tables 29 to 33 designed above are only examples, and in some cases, other combinations of modulation and a code rate, in which each code rate or spectral efficiency has an approximated value within 10 to 20% may be configured.

Embodiment 8

The current embodiment of the disclosure relates to a method of designing a suitable MCS table when a 1024QAM modulation scheme in which a maximum modulation order is 10 is allowed in a wireless communication system, such as the 5G NR system, and a method of transmitting and receiving data based on the MSC table.

First, a CQI table is defined as Table 34 in the wireless communication system. In other words, it is assumed that the CQI table of Table 34 may be configured by the UE or the base station as the cqi_table parameter in [CQI Determination-1] or [CQI Determination-2]. (For convenience of description, the present disclosure is described based on a suitable CQI table, in which a target transport block error probability is 0.1, when the CSI-higher layer parameter cqi-Table included in the CSI-ReportConfig configures (or indicates) Table 34, but is not limited thereto and may be identically applied to another CQI table.)

TABLE 34

| CQI index | modulation | code rate × 1024 | Spectral efficiency |
|---|---|---|---|
| 0 | | out of range | |
| 1 | QPSK | 78 | 0.1523 |
| 2 | QPSK | 193 | 0.3770 |
| 3 | QPSK | 449 | 0.8770 |
| 4 | 16QAM | 378 | 1.4766 |

TABLE 34-continued

| CQI index | modulation | code rate × 1024 | Spectral efficiency |
|---|---|---|---|
| 5 | 16QAM | 616 | 2.4063 |
| 6 | 64QAM | 567 | 3.3223 |
| 7 | 64QAM | 666 | 3.9023 |
| 8 | 64QAM | 772 | 4.5234 |
| 9 | 64QAM | 873 | 5.1152 |
| 10 | 256QAM | 711 | 5.5547 |
| 11 | 256QAM | 797 | 6.2266 |
| 12 | 256QAM | 885 | 6.9141 |
| 13 | 256QAM | 948 | 7.4063 |
| 14 | 1024QAM | 853 | 8.3321 |
| 15 | 1024QAM | 948 | 9.2578 |

A newly defined MCS table may be designed by the UE or base station based on Table 17 that is one of MCS tables of the 5G NR system, and for convenience of description, it is assumed that in the newly defined MCS table, MCS indexes 23 to 26 correspond to the 1024QAM modulation scheme, i.e., the modulation order 10. When an MCS index 22 corresponds to 256QAM, the MCS index 23 may be configured to be an average of spectral efficiencies corresponding to CQI indexes 13 and 14 of Table 34 or a value approximated to the average. For example, because the average of the spectral efficiency 7.4063 of the CQI index 13 of Table 34 and the spectral efficiency 8.3321 of the CQI index 14 of Table 34 is 7.8692, the spectral efficiency corresponding to the index 23 of the newly defined MCS table may be configured to be 7.8692 or an approximated value. Because the spectral efficiency 7.4063 of the CQI index 13 of Table 34 and the spectral efficiency 8.3321 of the CQI index 14 of Table 34 are approximated values of actual spectral efficiencies, the average may be further accurately obtained as below.

$$\frac{1}{2} \times \left( \frac{948}{1024} \times 8 + \frac{853}{1024} \times 10 \right) \cong 7.8682.$$

In some cases, the spectral efficiency may be defined (or determined) by the approximated value of the average instead of the accurate average, and here, the approximated value may be within +3% or −3% of the accurate average.

When the spectral efficiency is determined to be 7.8682, [code rate (R)×1024] has a value close to 805.7, and when the spectral efficiency is determined to be 7.8692, [code rate (R)×1024] has a value close to 805.8, and thus [code rate (R)×1024] of the MCS index 23 may be defined to a value such as 805, 805.5, 806, or 806.5. Also, spectral efficiencies corresponding to the values of [code rate (R)×1024](805, 805.5, 806, and 806.5) may be respectively 7.8613, 7.8662, 7.8711, and 7.8760.

The spectral efficiency and [code rate (R)×1024] corresponding to the MCS index 24 of the newly defined MCS table may use values corresponding to the index 14 of the CQI table of Table 34. Similarly, the spectral efficiency and [code rate (R)×1024] corresponding to the MCS index 26 may use the values corresponding to the index 15 of the CQI table of Table 34.

The spectral efficiency corresponding to the MCS index 25 of the newly defined MCS table may be determined to be an average of values corresponding to the CQI index 14 and the CQI index 15 of Table 34 or an approximated value of the average. (Alternatively, an average of values corresponding to the MCS index 24 and the MCS index 26 or an approximated value of the average.)

Because the spectral efficiencies corresponding to the CQI index 14 and the CQI index 15 of Table 34 are respectively 8.3321 and 9.2578, the average thereof is close to 8.7950. Alternatively, an accurate average is:

$$\frac{1}{2} \times \left( \frac{853}{1024} \times 10 + \frac{948}{1024} \times 10 \right) \cong 8.7939.$$

Thus, the average of the spectral efficiency may be 8.7939. Accordingly, the spectral efficiency corresponding to the MCS index 25 may be determined to be an approximated value of the accurate average, such as 8.7939 or 8.7950. Here, the approximated value may be within −3% to +3% of the accurate average.

When the spectral efficiency is determined to be 8.7939, [code rate (R)×1024] has a value close to 900.5, and when the spectral efficiency is determined to be 8.7950, [code rate (R)×1024] has a value close to 900.6, and thus [code rate (R)×1024] of the MCS index 25 may have a value such as 900, 900.5, or 901. Also, spectral efficiencies corresponding to [code rate (R)×1024](900, 900.5, or 901) may be respectively 8.7891, 8.7939 (to 8.7940), and 8.7988.

An example of the MCS table designed via the method described above is shown in Table 35. For reference, indexes 27 to 31 in Table 35 respectively correspond to modulation orders 2, 4, 6, 8, and 10, and are indexes configurable for retransmission of data.

TABLE 35

| MCS Index $I_{MCS}$ | Modulation Order Qm | Target Code Rate R × [1024] | Spectral Efficiency |
|---|---|---|---|
| 0 | — | — | — |
| 1 | — | — | — |
| ... | ... | ... | ... |
| 22 | — | — | — |
| 23 | 10 | 805.5 | 7.8662 |
| 24 | 10 | 853 | 8.3321 |
| 25 | 10 | 900.5 | 8.7939 |
| 26 | 10 | 948 | 9.2578 |
| 27 | 2 | reserved | |
| 28 | 4 | reserved | |
| 29 | 6 | reserved | |
| 30 | 8 | reserved | |
| 31 | 10 | reserved | |

Table 35 is an example of the MCS table obtained by removing four indexes for 1024QAM and one index for reserved indication from Table 17. Here, various MCS tables may be determined according to a method of determining an MCS combination to be removed from Table 17. (Here, an MCS index 0 may be always configured because, generally, a combination of the MCS index 0 denotes a most robust combination of a modulation order and a code rate endurable in the system.)

For example, three combinations of a modulation order and a code rate may be removed from the MCS index corresponding to a modulation order 4 of Table 17 and two combinations of a modulation order and a code rate may be removed from the MCS index corresponding to a modulation order 6, MCS indexes may be rearranged sequentially, and then the MCS index corresponding to 1024QAM of Table 35 may be combined to configure the new MCS table. Specifically, an example of removing combinations of a modulation order and a code rate (three combinations) of MCS indexes 5, 7, and 9 from the MCS index corresponding to the modulation order 4 in Table 17, removing combinations of a modulation order and a code rate (two combinations) of MCS indexes 12 and 14 from the MCS index corresponding to the modulation order 6, and then combining Table 17 with Table 35 is shown in Table 36.

TABLE 36

| MCS Index $I_{MCS}$ | Modulation Order Qm | Target code Rate R × [1024] | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 434 | 1.6953 |
| 6 | 4 | 553 | 2.1602 |
| 7 | 4 | 658 | 2.5703 |
| 8 | 6 | 466 | 2.7305 |
| 9 | 6 | 567 | 3.3223 |
| 10 | 6 | 666 | 3.9023 |
| 11 | 6 | 719 | 4.2129 |
| 12 | 6 | 772 | 4.5234 |
| 13 | 6 | 822 | 4.8164 |
| 14 | 6 | 873 | 5.1152 |
| 15 | 8 | 682.5 | 5.3320 |
| 16 | 8 | 711 | 5.5547 |
| 17 | 8 | 754 | 5.8906 |
| 18 | 8 | 797 | 6.2266 |
| 19 | 8 | 841 | 6.5703 |
| 20 | 8 | 885 | 6.9141 |
| 21 | 8 | 916.5 | 7.1602 |
| 22 | 8 | 948 | 7.4063 |
| 23 | 10 | 805.5 | 7.8662 |
| 24 | 10 | 853 | 8.3321 |
| 25 | 10 | 900.5 | 8.7939 |
| 26 | 10 | 948 | 9.2578 |
| 27 | 2 | reserved | |
| 28 | 4 | reserved | |
| 29 | 6 | reserved | |
| 30 | 8 | reserved | |
| 31 | 10 | reserved | |

Another example of removing combinations of a modulation order and a code rate of MCS indexes 5, 7, and 9 from the MCS index corresponding to the modulation order 4 in Table 17, of an MCS index 11 from the MCS index corresponding to the modulation order 6, and of an MCS index 20 from the MCS index corresponding to the modulation order 8, and then combining Table 17 with Table 35 is shown in Table 37.

TABLE 37

| MCS Index $I_{MCS}$ | Modulation Order Qm | Target code Rate R × [1024] | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 434 | 1.6953 |
| 6 | 4 | 553 | 2.1602 |
| 7 | 4 | 658 | 2.5703 |
| 8 | 6 | 517 | 3.0293 |
| 9 | 6 | 567 | 3.3223 |
| 10 | 6 | 616 | 3.6094 |
| 11 | 6 | 666 | 3.9023 |
| 12 | 6 | 719 | 4.2129 |
| 13 | 6 | 772 | 4.5234 |
| 14 | 6 | 822 | 4.8164 |
| 15 | 8 | 873 | 5.1152 |
| 16 | 8 | 711 | 5.5547 |
| 17 | 8 | 754 | 5.8906 |
| 18 | 8 | 797 | 6.2266 |
| 19 | 8 | 841 | 6.5703 |
| 20 | 8 | 885 | 6.9141 |
| 21 | 8 | 916.5 | 7.1602 |
| 22 | 8 | 948 | 7.4063 |
| 23 | 10 | 805.5 | 7.8662 |
| 24 | 10 | 853 | 8.3321 |
| 25 | 10 | 900.5 | 8.7939 |
| 26 | 10 | 948 | 9.2578 |
| 27 | 2 | reserved | |
| 28 | 4 | reserved | |
| 29 | 6 | reserved | |
| 30 | 8 | reserved | |
| 31 | 10 | reserved | |

Another example of removing combinations of a modulation order and a code rate of a MCS index 4 from the MCS index corresponding to the modulation order 2 in Table 17, of MCS indexes 7 and 9 from the MCS index corresponding to the modulation order 4, and of MCS indexes 12 and 14 from the MCS index corresponding to the modulation order 6, and then combining Table 17 with Table 35 is shown in Table 38.

TABLE 38

| MCS Index $I_{MCS}$ | Modulation Order Qm | Target code Rate R × [1024] | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 4 | 378 | 1.4766 |
| 5 | 4 | 434 | 1.6953 |
| 6 | 4 | 553 | 2.1602 |
| 7 | 4 | 658 | 2.5703 |
| 8 | 6 | 466 | 2.7305 |
| 9 | 6 | 567 | 3.3223 |
| 10 | 6 | 666 | 3.9023 |
| 11 | 6 | 719 | 4.2129 |
| 12 | 6 | 772 | 4.5234 |
| 13 | 6 | 822 | 4.8164 |
| 14 | 6 | 873 | 5.1152 |
| 15 | 8 | 682.5 | 5.3320 |
| 16 | 8 | 711 | 5.5547 |
| 17 | 8 | 754 | 5.8906 |
| 18 | 8 | 797 | 6.2266 |
| 19 | 8 | 841 | 6.5703 |
| 20 | 8 | 885 | 6.9141 |
| 21 | 8 | 916.5 | 7.1602 |
| 22 | 8 | 948 | 7.4063 |
| 23 | 10 | 805.5 | 7.8662 |
| 24 | 10 | 853 | 8.3321 |
| 25 | 10 | 900.5 | 8.7939 |
| 26 | 10 | 948 | 9.2578 |
| 27 | 2 | reserved | |
| 28 | 4 | reserved | |
| 29 | 6 | reserved | |
| 30 | 8 | Reserved | |

As such, regarding the method of configuring the new MCS table based on the MCS table of Table 17, when a reserved field corresponding to 1024QAM is to be added while adding D combinations of a modulation order and a code rate corresponding to 1024QAM, (D+1) combinations need to be removed from the MCS combinations of Table 17. In Tables 36 to 38, D=4. For reference, because indexes for reserved indication are generally used for retransmission, the MCS index corresponding to each modulation order may be included in the MCS table, but in some cases, reserved index corresponding to a specific modulation order may be omitted.

Tables 35 to 38 are only examples, and combinations of a modulation order and a code rate corresponding to some MCS levels in each MCS table may be removed or changed. Also, the new MCS table may be generated by suitably combining the combinations of a modulation order and a code rate of each MCS table.

For example, when the MCS table is configured to include the combinations of a modulation order and a code rate included in the CQI table and the spectral efficiencies corresponding thereto as much as possible, an MCS table different from the MCS table of Tables 35 to 38 may be defined. Here, the meaning of including the combinations of a modulation order and a code rate included in the CQI table and the spectral efficiencies corresponding thereto as much as possible may indicate that all of the combinations of a modulation order and a code rate included in the CQI table are included in the MCS table, except one to three combinations.

For example, when the MCS table is designed such that combinations when the modulation order is 4 are included as much as possible among the combinations of a modulation order and a code rate included in the CQI table of Table 34, the MCS table may include all or at least one of (modulation order, [code rate (R)×1024], spectral efficiency)=(4, 378, 1.4766) or (4, 616, 2.4063). As an example of such an MCS table, the MCS table may include the combinations of a modulation order and a code rate except for the combinations of a modulation order and a code rate corresponding to the MCS indexes 6, 8, and 10 among the MCS indexes corresponding to the modulation order in Table 17. In other words, the MCS table in which (modulation order, [code rate (R)×1024], spectral efficiency)=(4, 378, 1.4766) is defined for the MCS index 5, (modulation order, [code rate (R)×1024], spectral efficiency)=(4, 490, 1.9141) is defined for the MCS index 6, and (modulation order, [code rate (R)×1024], spectral efficiency)=(4, 616, 2.4063) is defined for the MCS index 7 in Tables 36 and 37 may be defined. This is only an example, and the MCS table including at least one of (modulation order, [code rate (R)×1024], spectral efficiency)=(4, 378, 1.4766) or (4, 616, 2.4063) while including at least one or up to two of (4, 434, 1.6953), (4, 490, 1.9141), (4, 553, 2.1602), or (4, 658, 2.5703) may be defined. Specific examples of the MCS table proposed in the embodiment of the disclosure are shown in Tables 36-1 and 37-1.

TABLE 36-1

| MCS Index $I_{MCS}$ | Modulation Order Qm | Target code Rate R × [1024] | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 490 | 1.9141 |
| 7 | 4 | 616 | 2.4063 |
| 8 | 6 | 466 | 2.7305 |
| 9 | 6 | 567 | 3.3223 |
| 10 | 6 | 666 | 3.9023 |
| 11 | 6 | 719 | 4.2129 |
| 12 | 6 | 772 | 4.5234 |
| 13 | 6 | 822 | 4.8164 |
| 14 | 6 | 873 | 5.1152 |
| 15 | 8 | 682.5 | 5.3320 |
| 16 | 8 | 711 | 5.5547 |
| 17 | 8 | 754 | 5.8906 |
| 18 | 8 | 797 | 6.2266 |
| 19 | 8 | 841 | 6.5703 |
| 20 | 8 | 885 | 6.9141 |
| 21 | 8 | 916.5 | 7.1602 |
| 22 | 8 | 948 | 7.4063 |

TABLE 36-1-continued

| MCS Index $I_{MCS}$ | Modulation Order Qm | Target code Rate R × [1024] | Spectral efficiency |
|---|---|---|---|
| 23 | 10 | 805.5 | 7.8662 |
| 24 | 10 | 853 | 8.3321 |
| 25 | 10 | 900.5 | 8.7939 |
| 26 | 10 | 948 | 9.2578 |
| 27 | 2 | reserved | |
| 28 | 4 | reserved | |
| 29 | 6 | reserved | |
| 30 | 8 | reserved | |
| 31 | 10 | reserved | |

TABLE 37-1

| MCS Index $I_{MCS}$ | Modulation Order Qm | Target code Rate R × [1024] | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 490 | 1.9141 |
| 7 | 4 | 616 | 2.4063 |
| 8 | 6 | 517 | 3.0293 |
| 9 | 6 | 567 | 3.3223 |
| 10 | 6 | 616 | 3.6094 |
| 11 | 6 | 666 | 3.9023 |
| 12 | 6 | 719 | 4.2129 |
| 13 | 6 | 772 | 4.5234 |
| 14 | 6 | 822 | 4.8164 |
| 15 | 8 | 873 | 5.1152 |
| 16 | 8 | 711 | 5.5547 |
| 17 | 8 | 754 | 5.8906 |
| 18 | 8 | 797 | 6.2266 |
| 19 | 8 | 841 | 6.5703 |
| 20 | 8 | 885 | 6.9141 |
| 21 | 8 | 916.5 | 7.1602 |
| 22 | 8 | 948 | 7.4063 |
| 23 | 10 | 805.5 | 7.8662 |
| 24 | 10 | 853 | 8.3321 |
| 25 | 10 | 900.5 | 8.7939 |
| 26 | 10 | 948 | 9.2578 |
| 27 | 2 | reserved | |
| 28 | 4 | reserved | |
| 29 | 6 | reserved | |
| 30 | 8 | reserved | |
| 31 | 10 | reserved | |

Similarly, in Table 38 as well, the MCS table in which at least one of the index 6 or 7 among the indexes 5 to 7 is defined to be (modulation order, [code rate (R)×1024], spectral efficiency)=(4, 616, 2.4063), and the remaining two or one index is defined to be at least two or one of (modulation order, [code rate (R)×1024], spectral efficiency)=(4, 434, 1.6953), (4, 490, 1.9141), (4, 553, 2.1602), or (4, 658, 2.5703) may be defined.

The spectral efficiencies included in Tables 35 to 38, 36-1, and 37-1 may be replaced by approximated values. For example, regarding the index 23 of Tables 35 to 38, 36-1, and 37-1, ([code rate (R)×1024], spectral efficiency) may be replaced by (805, 7.8613), (806, 7.8711), or (806.5, 7.8760). Similarly, regarding the index 25 of Tables 35 to 38, 36-1, and 37-1, ([code rate (R)×1024], spectral efficiency) may be replaced by (900, 8.7891) or (901, 8.7988). Spectral efficiencies of 7.8662, 8.3321, 8.7939, and 9.2578 respectively corresponding to the MCS indexes 23, 24, 25, and 26 of Tables 35 to 38, 36-1, and 37-1 may be replaced by approximated values within −3% to +3%. When the spectral efficiencies are referred to as SE (23), SE (24), SE (25), and SE (26), [code rate (R)×1024] may be generally configured to have one of $$\lfloor SE(i)/10 \times 1024 \rfloor,$$

$$\left\lceil \frac{SE(i)}{10} \times 1024 \right\rceil,$$

$\lfloor SE(i)/10 \times 1024 \rfloor \pm 0.5$ and $\lceil SE(i)/10 \times 1024 \rceil \pm 0.5$ for i=23, 24, 25, 26. (Here, $\lfloor \cdot \rfloor$ denotes a flooring operation and $\lceil \cdot \rceil$ denotes a ceiling operation.)

Embodiment 9

A method of determining the combination of modulation and code rate according to an MCS index, based on a pre-agreed rule while using an existing MCS table will be described. Generally, when the newly designed MCS tables as in Embodiments 6 and 7 are applied to the system, the MCS tables may be indicated by using parameters corresponding to the MCS tables via higher layer signaling. Also, in RRC or the like, it may be possible to indirectly indicate the MCS tables by directly indicating the target BLER or a parameter corresponding thereto.

For example, when a specific MCS table is indicated via higher layer signaling and the target BLER or user category is separately indicated, a suitable MCS index may be determined based on a pre-determined rule from the MCS table, based on the MCS table, the BLER, or the user category indicated according to indicators thereof. Here, the base station may indicate the target BLER or the user category together with the MCS table to the UE, and the UE may determine the MCS index according to the target BLER, i.e., determine the modulation scheme and the code rate or spectral efficiency.

First, the code rate*1024 and spectral efficiency according to the index J in the MCS table are respectively referred to as R(J) and SE(J), the modulation order is referred to as Q(J), and the target BLER=$10^{-P}$. A method of determining a final code rate by determining a suitable value F(Q(J), P) based on the target BLER and the modulation order, and subtracting or adding the determined suitable value F(Q(J), P) from or to the code rate R(J) will be described. In other words, when the target BLET is indicated via higher layer signaling and the CQI table to be used is indicated, an actual code rate $R_{eff}(J)*1024$ may be calculated by using a method as Equation 1 above in general. (In the present disclosure, a value obtained by multiplying 1024 by a code rate is used for convenience, but the code rate may be used as it is.)

In Equation 1, F(Q(J), P) may be a function complexly determined to a value P corresponding to the modulation order Q(J) and the target BLER. Also, F(Q(J), P) may be divided into independent functions, such as $F_1(Q(J))$ indicating a value determined based on the modulation order and $F_2(P)$ indicating a value determined according to the target BLER, such as F(Q(J), P)=$F_1(Q(J))+F_2(P)$. Also, in some cases, $F_1(Q(J))=0$ and thus $R_{eff}(J)$ may be configured to a value irrelevant to the modulation order. For example, when $F_1(Q(J))=0$, $F_2(P)=(P-1)*c$, according to Equation 1, $R_{eff}(J)=R(J)-c$ when the target BLER=$10^{-2}$, $R_{eff}(J)=R(J)-2*c$ when the target BLER BLER=$10^{-3}$, $R_{eff}(J)=R(J)-3*c$ when the target BLER=$10^{-4}$, and $R_{eff}(J)=R(J)-4*c$ when the target BLER=$10^{-5}$. In Equation 1, a suitable value may be selected for the constant c according to the system. For example, the constant c may be configured to be a value (for example, a value between 22 and 23, such as 22.5) obtained by approximately equally dividing a difference of 90 between 120 and 30 of the index 1 by referring to Tables 16 and 18.

In Equation 1, specific values are subtracted or added from or to an existing code rate according to a pre-agreed rule, but generally, a method of using specific ratio values may be used, for example, multiplying or dividing a suitable value to or by the existing code rate according to a pre-agreed rule.

Embodiment 10

In Embodiments 6 to 9 above, a method of designing or determining a MCS table has been described. The MCS table designed as such may be stored in the base station or UE and used to determine the MCS index.

A modulation scheme supported in the current 5G NR system includes QPSK, 16QAM, 64QAM, and 256QAM. Also, different CQI tables and different MCS tables may be used according to an order of a maximum modulation scheme supported by the UE. Here, the UE may apply different CQI tables according to the target BLER and the maximum modulation order required in the system, determine or indicate a suitable CQI index, and transmit a value thereof to the base station. Accordingly, the base station may configure or indicate the MCS index, i.e., a combination of a modulation scheme and a target error rate, based on a suitable MCS table based on the corresponding CQI index or a CQI value corresponding thereto. Here, the MCS index may be determined based on the MCS table designed for the target BLER=0.001 not only as in Tables 16 to 20, but also as in newly designed Tables 29 to 33.

In an example of a specific method, in the 5G NR system, an MCS index for a PDSCH, i.e., a modulation order (or scheme) Qm and the target code rate R, is determined via following processes.

For a PDSCH scheduled via a PDCCH including DCI format 1_0 or format 11 together with CRC scrambled by C-RNTI, MCS-C-RNTI, TC-RNTI, CS-RNTI, SI-RNTI, RA-RNTI, or P-RNTI, or for a PDSCH scheduled by using PDSCH configuration SPS-Config provided by a higher layer without transmission of a corresponding PDCCH:

(a) when a higher layer parameter mcs-Table provided by PDSCH-Config is set to "qam256" and the PDSCH is scheduled by the PDCCH of the DCI format 1_1 together with the CRC scrambled by C-RNTI, the UE uses an MCS index $I_{MCS}$ of Table 17 to determine the modulation order Qm and the target code rate R;

(b) when a condition of (a) is not established, the UE is not configured with MCS-C-RNTI, the higher layer parameter mcs-Table provided by PDSCH-Config is configured to "qam64LowSE," and the PDSCH is scheduled by the PDCCH in a UE-specific search space together with the CRC scrambled by C-RNTI, the UE uses MCS index $I_{MCS}$ of Table 18 to determine the modulation order Qm and the target code rate R;

(c) when conditions of (a) and (b) are not established, the UE is configured with MCS-C-RNTI, and the PDSCH is scheduled by the PDCCH to which CRC scrambled by MCS-C-RNTI is applied, the UE uses MCS index $I_{MCS}$ of Table 18 to determine the modulation order Qm and the target code rate R;

(d) when conditions of (a), (b), and (c) are not established, the UE is not configured with the higher layer parameter mcs-Table provided by the SPC-Config, the higher layer parameter mcs-Table provided by the PDSCH-Config is set to "qam256," and (d-1) the PDSCH is scheduled by the PDCCH of DCI format 1_1 to which CRC scrambled by CS-RNTI is applied or (d-2) the PDSCH is scheduled without transmission of the corresponding PDCCH using SPS-Config,
the UE uses MCS index $I_{MCS}$ of Table 17 to determine the modulation order Qm and the target error rate R.
(e) when conditions of (a), (b), (c), and (d) are not established, the UE is configured as the higher layer parameter mcs-Table provided by SPS-Config is set to gam64LowSE; and
(e-1) the PDSCH is scheduled by the PDCCH to which CRC scrambled by CS-RNTI is applied or
(e-2) the PDSCH is scheduled without transmission of the corresponding PDCCH using SPS-Config,
the UE uses MCS index $I_{MCS}$ of Table 18 to determine the modulation order Qm and
the target error rate R;
(f) when conditions of (a), (b), (c), (d), and (e) are not established, the UE uses MCS index $I_{MCS}$ of Table 16 to determine the modulation order Qm and the target error rate R.

Details of determining the MCS index for the PDSCH, i.e., the modulation order (or scheme) Qm and the target error rate R, correspond to details of the standard as shown in Table 39 below.

For example, when the parameter mcs-Table is set to another value, such as "qam64MidSE," at least one of the MCS tables of Tables 29 to 31 in which the target BLER is less than 0.1 and higher than 0.00001 (for example, the target BLER is close to 0.002) and 64QAM is defined as the maximum modulation scheme may be used. Generally, more MCS tables may be additionally used when there are more target BLERs and considering further various service scenarios. Also, when 256QAM is defined as the maximum modulation scheme, the parameter mcs-Table may be set to another value, such as "qam256MidSE" and the MCS table of Table 32 or 33 may be used. Also, when 1024QAM is defined as the maximum modulation scheme, the parameter mcs-Table may be set to another value, such as "qam1024" or "qam1024MidSE" according to the modulation order or target BLER, and the MCS table of Table 35, 36, 37, 38, 36-1, or 37-1 may be used.

In an example of another specific method, in the 5G NR system, for the PUSCH scheduled by RAR UL grant, the PUSCH scheduled by the DCI format 0_0 that is CRC-scrambled by C-RNTI, MCS-C-RNTI, TC-RNTI, or CS-RNTI, the PUSCH scheduled by the DCI format 0_1 that is CRC-scrambled by C-RNTI, MCS-C-RNTI, CS-RNTI, or,

TABLE 39

For the PDSCH scheduled by a PDCCH with DCI format 1_0 or format 1_1 with CRC
scrambled by C-RNTI, MCS-C-RNTI, TC-RNTI, CS-RNTI, SI-RNTI, RA-RNTI, or P-RNTI, or
for the PDSCH scheduled without corresponding PDCCH transmissions using the
higher-layer-provided PDSCH configuration SPS-Config,
(a) if the higher layer parameter mcs-Table given by PDSCH-Config is set to 'qam256', and the
PDSCH is scheduled by a PDCCH with DCI format 1_1 with CRC scrambled by C-RNTI
the UE shall use $I_{MCS}$ and Table 5 to determine the modulation order ($Q_m$) and Target code
rate (R) used in the physical downlink shared channel.
(b) elseif the UE is not configured with MCS-C-RNTI, the higher layer parameter mcs-Table
given by PDSCH-Config is set to 'qam64LowSE', and the PDSCH is scheduled by a PDCCH in
a UE-specific search space with CRC scrambled by C-RNTI
the UE shall use $I_{MCS}$ and Table 6 to determine the modulation order ($Q_m$) and Target code
rate (R) used in the physical downlink shared channel.
(c) elseif the UE is configured with MCS-C-RNTI, and the PDSCH is scheduled by a PDCCH
with CRC scrambled by MCS-C-RNTI
the UE shall use $I_{MCS}$ and Table 6 to determine the modulation order ($Q_m$) and Target code
rate (R) used in the physical downlink shared channel.
(d) elseif the UE is not configured with the higher layer parameter mcs-Table given by
SPS-Config, the higher layer parameter mcs-Table given by PDSCH-Config is set to 'qam256',
if the PDSCH is scheduled by a PDCCH with DCI format 1_1 with CRC scrambled by
CS-RNTI or
if the PDSCH is scheduled without corresponding PDCCH transmission using SPS-Config,
the UE shall use $I_{MCS}$ and Table 5 to determine the modulation order ($Q_m$) and Target
code rate (R) used in the physical downlink shared channel.
(e) elseif the UE is configured with the higher layer parameter mcs-Table given by SPS-Config
set to 'qam64LowSE'
if the PDSCH is scheduled by a PDCCH with CRC scrambled by CS-RNTI or
if the PDSCH is scheduled without corresponding PDCCH transmission using SPS-Config,
the UE shall use $I_{MCS}$ and Table 6 to determine the modulation order ($Q_m$) and Target
code rate (R) used in the physical downlink shared channel.
(f) else
the UE shall use $I_{MCS}$ and Table 4 to determine the modulation order ($Q_m$) and Target code
rate (R) used in the physical downlink shared channel.
end When Tables 29 to 33 are used for a specific service scenario, a specific condition may be added between or before/after the conditions of (a) to (f). For example, at least one MCS table among Tables 29 to 33 may be used by adding or sub-dividing a condition according to a configured value of mcs-Table of the higher layer signaling PDSCH-Config or mcs-Table of SPS-Config, or according to whether the PDSCH is scheduled based on the PDCCH to which CRC scrambled by specific RNTI (for example: C-RNTI, MCS-C-RNTI, TC-RNTI, CS-RNTI, SI-RNTI, RA-RNTI, or P-RNTI) is applied. Here, the parameter mcs-Table may be set to a value other than "qam256" or "qam64LowSE."

SP-CSI-RNTI, or the PUSCH with configured grant using CS-RNTI, the MCS index for the PUSCH, i.e., the modulation order (or scheme) Qm and the target code rate R, is determined according to:
  a scheduling type of the PUSCH;
  whether "transform precoding" is disabled or abled;
  the parameter mcs-Table of the higher layer signaling pusch-Config or
  a value set in mcs-TableTransformPrecoder (for example, "qam256" or 'qam64LowSE'),
  the parameter mcs-Table of the higher layer signaling configuredGrantConfig or a value set in mcs-TableTransformPrecoder (for example, "qam256" or "qam64LowSE"), and whether the scheduling is performed based on the PDCCH to which the CRC scrambled by the specific RNTI is applied.

Here, the MCS tables such as Table 29 to 33 may be additionally used by adding or sub-dividing the conditions according to services. In this case, the parameter mcs-Table may be set in a value other than "qam256" or "qam64LowSE," and for example, when the parameter mcs-Table is set to another value, such as "qam64MidSE," at least one of the MCS tables of Tables 29 to 31 in which the target BLER is less than 0.1 and higher than 0.00001 (for example, the target BLER is close to 0.001) and 64 QAM is defined as the maximum modulation scheme may be used. Generally, further various MCS tables may be additionally used when there are more target BLERs and considering further various service scenarios. Also, when 256QAM is defined as the maximum modulation scheme, the parameter mcs-Table may be set to another value, such as "qam256MidSE" and the MCS table of Table 32 or 33 may be used. Also, when 1024QAM is defined as the maximum modulation scheme, the parameter mcs-Table may be set to another value, such as "qam1024" or "qam1024MidSE" according to the modulation order or target BLER, and the MCS table of Table 35, 36, 37, 38, 36-1, or 37-1 may be used.

The CQI table or MCS table optimized according to the target BLER of the system may be differently configured, but as in embodiments of the disclosure, many combinations of a modulation scheme (or order) and a code rate are generally shared and used. When a configuration of using at least one of the first CQI table or the first MCS table is referred to as a first table configuration, and a configuration of using at least one of the second CQI table or the second MCS table is referred to as a second table configuration, so as to determine CQI or MCS, features between a configuration of each table and an operation of the base station or UE may be as follows.

The UE capable of performing the first table configuration for wireless communication with a base station (or a radio node) of a cellular network receives an instruction for applying or performing the second table configuration from the base station. Based on the received instruction, the UE applies the second table configuration for wireless communication with the base station (or the radio node). Based on the second table configuration, the terminal transmits control information (for example, CQI information) or data to the base station.

The second MCS table or the second CQI table for the second table configuration supports spectral efficiency lower than minimum spectral efficiency of the first MCS table configuration.

When the second table configuration is applied and when at least one of combinations of a modulation order and a code rate for the spectral efficiency included in at least one of the first MCS table or the first CQI table (as fallback) may be used, at least one of the combinations may be maintained in at least one of the second MCS table or the second CQI table.

"The combinations of a modulation order and a code rate for the spectral efficiency included in at least one of the first MCS table or the first CQI table" maintained in at least one of the second MCS table or the second CQI table may include a combination of a modulation order and a code rate for the lowest spectral efficiency of the first table configuration.

The target BLER of the system applying the first table configuration may be higher than the target BLER of the system applying the second table configuration. (Approximately $10^P$ times or higher, P=1, 2, . . . , 5)

The UE may transmit, to the base station, a suitable CQI index based on a CQI table determined according to a table configuration or determine a modulation scheme and a code rate based on a determined MCS table, determine a TBS for data transmission, and then transmit, to the base station, encoded bits by performing encoding on the data. Alternatively, the UE may determine the modulation scheme and the code rate based on the determined MCS table, determine the TBS for the data corresponding to the encoded bits transmitted from the base station, and then perform decoding on the received encoded bits to reconstruct the data.

Operations of the base station corresponding to those of the UE may be as follows.

For wireless communication with the UE in the cellular network, the base station capable of performing the first table configuration transmits, to the UE, an instruction for applying of performing the second table configuration.

The control information (for example, CQI information) or data transmitted based on the second table configuration is received from the UE.

The base station may determine a suitable MCS based on the CQI index transmitted from the UE based on the CQI table determined according to the table configuration, determine the TBS of the data corresponding to the encoded bits received from the UE based on the modulation scheme and the code rate determined based on the determined MCS table, and then reconstruct the data by suitably performing decoding on the received encoded bits. Also, the base station may determine the modulation scheme and the code rate based on the determined MCS table, determine the TBS for transmitting the data, and then transmit, to the UE, the encoded bits by performing encoding on the data.

Features related to the first table configuration and the second table configuration may correspond to features related to the first table configuration and the second table configuration in the operations of the UE described above, and thus details thereof will be omitted.

The TBS may be determined by using the code rate indicated by an index included in the MCS table. In the 5G NR system, the TBS may be determined according to a number of assigned REs, a number of used layers, the modulation order, and the code rate. Among the various factors for determining the TBS, the modulation order and the code rate may be determined via MCS among signaling information. According to some embodiments of the disclosure, the modulation order determined via the MCS is used as it is, and the code rate determined via the MCS may be used as it is or additionally adjusted according to RRC configuration information. According to some embodiments of the disclosure, when only the MCS table for a service having a specific target BLER is defined, and a service having a same maximum modulation order but a BLER different from the specific target BLER is configured to be supported via RRC signaling, a transceiver may determine the modulation order and the code rate from the defined MCS table and adjust only the code rate. Various methods in addition to the method of Embodiment 8 may be applied as a method of adjusting the code rate. For example, a method of subtracting or adding a pre-determined constant from or to the code rate or multiplying the code rate by a specific rate may be used, and a value of the constant being subtracted or added from or to the code rate or the multiplied specific rate may be the same for all CQI indexes or may vary according to the modulation order.

According to TS 38.214 that is one of documents of the 5G NR standard, the TBS may be determined according to $N_{RE} \times R \times Qm \times v$, wherein $N_{RE}$ denotes the total number of REs assigned for the PDSCH, R denotes the code rate, Qm denotes the modulation order, and v denotes the number of layers. Here, when the number of PRBs is $N_{PRB}$ and the number of REs assigned per PRB is $N_{RE\_PRB}$, $N_{RE}=N_{PRB} \times N_{RE\_PRB}$. The TBS may be obtained by using a method pre-determined based on the parameters $N_{RE} \times R \times Qm \times v$, or all TBSs may be pre-calculated for each of the parameters $N_{RE}$, R, Qm, and v and then stored in a table to be used. In other words, values of TBS($N_{RE}$, R, Qm, v) may all be stored by using the table, and when the parameters $N_{RE}$, R, Qm, and v are determined, a corresponding TBS may be determined based on the table. According to such a method, a memory for storing the TBS is additionally required but the TBS may be quickly determined because a pre-determined calculation process is omitted.

The parameters $N_{RE}$, R, Qm, and v for mapping or storing the table may use different values in some cases. For example, the TBS may be stored in the table by using an MCS index, in which the parameters R and Qm are in a 1:1 corresponding relationship, or a spectral efficiency. Here, the parameters R and Qm indicated by the MCS index or the spectral efficiency may vary depending on an MCS table configuration, the table of the TBS may be configured based on information about the MCS table configuration. Also, because the parameter $N_{RE}$ may be determined according to an effective number of OFDM symbols, a number of subcarriers assigned per symbol, a number of RBs, and overhead, when the TBS is determined considering, in advance, the number of subcarriers or an effect of the overhead, the table of the TBS may be configured in a form of TBS (parmeter1, parameter2, . . . ) based on the effective number of OFDM symbols and RBs. Also, because the TBS may vary depending on the parameter v, the table of the TBS may be configured based on a rank value.

Specifically, when a required number or all of TBSs are pre-calculated for an MCS table indicator (for convenience, referred to as QAM_configuration or MCS_configuration), the MCS (or the MCS index), the number of RBs, and the effective number of OFDM symbols, and rank values, and the UE or base station includes the table TBS (QAM_configuration, MCS index, $N_{RB}$, $N_{Eff\_symbol}$, Rank) storing values thereof, the TBS may be determined based on the parameters without a separate calculation process and then encoding or decoding of the data may be performed based on the determined TBS. Here, when a proportion of the overhead in the symbol is considered by considering the overhead while determining the effective number of symbols $N_{Eff\_symbol}$, the $N_{Eff\_symbol}$ may be defined to be not only in integer in general, but also in a suitable rational number. For example, when the overhead occupies half of a number of resources assigned per symbol, the number of symbols $N_{Eff\_symbol}$ may be defined to be a rational number, such as 0.5, 1, 1.5, 2, 2.5, or the like.

The above embodiment of the disclosure is only an example, and the table may be stored or configured based on at least some or a combination of the related parameters, such as $N_{RE}$, R, Qm, v, QAM_configuration, MCS (or MCS index), $N_{RB}$, $N_{Eff\_symbol}$, and rank. In the 5G NR system, the UE/base station may first calculate $N'_{RE}$ that is the number of REs assigned for PDSCH mapping in one PRB within an assignment resource according to $N'_{RE}=N_{sc}^{RB}-N_{symb}^{sh}-N_{DMRS}^{PRB}-N_{oh}^{PRB}$, calculate the total number $N_{RE}$ of REs assigned to the PDSCH according to $N_{RE}=\min(156,N'_{RE}) \cdot n_{PRB}$, and then calculate $N_{info}=N_{RE} \cdot R \cdot Q_m \cdot v$ to determine the TBS based thereon. (Here, $N_{sc}^{RB}$ denotes the number (for example, 12) of subcarriers included in one RB, $N_{symb}^{sh}$ denotes the number of OFDM symbols assigned to the PDSCH, $N_{DMRS}^{PRB}$ denotes the number of REs in one PRB and occupied by a DMRS in a code division multiplexing group (CDM), and $N_{oh}^{PRB}$ denotes the number (for example, one of 0, 6, 12, and 18) of REs occupied by the overhead in one PRB configured via higher layer signaling). Accordingly, to determine the TBSs, values of the TBSs may be pre-determined based on the parameters such as $N_{symb}^{sh}$, $n_{DMRS}^{PRB}$, $N_{oh}^{PRB}$, R, Qm, and v, except a parameter having a fixed value, and thus the table may be configured based on such parameters. Also, the table may be further efficiently configured by combining the overhead, such as $N_{DMRS}^{PRB}$ or $N_{oh}^{PRB}$, with $N_{symb}^{sh}$. (As described above, $N_{symb}^{sh}$ may be defined to include a rational value instead of an integer.)

In the LTE system, a relationship between the CQI index and the combination of the modulation scheme (or order) and the TBS is defined as follows.

TABLE 40

A combination of modulation scheme and transport block size corresponds to a CQI index if
the combination could be signaled for transmission on the PDSCH in the CSI reference resource according to the Transport Block Size table, and
the modulation scheme is indicated by the CQI index, and
the combination of transport block size and modulation scheme when applied to the reference resource results in the effective channel code rate which is the closest possible to the code rate indicated by the CQI index. If more than one combination of transport block size and modulation scheme results in an effective channel code rate equally close to the code rate indicated by the CQI index, only the combination with the smallest of such transport block sizes is relevant.

In following cases, the combination of the modulation scheme and the TBS may correspond to the CQI index:
  When the combination is signaled for transmission on the PDSCH in the CSI reference resource, according to the table of TBS;
  When the modulation scheme is indicated by the CQI index;
  When the combination of the modulation scheme and the TBS results in an effective channel code rate closest to a code rate indicated by the CQI index, when applied to the reference resource. When one or more of the combinations of the modulation scheme and the TBS results in the effective channel code rate closest to the code rate indicated by the CQI index, only the combination with a smallest TBS may be meaningful (or suitable).

In the LTE system, the TBS is determined by using the table storing the pre-determined TBSs, without MCS directly indicating the target code rate, the spectral efficiency, or the MPR. Here, the TBS is determined by using the TBS index $I_{TBS}$ and the number $N_{PRB}$ determined by the MCS index. As a result, the TBS is determined via a process of selecting one of TBSs in the table from a signaling parameter, and thus it may be considered that the modulation scheme and the TBS correspond to the CQI as one combination. However, in the 5G NR system, the modulation order and the target code rate, or the spectral efficiency is directly indicated for each index in the MCS table, and thus the modulation order, the target code rate, and the TBS may be considered as one combination.

In the 5G NR system or a communication system applying a TBS determination method similar to the 5G NR system, the meaning of CQI may be defined somewhat differently from the LTE system, as described in various embodiments of the disclosure below.

Embodiment 11

Because the combination of the modulation scheme (order), the target code rate, and the TBS corresponds to the CQI, a CQI-MCS relationship may be defined according to [CQI-MCS Relationship-1].

[CQI-MCS Relationship-1]

TABLE 41

A combination of modulation scheme, target code rate and transport block size corresponds to a CQI index if
the combination could be signaled for transmission on the PDSCH in the CSI reference resource (according to the Transport Block Size determination described in [Subcluase 5.1.3.2, TS38.214, 5G NR]), and
the modulation scheme is indicated by the CQI index, and
the combination when applied to the reference resource results in the effective channel code rate which is the closest possible to the code rate indicated by the CQI index. If more than one combination of transport block size and modulation scheme results in an effective channel code rate equally close to the code rate indicated by the CQI index, only the combination with the smallest of such transport block sizes is relevant.

[CQI-MCS Relationship-1]
In following cases, the combination of the modulation scheme, the target code rate, and the TBS may correspond to the CQI index:
(According to the TBS determination described in [5G NR, TS 38.214, 5.1.3.2]) when the combination is signaled for transmission on the PDSCH in the CSI reference resource according to the table of TBSs;
When the modulation scheme is indicated by the CQI index; and
When the combination results in the effective channel code rate closest to the code rate indicated by the CQI index when applied to the reference resource. When one or more of the combinations of the modulation scheme and the TBS results in the effective channel code rate closest to the code rate indicated by the CQI index, only the combination with a smallest TBS may be meaningful (or suitable).

In the 5G NR system, when the base station determines the MCS from the received CQI information, the TBS is determined according to the pre-determined calculation method based on the modulation order Qm corresponding to the MCS, the code rate R, the number of assigned resources, and the amount of overhead. Accordingly, the process of selecting one of a plurality of possible TBSs may be unnecessary, and thus the CQI-MCS relationship may be defined as [CQI-MCS Relationship-2], [CQI-MCS Relationship-3], or [CQI-MCS Relationship-4].

[CQI-MCS Relationship-2]

TABLE 42

A combination of modulation scheme, target code rate and transport block size corresponds to a CQI index if
the combination could be signaled for transmission on the PDSCH in the CSI reference resource (according to the Transport Block Size TABLE 42-continued determination described in [Subcluase 5.1.3.2, TS38.214, 5G NR]), and
the modulation scheme is indicated by the CQI index, and
the combination when applied to the reference resource results in the effective channel code rate which is the closest possible to the code rate indicated by the CQI index.

[CQI-MCS Relationship-2]
In following cases, the combination of the modulation scheme, the target code rate, and the TBS may correspond to the CQI index:
(According to the TBS determination described in [5G NR, TS 38.214, 5.1.3.2]) when the combination is signaled for transmission on the PDSCH in the CSI reference resource;
When the modulation scheme is indicated by the CQI index; and
When the combination results in the effective channel code rate closest to the code rate indicated by the CQI index when applied to the reference resource.

[CQI-MCS Relationship-3]

TABLE 43

A combination of modulation scheme and target code rate (and/or transport block size) corresponds to a CQI index if:
the combination could be signaled for transmission on the PDSCH in the CSI reference resource (according to the Transport Block Size determination described in [Subcluase 5.1.3.2, TS38.214, 5G NR]), and
the modulation scheme (and/or the target code rate) is indicated by the CQI index, and
the combination when applied io the reference resource results in the effective channel code rate (or spectral efficiency) which is the closest possible to the code rate (or spectral efficiency) indicated by the CQI index.

[CQI-MCS Relationship-3]
In following cases, the combination of the modulation scheme and the target code rate (and/or the TBS) may correspond to the CQI index:
(According to the TBS determination described in [5G NR, TS 38.214, 5.1.3.2]) when the combination is signaled for transmission on the PDSCH in the CSI reference resource;
When the modulation scheme (and/or the target code rate) is indicated by the CQI index; and
When the combination results in the effective channel code rate (or spectral efficiency) closest to the code rate (or spectral efficiency) indicated by the CQI index when applied to the reference resource.

[CQI-MCS Relationship-4]

TABLE 44

A combination of modulation scheme and target code rate (and/or transport block size) corresponds to a CQI index if
the combination could be signaled for transmission on the PDSCH in the CSI reference resource (according to the Transport Block Size determination described in [Subcluase 5.1.3.2, TS38.214, 5G NR]), and
the modulation scheme (and/or the target code rate) is indicated by the CQI index, and
the combination when applied to the reference resource results in the effective channel code rate which is the closest possible to the code rate indicated by the CQI index. If more than one combination of modulation scheme and target code rate results in an effective channel code rate equally close to the code rate indicated by the CQI index, only the combination with the smallest of such target code rates is relevant.

[CQI-MCS Relationship-4]

In following cases, the combination of the modulation scheme and the target code rate (and/or the TBS) may correspond to the CQI index:

(According to the TBS determination described in [5G NR, TS 38.214, 5.1.3.2]) when the combination is signaled for transmission on the PDSCH in the CSI reference resource;

When the modulation scheme (and/or the target code rate) is indicated by the CQI index; and When the combination results in the effective channel code rate closest to the code rate indicated by the CQI index when applied to the reference resource. When one or more of the combinations of the modulation scheme and the target code rate results in the effective channel code rate closest to the code rate indicated by the CQI index, only the combination with a smallest target code rate may be meaningful (or suitable).

Because the combination may correspond to the highest CQI index in which a transport block error probability does not exceed the target BLER substantially or approximately, according to [CQI Determination-1] or [CQI Determination-2], the CQI-MCS relationship for the effective code rate or the effective spectral efficiency may be specifically defined as [CQI-MCS Relationship-5].

[CQI-MCS Relationship-5]

TABLE 45

A combination of modulation scheme and target code rate (and/or transport block size) corresponds to a CQI index if
the combination could be signaled for transmission on the PDSCH in the CSI reference resource (according to the Transport Block Size determination described in [Subcluase 5.1.3.2, TS38.214, 5G NR]), and
the modulation scheme (and/or the target code rate) is indicated by the CQI index, and
the combination when applied to the reference resource results in the highest (or maximum) effective channel code rate (or spectral efficiency) which is smaller than or equal to the code rate (or spectral efficiency) indicated by the CQI index.

[CQI-MCS Relationship-5]

In following cases, the combination of the modulation scheme and the target code rate (and/or the TBS) may correspond to the CQI index:

(According to the TBS determination described in [5G NR, TS 38.214, 5.1.3.2]) when the combination is signaled for transmission on the PDSCH in the CSI reference resource;

When the modulation scheme (and/or the target code rate) is indicated by the CQI index; and When the combination results in the highest (or maximum) effective channel code rate (or spectral efficiency) smaller than or equal to the code rate (or spectral efficiency) indicated by the CQI index when applied to the reference resource.

In the above embodiments of the disclosure, the phrases within the brackets may indicate the possibility of omission, and in particular, the meaning of "a combination of modulation scheme and target code rate (and/or YBS)" indicates "a combination of modulation scheme and target code rate," "a combination of modulation scheme, target code rate and TBS," or "a combination of modulation scheme and TBS." Also, the phrases in [CQI-MCS Relationship-1] to [CQI-MCS Relationship-5] may be suitably combined to define a new CQI-MCS relationship.

Embodiment 12

For communication of a bandwidth reduced low complexity (BL) UE or a coverage enhancement (CE) UE, the CQI index may be determined according to [CQI Determination-1] or [CQI Determination-2] by using a CQI table different from Tables 13 to 15 or Tables 21 to 28. In the BL/CE UE, a low modulation order or a low code rate may be generally required to be applied for more robust transmission. Accordingly, for the same target BLER, the CQI table and MCS table supporting spectral efficiencies lower than the spectral efficiencies supported by the CQI or MCS tables of Tables 13 to 28 in overall or in average for the same index may be required.

Also, the 5G NR system supports a non-standalone (NSA) operation or mode operating in association with LTE or LTE-prior systems, and a standalone (SA) operation or mode capable of operating regardless of the LTE or LTE-prior systems. However, up to 1024QAM is applicable based on the specification in the current LTE system, but is unable to be supported in the 5G NR system (based on Release 16). Accordingly, when the further 5G NR system adopts 1024QAM to support functions supported in the LTE system as much as possible while supporting SA operating independently from the LTE system, new CQI and MCS tables may be introduced. In this case as well, a plurality of CQI/MCS tables satisfying features of the CQI/MCS tables according to the target BLER proposed in other embodiments of the disclosure while having the maximum modulation order of 1024QAM may be defined.

Figure 8:
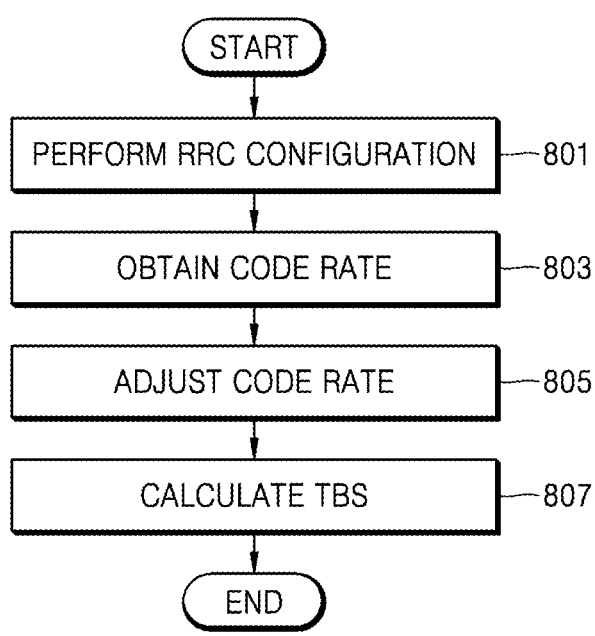
FIG. 8 illustrates a flowchart of a method by which a terminal calculates a transport block size (TBS) by using CQI and MCS tables according to an embodiment of the disclosure.

FIG. 8 illustrates a flowchart of a method by which the terminal 120 calculates a TBS by using CQI and MCS tables, according to an embodiment of the disclosure. FIG. 8 illustrates an operating method of the terminal 120.

Referring to FIG. 8, a base station (for example, the base station 110) signals RRC to the terminal 120 considering a service to be provided to the terminal 120. In operation 801, the terminal 120 performs RRC configuration. In operation 803, the terminal 120 obtains a code rate and modulation order, which are references. In operation 805, the terminal 120 adjusts the code rate when a service defined in the RRC configuration is different from a reference service. Here, service information for adjusting the code rate may be directly indicated via RRC signaling, or may be indicated via a BLER value or other parameters classified according to services. A specific method of obtaining or determining a code rate and modulation order, and a method of adjusting a code rate follow various embodiments of the disclosure. In operation 807, the terminal 120 calculates a TBS by using the adjusted code rate.

Figure 9:
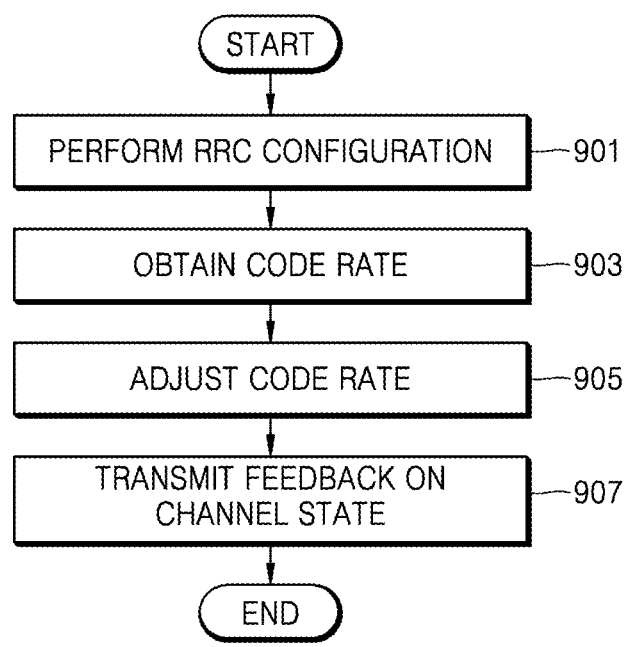
FIG. 9 illustrates another flowchart of a method by which a terminal calculates a TBS by using CQI and MCS tables according to an embodiment of the disclosure.

FIG. 9 illustrates a flowchart of another method by which the terminal 120 calculates a TBS by using CQI and MCS tables, according to an embodiment of the disclosure. FIG. 9 illustrates an operating method of the terminal 120.

Referring to FIG. 9, a base station (for example, the base station 110) signals RRC to the terminal 120 considering a service to be provided to the terminal 120. In operation 901, the terminal 120 performs RRC configuration. In operation 903, the terminal 120 obtains or determines a code rate and modulation order, which are references. In operation 905, the terminal 120 adjusts the code rate when a service defined in the RRC configuration is different from a reference service. Here, service information for adjusting the code rate may be directly indicated via RRC signaling, or may be indicated via a BLER value or other parameters classified according to services. A specific method of obtaining or determining a code rate and modulation order, and a method of adjusting a code rate follow various embodiments of the disclosure. In operation 907, the terminal 120 transmits feedback on a channel state based on the adjusted code rate.

According to some embodiments of the disclosure, the base station 110 and the terminal 120 may perform communication by using at least one of wireless communication or wired communication.

The methods according to the embodiments of the disclosure described in the claims or the detailed description may be implemented in hardware, software, or a combination of hardware and software.

When the electrical structures and methods are implemented in software, a computer-readable recording medium having one or more programs (software modules) recorded thereon may be provided. The one or more programs recorded on the computer-readable recording medium are configured to be executable by one or more processors in a device. The one or more programs include instructions to execute the methods according to the embodiments of the disclosure described in the claims or the detailed description.

The programs (e.g., software modules or software) may be stored in random access memory (RAM), non-volatile memory including flash memory, read-only memory (ROM), electrically erasable programmable read-only memory (EEPROM), a magnetic disc storage device, compact disc-ROM (CD-ROM), a digital versatile disc (DVD), another type of optical storage device, or a magnetic cassette. Alternatively, the programs may be stored in a memory system including a combination of some or all of the above-mentioned memory devices. In addition, each memory device may be included by a plural number.

The programs may also be stored in an attachable storage device which is accessible through a communication network such as the Internet, an intranet, a local area network (LAN), a wide area network (WAN), or a storage area network (SAN), or a combination thereof. The storage device may be connected through an external port to an apparatus according to the embodiments of the disclosure. Another storage device on the communication network may also be connected to the apparatus performing the embodiments of the disclosure.

According to an embodiment of the disclosure, when communication is performed between a base station and a UE, the communication may be further efficiently performed by using a suitable CQI table or MCS table according to a required target BLER.

The effects obtainable in the disclosure are not limited to the above-mentioned effects, and other effects not mentioned may be clearly understood by one of ordinary skill in the art from the description below.

In the afore-described embodiments of the disclosure, elements included in the disclosure are expressed in a singular or plural form according to the embodiments of the disclosure. However, the singular or plural form is appropriately selected for convenience of explanation and the disclosure is not limited thereto. As such, an element expressed in a plural form may also be configured as a single element, and an element expressed in a singular form may also be configured as plural elements.

Meanwhile, specific embodiments of the disclosure have been described in the detailed description of the disclosure, but various modifications may be possible without departing from the scope of the disclosure. Therefore, the scope of the disclosure should not be limited to the embodiments of the disclosure described above, but should be determined not only by the scope of the following claims, but also by the equivalents of the claims.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a wireless communication system, the method comprising:
   receiving, from a base station, a radio resource control (RRC) message including a higher layer parameter associated with a modulation and coding scheme (MCS) table and a higher layer parameter for a channel quality indicator (CQI) table;
   identifying the CQI table, based on the higher layer parameter for the CQI table;
   identifying the MCS table for a physical downlink shared channel (PDSCH), based on the higher layer parameter associated with the MCS table, wherein, in case that the higher layer parameter associated with the MCS table is related to a 1024-quadrature amplitude modulation (QAM), the identified MCS table includes an MCS table with a modulation order of 10;
   receiving, from the base station via a physical downlink control channel (PDCCH), downlink control information (DCI) indicating an MCS value of the MCS table with the modulation order of 10;
   receiving, from the base station via the PDSCH, downlink data; and
   determining a transport block size associated with the PDSCH, based on the MCS value,
   wherein, in case that the higher layer parameter for the CQI table indicates a CQI table for the 1024-QAM, the identified CQI table includes a set comprising a modulation scheme and a code rate, the set including: (256QAM, 948/1024), (1024QAM, 853/1024), and (1024QAM, 948/1024),
   wherein the MCS table with the modulation order of 10 includes a first set comprising a modulation order and a target code rate, the first set including: (10, 805.5/1024), (10, 853/1024), (10, 900.5/1024), and (10, 948/1024),
   wherein target code rates of 853/1024 and 948/1024 of the first set included in the MCS table with the modulation order of 10 are the same as code rates of 853/1024 and 948/1024 of the set associated with the 1024-QAM in the identified CQI table, respectively, and
   wherein a target code rate of 805.5/1024 of the first set included in the MCS table with the modulation order of 10 corresponds to a spectral efficiency between a spectral efficiency corresponding to (256QAM, 948/1024) of the set included in the identified CQI table and a spectral efficiency corresponding to (1024QAM, 853/1024) of the set included in the identified CQI table.

2. The method of claim 1, further comprising:
   determining a CQI value of the identified CQI table; and
   reporting the CQI value to the base station.

3. The method of claim 1, wherein the CQI table for the 1024-QAM is associated with a transport block error probability of 0.1,
   wherein, in case that the higher layer parameter for the CQI table indicates a CQI table for 64-QAM, the CQI table for the 64-QAM is associated with a transport block error probability of 0.00001, and
   wherein at least one spectral efficiency of the CQI table for the 64-QAM is lower than a minimum spectral efficiency of the CQI table for the 1024-QAM.

4. The method of claim 2, wherein the CQI value corresponds to a modulation scheme and a code rate.

5. A method performed by a base station in a wireless communication system, the method comprising:
- transmitting, to a terminal, a radio resource control (RRC) message including a higher layer parameter associated with a modulation and coding scheme (MCS) table for a physical downlink shared channel (PDSCH) and a higher layer parameter for a channel quality indicator (CQI) table,
- wherein, in case that the higher layer parameter associated with the MCS table is related to a 1024-quadrature amplitude modulation (QAM), the MCS table includes an MCS table with a modulation order of 10;
- transmitting, to the terminal via a physical downlink control channel (PDCCH), downlink control information (DCI) indicating an MCS value of the MCS table with the modulation order of 10; and
- transmitting, to the terminal via the PDSCH, downlink data, wherein the MCS value is related to a transport block size associated with the PDSCH,
- wherein, in case that the higher layer parameter for the CQI table indicates a CQI table for the 1024-QAM, the CQI table includes a set comprising a modulation scheme and a code rate, the set including: (256QAM, 948/1024), (1024QAM, 853/1024), and (1024QAM, 948/1024),
- wherein the MCS table with the modulation order of 10 includes a first set comprising a modulation order and a target code rate, the first set including: (10, 805.5/1024), (10, 853/1024), (10, 900.5/1024), and (10, 948/1024),
- wherein target code rates of 853/1024 and 948/1024 of the first set included in the MCS table with the modulation order of 10 are the same as code rates of 853/1024 and 948/1024 of the set associated with the 1024-QAM in the CQI table, respectively, and
- wherein a target code rate of 805.5/1024 of the first set included in the MCS table with the modulation order of 10 corresponds to a spectral efficiency between a spectral efficiency corresponding to (256QAM, 948/1024) of the set included in the CQI table and a spectral efficiency corresponding to (1024QAM, 853/1024) of the set included in the CQI table.

6. The method of claim 5, further comprising:
- receiving, from the terminal, a CQI value of the CQI table.

7. The method of claim 5, wherein the CQI table for the 1024-QAM is associated with a transport block error probability of 0.1,
- wherein, in case that the higher layer parameter for the CQI table indicates a CQI table for 64-QAM, the CQI table for the 64-QAM is associated with a transport block error probability of 0.00001, and
- wherein at least one spectral efficiency of the CQI table for the 64-QAM is lower than a minimum spectral efficiency of the CQI table for the 1024-QAM.

8. The method of claim 6, wherein the CQI value corresponds to a modulation scheme and a code rate.

9. A terminal in a wireless communication system, the terminal comprising:
- a transceiver; and
- at least one processor coupled with the transceiver and configured to:
  - receive, from a base station, a radio resource control (RRC) message including a higher layer parameter associated with a modulation and coding scheme (MCS) table and a higher layer parameter for a channel quality indicator (CQI) table;
  - identify the CQI table, based on the higher layer parameter for the CQI table;
  - identify the MCS table for a physical downlink shared channel (PDSCH), based on the higher layer parameter associated with the MCS table, wherein, in case that the higher layer parameter associated with the MCS table is related to a 1024-quadrature amplitude modulation (QAM), the identified MCS table includes an MCS table with a modulation order of 10;
  - receive, from the base station via a physical downlink control channel (PDCCH), downlink control information (DCI) indicating an MCS value of the MCS table with the modulation order of 10;
  - receive, from the base station via the PDSCH, downlink data; and
  - determine a transport block size associated with the PDSCH, based on the MCS value,
- wherein, in case that the higher layer parameter for the CQI table indicates a CQI table for the 1024-QAM, the identified CQI table includes a set comprising a modulation scheme and a code rate, the set including: (256QAM, 948/1024), (1024QAM, 853/1024), and (1024QAM, 948/1024),
- wherein the MCS table with the modulation order of 10 includes a first set comprising a modulation order and a target code rate, the first set including: (10, 805.5/1024), (10, 853/1024), (10, 900.5/1024), and (10, 948/1024),
- wherein target code rates of 853/1024 and 948/1024 of the first set included in the MCS table with the modulation order of 10 are the same as code rates of 853/1024 and 948/1024 of the set associated with the 1024-QAM in the identified CQI table, respectively, and
- wherein a target code rate of 805.5/1024 of the first set included in the MCS table with the modulation order of 10 corresponds to a spectral efficiency between a spectral efficiency corresponding to (256QAM, 948/1024) of the set included in the identified CQI table and a spectral efficiency corresponding to (1024QAM, 853/1024) of the set included in the identified CQI table.

10. A base station in a wireless communication system, the base station comprising:
- a transceiver; and
- at least one processor coupled with the transceiver and configured to:
  - transmit, to a terminal, a radio resource control (RRC) message including a higher layer parameter associated with a modulation and coding scheme (MCS) table for a physical downlink shared channel (PDSCH) and a higher layer parameter for a channel quality indicator (CQI) table, wherein, in case that the higher layer parameter associated with the MCS table is related to a 1024-quadrature amplitude modulation (QAM), the MCS table includes an MCS table with a modulation order of 10;
  - transmit, to the terminal via a physical downlink control channel (PDCCH), downlink control information (DCI) indicating an MCS value of the MCS table with the modulation order of 10; and
  - transmit, to the terminal via the PDSCH, downlink data,
- wherein the MCS value is related to a transport block size associated with the PDSCH,
- wherein, in case that the higher layer parameter for the CQI table indicates a CQI table for the 1024-QAM, the CQI table includes a set comprising a modulation scheme and a code rate, the set including: (256QAM, 948/1024), (1024QAM, 853/1024), and (1024QAM, 948/1024), wherein the MCS table with the modulation order of 10 includes a first set comprising a modulation order and a target code rate, the first set including: (10, 805.5/1024), (10, 853/1024), (10, 900.5/1024), and (10, 948/1024), wherein target code rates of 853/1024 and 948/1024 of the first set included in the MCS table with the modulation order of 10 are the same as code rates of 853/1024 and 948/1024 of the set associated with the 1024-QAM in the CQI table, respectively, and wherein a target code rate of 805.5/1024 of the first set included in the MCS table with the modulation order of 10 corresponds to a spectral efficiency between a spectral efficiency corresponding to (256QAM, 948/1024) of the set included in the CQI table and a spectral efficiency corresponding to (1024QAM, 853/1024) of the set included in the CQI table.

* * * * *